US012073597B2

(12) United States Patent
Ozone et al.

(10) Patent No.: US 12,073,597 B2
(45) Date of Patent: Aug. 27, 2024

(54) INFORMATION PROCESSING DEVICE AND INFORMATION PROCESSING METHOD

(71) Applicant: SONY GROUP CORPORATION, Tokyo (JP)

(72) Inventors: Takayoshi Ozone, Tokyo (JP); Ryuichi Tadano, Tokyo (JP); Hiroshi Yamamoto, Tokyo (JP); Naoko Hirashima, Tokyo (JP); Yo Nonoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 210 days.

(21) Appl. No.: 17/310,596

(22) PCT Filed: Dec. 26, 2019

(86) PCT No.: PCT/JP2019/051153
§ 371 (c)(1),
(2) Date: Aug. 12, 2021

(87) PCT Pub. No.: WO2020/170604
PCT Pub. Date: Aug. 27, 2020

(65) Prior Publication Data
US 2022/0108541 A1 Apr. 7, 2022

(30) Foreign Application Priority Data

Feb. 21, 2019 (JP) ................................ 2019-029889

(51) Int. Cl.
*G06T 7/20* (2017.01)
*G06V 10/22* (2022.01)

(52) U.S. Cl.
CPC .............. *G06V 10/235* (2022.01); *G06T 7/20* (2013.01); *G06T 2207/20092* (2013.01)

(58) Field of Classification Search
CPC ................... G06V 10/235; G06T 7/20; G06T 2207/20092; G06F 3/005; G06F 3/017;
(Continued)

(56) References Cited

U.S. PATENT DOCUMENTS

2009/0274393 A1\* 11/2009 Patel ........................ H04N 7/01
382/298
2010/0156931 A1 6/2010 Boreham et al.
(Continued)

FOREIGN PATENT DOCUMENTS

AU 2008259357 B2 9/2010
CN 101753999 A 6/2010
(Continued)

OTHER PUBLICATIONS

International Search Report and Written Opinion of PCT Application No. PCT/JP2019/051153, issued on Mar. 24, 2020, 11 pages of ISRWO.

(Continued)

*Primary Examiner* — Stephen P Coleman
(74) *Attorney, Agent, or Firm* — CHIP LAW GROUP

(57) ABSTRACT

A degree of freedom in image production regarding tracking of a subject is improved. Designation of a placement position in a display area of a tracking target is received on a first screen in which a predetermined image is displayed in the display area. For example, a user is allowed to designate a position (a position within the display area) in which a tracking target subject is disposed in a state in which image content can be recognized on a display screen.

19 Claims, 66 Drawing Sheets

(58) Field of Classification Search
CPC . G06F 3/0304; G06F 3/04845; G11B 27/031; G11B 27/34; H04N 5/772; H04N 9/8205; H04N 23/683; H04N 23/687; H04N 23/81; H04N 25/61; H04N 5/783
USPC .......................................................... 382/282
See application file for complete search history.

(56) References Cited

U.S. PATENT DOCUMENTS

| | | |
|---|---|---|
| 2011/0007175 A1 | 1/2011 | Fujita et al. |
| 2015/0254871 A1 | 9/2015 | Macmillan |
| 2015/0256746 A1 | 9/2015 | Macmillan et al. |
| 2015/0256808 A1 | 9/2015 | Macmillan et al. |
| 2017/0134627 A1 | 5/2017 | Ikegami |
| 2017/0295318 A1 | 10/2017 | Macmillan et al. |
| 2018/0108144 A1* | 4/2018 | Tsunashima .............. G06T 7/11 |

FOREIGN PATENT DOCUMENTS

| | | |
|---|---|---|
| CN | 101897174 A | 11/2010 |
| CN | 103491342 A | 1/2014 |
| CN | 108475431 A | 8/2018 |
| EP | 2219364 A1 | 8/2010 |
| JP | 2005165929 A | 6/2005 |
| JP | 2009147727 A | 7/2009 |
| JP | 2009177322 A | 8/2009 |
| JP | 2010160790 A | 7/2010 |
| JP | 2011-199569 A | 10/2011 |
| JP | 4934714 B2 | 5/2012 |
| JP | 5111088 B2 | 12/2012 |
| JP | 2015-111746 A | 6/2015 |
| JP | 2017-092689 A | 5/2017 |
| JP | 2018-133749 A | 8/2018 |
| WO | 2009/078327 A1 | 6/2009 |
| WO | 2015/134537 A1 | 9/2015 |
| WO | 2018/150917 A1 | 8/2018 |

OTHER PUBLICATIONS

Extended European Search Report of EP Application No. 19916222.3, issued on Mar. 21, 2022, 08 pages.

* cited by examiner

FIG. 1A   IMAGE SOURCE
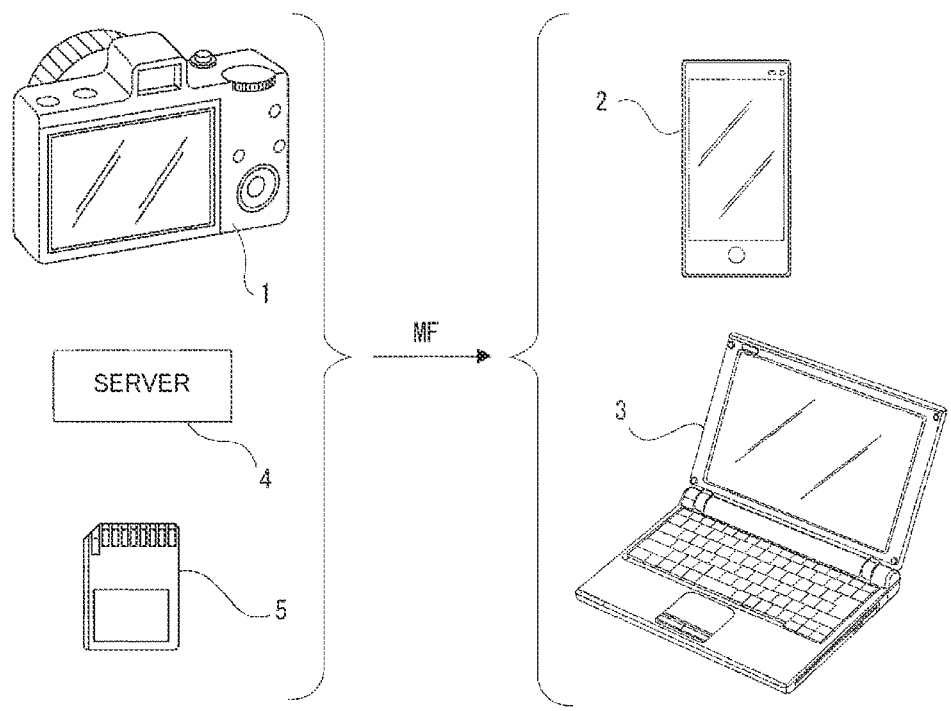
FIG. 1B   IMAGE PROCESSING DEVICE AS IMAGE SOURCE
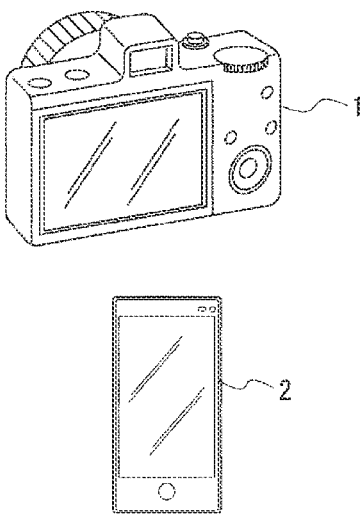

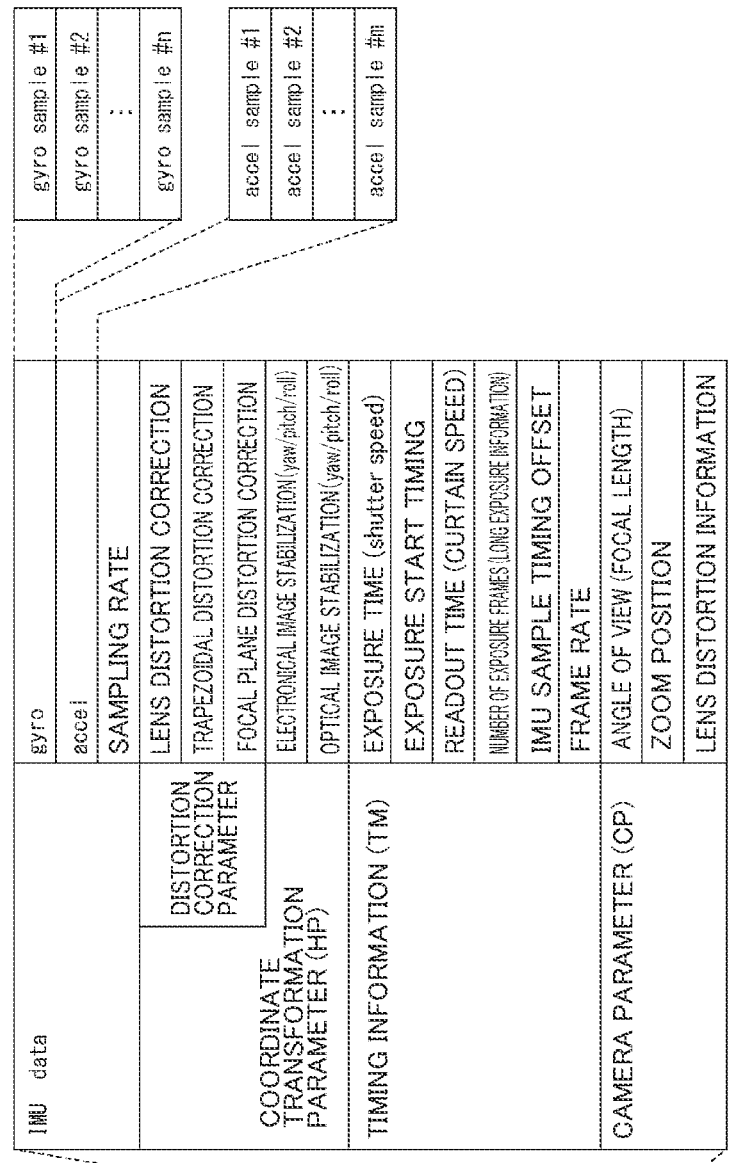
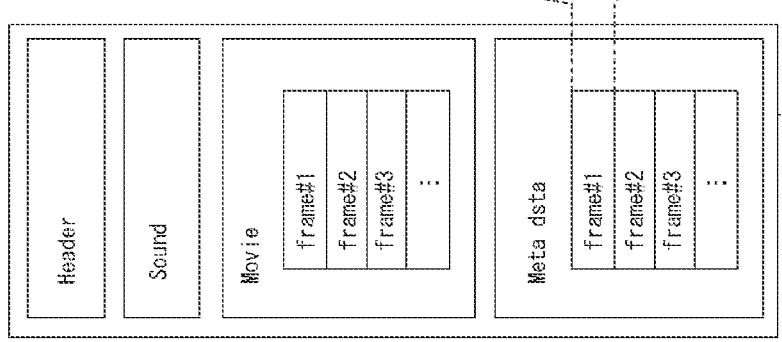
FIG. 9A
FIG. 9B
FIG. 9C

RELATIONSHIP BETWEEN IMAGER PLANE
AND INCIDENCE ANGLE

PROCESS IN OUTPUT COORDINATE PLANE

CONVERT TO
NORMALIZED SPACE

ROTATION

CALCULATION OF CELESTIAL SPHERE
CORRESPONDENCE POINTS
IN PERSPECTIVE PROJECTION

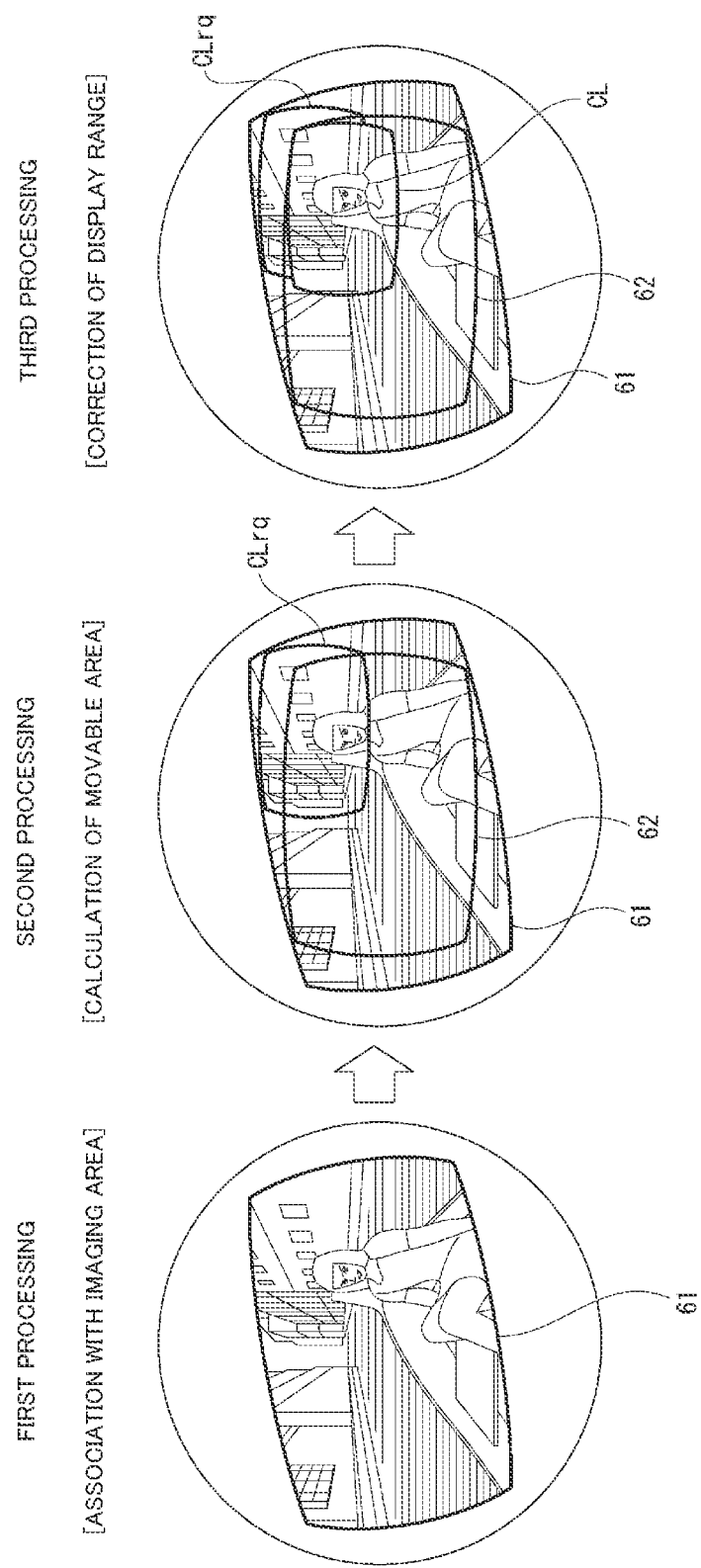

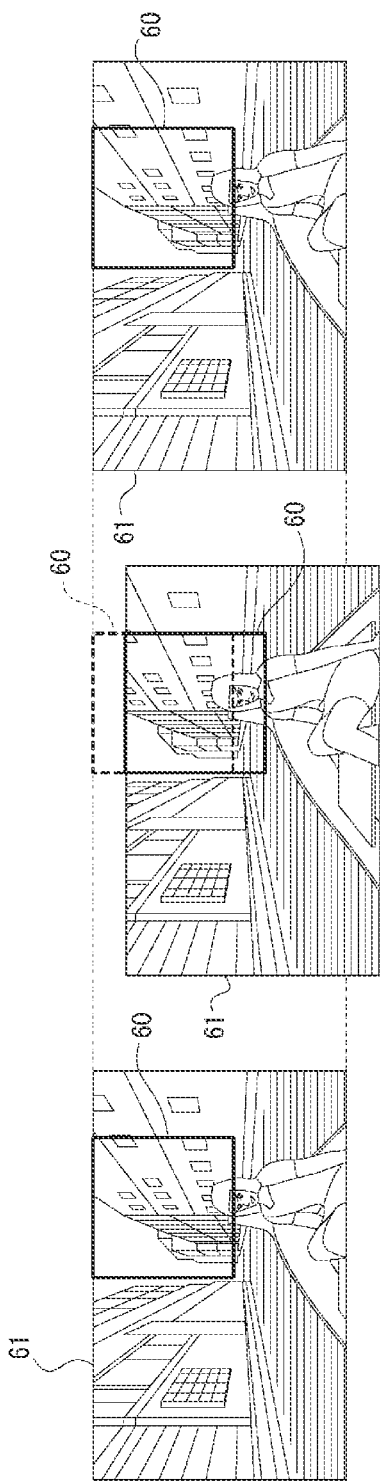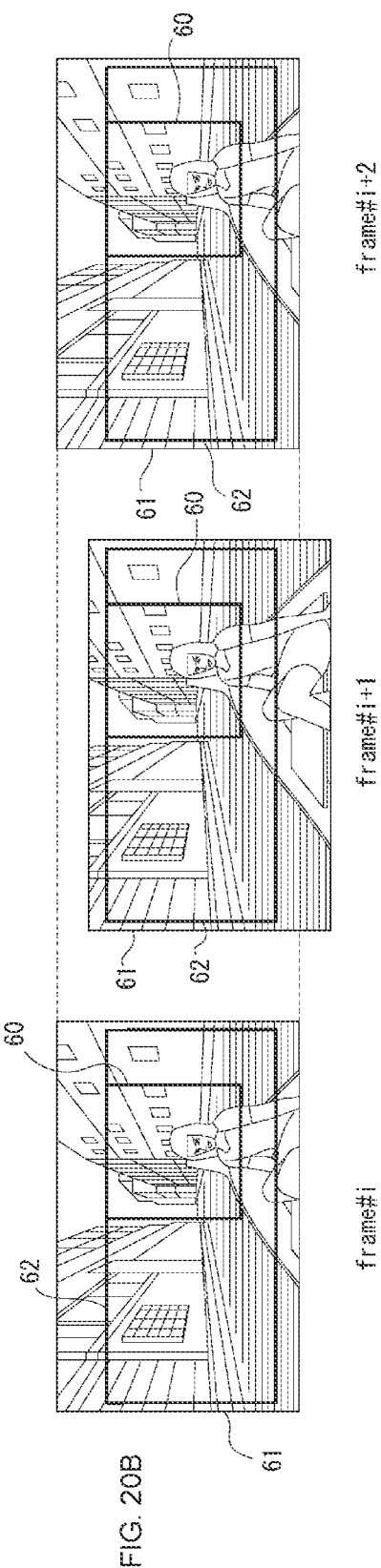

FIG. 21A
FIG. 21B
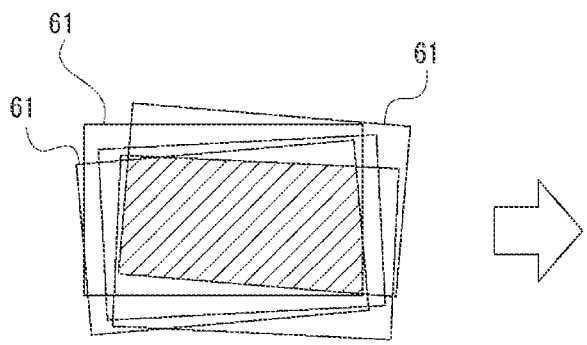
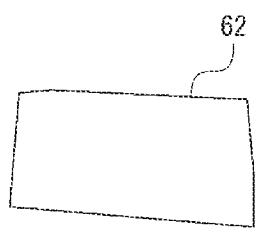
CAPTURED AREA
OF FRAME # i-m TO #i+m
AVAILABLE AREA
OF FRAME #i

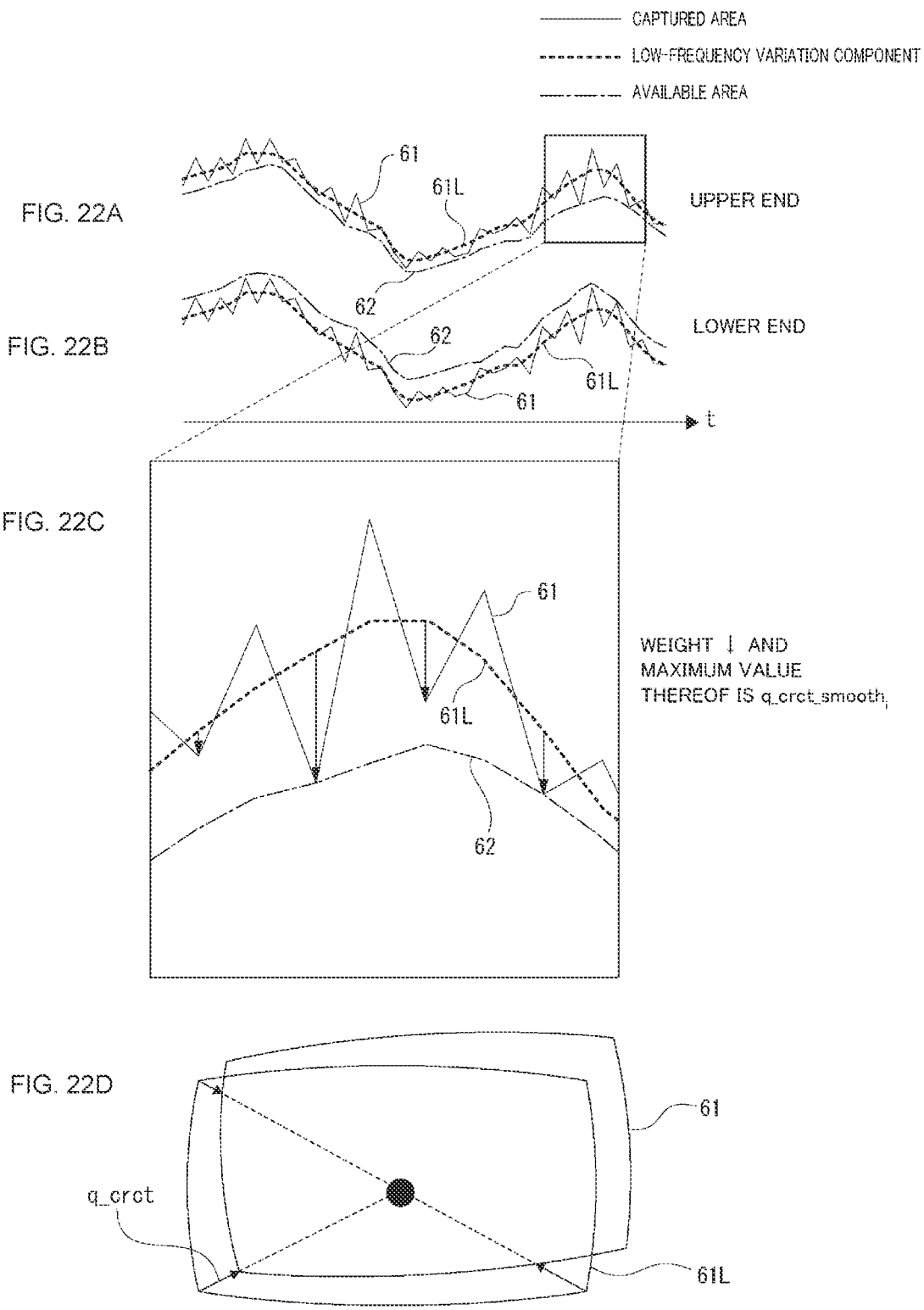

CORRECTION OF YAW AND PITCH COMPONENTS

CORRECTION OF ROLL COMPONENT

FIG. 27
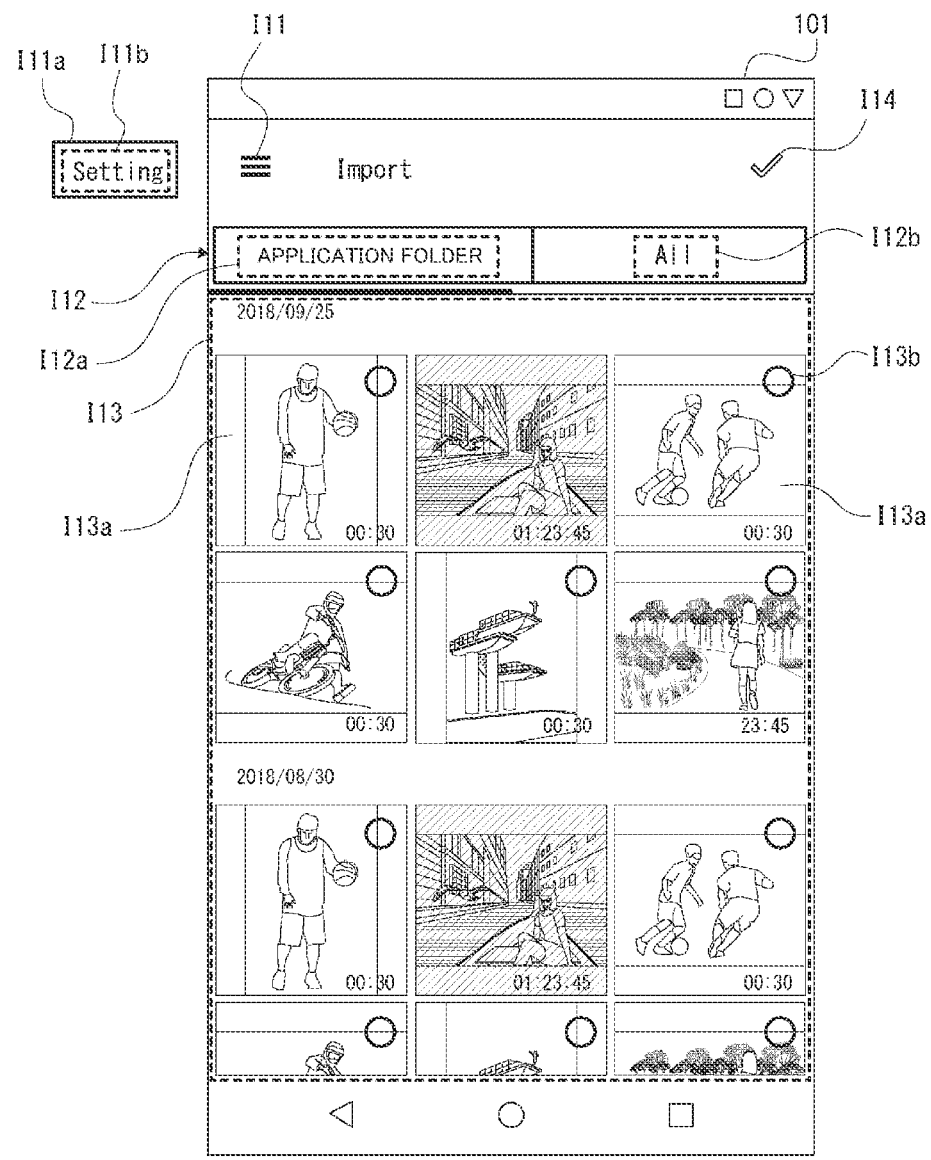
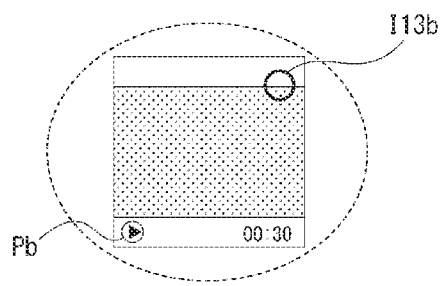

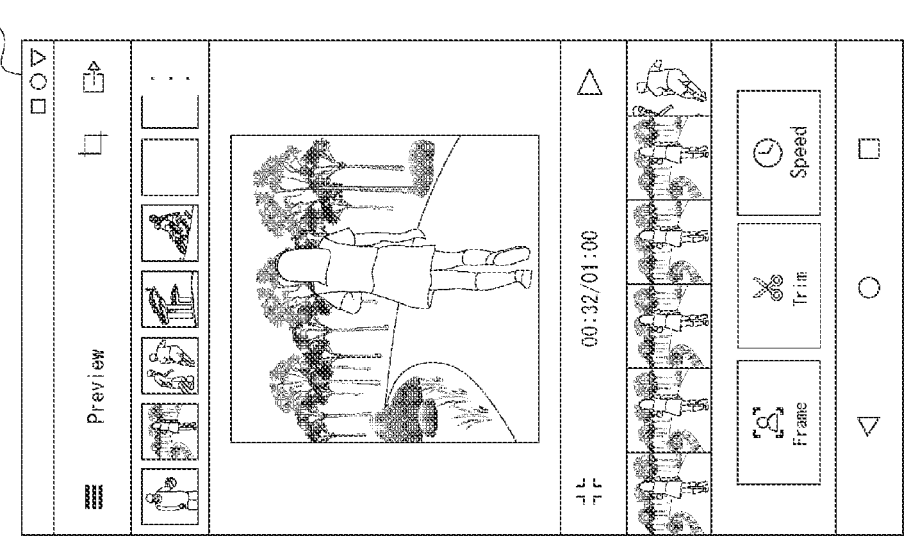
FIG. 29A
SELECTED IMAGES ARE CONCATENATED
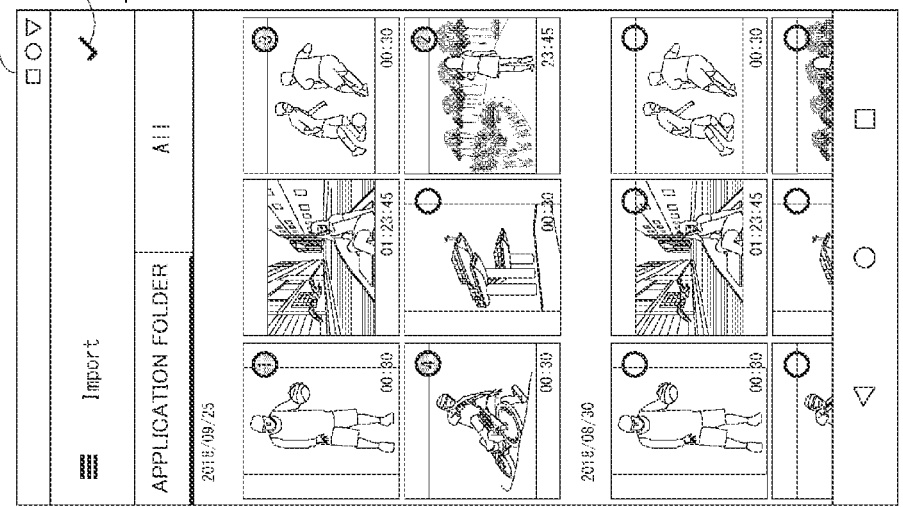
FIG. 29B

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/051153 filed on Dec. 26, 2019, which claims priority benefit of Japanese Patent Application No. JP 2019-029889 filed in the Japan Patent Office on Feb. 21, 2019. Each of the above-referenced applications is hereby incorporated herein by reference in its entirety.

TECHNICAL FIELD

The present technology relates to an information processing device, an information processing method, and a program, and particularly, to a technical field of a user interface for receiving various designations related to image processing.

BACKGROUND ART

A technology for performing various types of image processing on moving images captured by an imaging device is known.

Further, in the field of image processing, a tracking technology for tracking a target subject among subjects appearing in an image is widely known (see, for example, PTL 1 below).

CITATION LIST

Patent Literature

[PTL 1] JP 2015-111746 A

SUMMARY

Technical Problem

Incidentally, in recent years, users have been able to easily perform image capturing or image editing using mobile terminals such as smartphones or tablets, cameras themselves, personal computers, or the like, and moving image posting or the like is also popular.

In such an environment, the user may execute image processing for cropping a part of a captured image (original image) in consideration of a composition or the like, instead of outputting the captured image as it is. It is conceivable to perform such cropping of the image so that a portion of the original image in which a target subject appears is included, and in this case, it is conceivable for a device performing image processing to set a cropping range so that a target subject designated by the user is included in an image frame using a subject tracking technology, and crop an image in the set range.

Therefore, an object of the present technology is to improve a degree of freedom in image production regarding tracking of a subject.

Solution to Problem

An information processing device according to the present technology includes: a reception unit configured to receive designation of a placement position in a display area of a tracking target on a first screen in which a predetermined image is displayed in the display area.

For example, a user is allowed to designate a position (a position within the display area) in which a tracking target subject is disposed in a state in which image content can be recognized on a display screen.

In the information processing device according to the present technology described above, it is conceivable that the predetermined image be an image cropped from an original image.

That is, the image displayed in the display area is a cropped image from the original image.

In the information processing device according to the present technology described above, it is conceivable that the reception unit receive designation of the tracking target.

That is, designation of the subject as the tracking target is received from among subjects in the image.

It is conceivable that the information processing device according to the present technology described above include a display control unit configured to perform display control of the predetermined image so that the tracking target is disposed at a position within the display area based on the designated placement position. For example, an image reflecting the placement position of the tracking target subject designated by the user is displayed.

In the information processing device according to the present technology described above, it is conceivable that the reception unit receive designation of a range to be cropped from the original image.

For example, the user can designate a range of the original image included in the image frame of the cropped image on the display screen.

In the information processing device according to the present technology described above, it is conceivable that the display control unit cause an operation image to be used for the operation for designating the placement position of the tracking target to be displayed on the first screen.

For example, the operation image serving as an aim for designation of the placement position is overlapped and displayed on the display area so that the user can designate a position in the image frame using the operation image.

In the information processing device according to the present technology described above, it is conceivable that the reception unit receive the designation of the tracking target and the designation of the placement position of the tracking target on the basis of an operation with respect to the operation image.

For example, by an operation for designating a certain place with the operation image on the display area, a subject in such a portion is set as the tracking target, and the position of the operation image is received as the placement position of the tracking target.

In the information processing device according to the present technology described above, it is conceivable that the predetermined image be an image cropped from the original image, and the reception unit receive the designation of the range to be cropped from the original image and an operation regarding the tracking target using the operation image as operations with respect to the screen.

For example, the range cropped from the original image is displayed on the display screen, and the operation image is displayed on an image thereof. Change in the cropping range or movement of the operation image is received on the screen.

In the information processing device according to the present technology described above, it is conceivable that the reception unit switch between a state in which an operation on the screen is recognized as an operation for designating a range cropped from the original image and a state in which the operation is recognized as an operation regarding the tracking target using the operation image.

For example, recognition modes for a user operation performed on the screen are switched therebetween according to an operation prepared by an icon on the display screen.

In the information processing device according to the present technology described above, it is conceivable that the reception unit recognizes an operation on the screen as an operation for designating the image range to be cropped from the original image on a second screen, and recognizes the operation on the screen as an operation regarding the tracking target using the operation image on the first screen.

The recognition of the user operation performed on the screen is switched depending on whether the display screen is in the state of the first screen or the state of the second screen.

In the information processing device according to the present technology described above, it is conceivable that the display control unit performs a display for changing a range of the image serving as a cropping range according to the operation recognized by the reception unit on the second screen, and performs a display for moving a designated position using the operation image according to the operation recognized by the reception unit on the first screen.

When the display screen is the second screen, for example, the image of the cropping range is displayed in the entire screen or in the display area, but this is changed according to an operation. When the display screen is the first screen, the designated position using the operation image is moved according to an operation.

In the information processing device according to the present technology described above, it is conceivable that in the second screen, the original image changes in the display area according to an operation, and in the first screen, the placement position of the operation image in the display area changes according to an operation.

That is, image change such as movement, enlargement, reduction, and rotation of the original image occurs in the display area according to the operation on the second screen, and a change in the original image within the display area, for example, does not occur according to an operation on the first screen, but the placement position of the operation image changes.

In the information processing device according to the present technology described above, it is conceivable that the original image is one image in an image group configured of a plurality of images.

This makes it possible for the user to designate the placement position of the target subject within the image frame of the cropped image as an arbitrary position for each of images constituting the image group.

It is conceivable that the information processing device according to the present technology described above performs image cropping processing so that the tracking target is disposed at a position in the display area based on the designated placement position, on at least one image after the image for which the designation of the placement position has been received in order among a plurality of consecutive images in a predetermined order.

Accordingly, the placement position of the tracking target is designated for one among the plurality of consecutive images in the predetermined order, and image cropping processing for causing the tracking target to be located at a position based on the designated position is performed on frame images subsequently located in order.

In the information processing device according to the present technology described above, it is conceivable that the image group consist of a series of frame images constituting a moving image.

This makes it possible to allow the user to designate the placement position of the target subject within the image frame of the cropped image as an arbitrary position when image cropping is performed on each frame image constituting the moving image.

In the information processing device according to the present technology described above, it is conceivable that the reception unit receive designation of a tracking section, the tracking section being a section in which cropping from the original image is performed, so that the tracking target is disposed at a position in the display area based on the designated placement position.

This makes it possible for the user to arbitrarily designate the tracking section as well.

In the information processing device according to the present technology described above, it is conceivable that the display control unit performs control for displaying an image in a cropping range from the original image and an image outside the cropping range in different display aspects.

For example, the entire original image is displayed on the display screen, and a display aspect is such that the inside of the cropping range and the outside of the cropping range in the original image can be distinguished.

It is conceivable that the information processing device according to the present technology described above include a shake correction unit configured to perform processing of pasting to a virtual celestial spherical surface for each frame of image data constituting the moving image, and perform shake correction using posture information corresponding to the frame; and a cropping range setting unit configured to perform protrusion prevention processing for performing correction so that a cropping range according to designation of the cropping range received by the reception unit does not protrude from an area in which the shake correction is effectively maintained, wherein the display control unit performs control of a display of the cropped image reflecting the protrusion prevention processing performed by a cropping range setting unit.

For example, shake caused by, for example, camera shake in the image captured by the imaging device is corrected through coordinate transformation on the virtual celestial spherical surface, and the cropping range of the image subjected to this shake correction and projected onto the plane is set on the basis of an operation of the user. In this case, the protrusion prevention processing is performed so that the cropping range does not exceed the range in which the shake correction is effectively maintained. The display control unit performs display control so that the user can recognize a cropping range of a range that is restricted through this protrusion prevention processing.

In the information processing device according to the present technology described above, it is conceivable that the display control unit perform control so that a display based on an allowed movement range set in the protrusion prevention processing is performed, a variation in the cropping range of the image being allowed in the allowed movement range.

The protrusion prevention processing is processing of causing the cropping range set on the basis of the operation information to be accommodated in the range in which the shake correction is effective, and in this case, the allowed movement range is set as the range in which the shake correction is effectively maintained. That is, the cropping range is allowed to be moved as long as the range is in the allowed movement range. On the display, a display is performed so that the user can recognize this allowed movement range.

In the information processing device according to the present technology described above, it is conceivable that the display control unit perform control so that a display for specifying that an operation for designating the cropping range, the operation exceeding the allowed movement range, is restricted is performed. For example, when the cropping range exceeds the allowed movement range, a display making it impossible to change the cropping range or causing the cropping range to return to the allowed movement range is executed.

An information processing method according to the present technology includes: performing, by an information processing device, processing of receiving designation of a placement position in a display area of a tracking target on a first screen in which a predetermined image is displayed in the display area.

Accordingly, a user is allowed to designate a position (a position within the display area) in which a tracking target subject is disposed in a state in which image content can be recognized on a display screen.

A program according to the present technology is a program causing an information processing device to execute processing corresponding to such an information processing method.

Accordingly, the processing related to the present technology can be executed by various information processing devices.

BRIEF DESCRIPTION OF DRAWINGS

FIGS. 1A and 1B are illustrative diagrams of a device that is used in an embodiment of the present technology.

FIGS. 9A, 9B, and 9C are illustrative diagrams of content of an image file and metadata of the embodiment.

FIG. 19 is an illustrative diagram of an overview of protrusion prevention processing according to the embodiment.

FIGS. 20A and 20B are illustrative diagrams of calculation of an available area in the protrusion prevention processing of the embodiment.

FIGS. 21A and 21B are illustrative diagrams of a method of creating an available area of the embodiment.

FIGS. 22A, 22B, 22C, and 22D are illustrative diagrams of a method of creating an available area of the embodiment.

FIG. 27 is a diagram illustrating an example of an import screen.

FIGS. 29A and 29B are diagrams illustrating screen transition at the time of image import in the embodiment.

DESCRIPTION OF EMBODIMENTS

Figure 2:
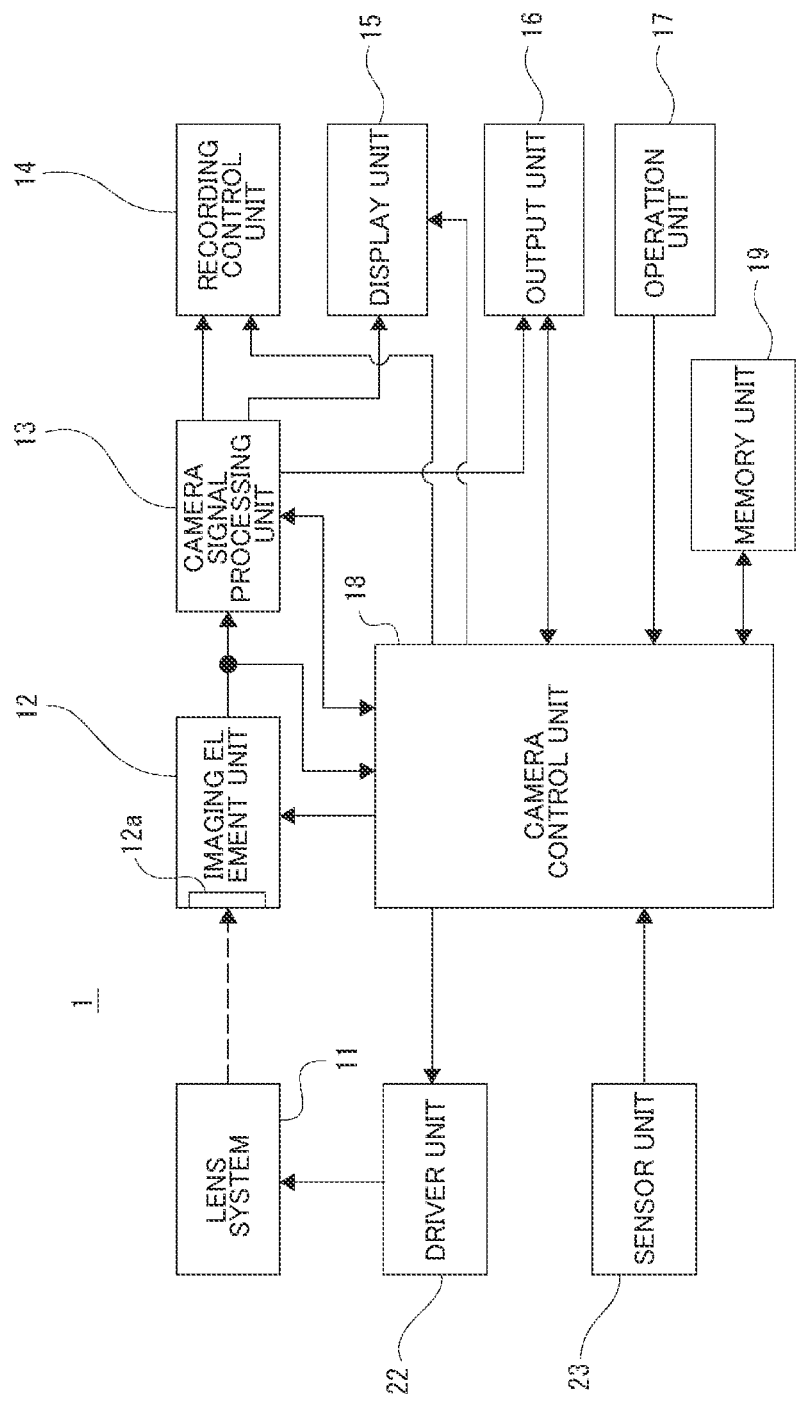
FIG. 2 is a block diagram of an imaging device of the embodiment.

Hereinafter, embodiments will be described in the following order.

<1. Configuration of device applicable as image processing device>
<2. Image file and metadata>
<3. Overview of screen transition>
<4. Image processing>
<5. Conclusion and modification examples of image processing>
<6. UI for image processing>
<7. Processing related to UI>
<8. Modification example of UI>
<9. Conclusions regarding UI>
10. <Program>
<11. <Present technology>

<1. Configuration of Device Applicable as Image Processing Device>

In the following embodiment, an example in which an image processing device according to the present technology is realized mainly by a mobile terminal such as a smartphone will be described, but the image processing device can be realized in various devices. First, devices to which the present technology can be applied will be described.

FIG. 1A illustrates an example of an image source and an image processing device that acquires an image file MF from the image source.

An imaging device 1, a server 4, a recording medium 5, and the like are assumed as the image sources.

A mobile terminal 2 such as a smartphone, a personal computer 3, or the like is assumed as the image processing device.

The imaging device 1 as the image source is, for example, a digital camera capable of performing moving image capturing, and transfers an image file MF obtained by the moving image capturing to the mobile terminal 2 or the personal computer 3 via wired communication or wireless communication.

The server 4 may be any one of a local server, a network server, a cloud server, and the like, but refers to a device capable of providing the image file MF captured by the imaging device 1. It is conceivable that the server 4 transfer the image file MF to the mobile terminal 2 or the personal computer 3 via any transmission path.

The recording medium 5 may be any one of a solid-state memory such as a memory card, a disc-form recording medium such as an optical disc, a tape-form recording medium such as a magnetic tape, and the like, but refers to a removable recording medium in which the moving image file MF captured by the imaging device 1 is recorded. It is conceivable that the moving image file MF read from the recording medium 5 be read by the mobile terminal 2 or the personal computer 3.

The mobile terminal 2 or the personal computer 3 as the image processing device can perform image processing on the image file MF acquired from the above image source. The image processing referred to herein includes, for example, shake correction processing, cropping area setting processing, and effective cropping area image generation processing.

The shake correction processing is shake correction processing that is performed using posture information corresponding to a frame of image data constituting a moving image after processing of pasting to a celestial sphere model is performed on each frame.

The cropping area setting processing is processing of setting a cropping area of an image on the basis of information on an operation of the user and then performing protrusion prevention processing for performing correction so that the cropping area does not protrude from an area in which shake correction is effectively maintained. The effective cropping area image generation processing is processing for cropping an image in a cropping area (an effective cropping area CL) obtained by performing protrusion prevention processing on an image projected onto a plane in a state in which shake correction processing has been performed, to generate an effective cropping area image. The cropped image can be an output image.

A certain mobile terminal 2 or personal computer 3 may serve as an image source for another mobile terminal 2 or personal computer 3 that functions as an image processing device.

FIG. 1B illustrates the imaging device 1 and the mobile terminal 2 in a case in which one device functioning as an image processing device also serves as the image source.

For example, a microcomputer or the like inside the imaging device 1 performs the above image processing. That is, the imaging device 1 can perform the above image processing as it is on the image file MF generated by the imaging and perform image output as an image processing result.

The same applies to the mobile terminal 2, and since the mobile terminal 2 can be an image source by including an imaging function, the mobile terminal 2 can perform the above image processing on the image file MF generated by imaging and perform image output as an image processing result.

Of course, the present technology is not limited to the imaging device 1 or the mobile terminal 2, and various other devices that can serve as an image processing device also serving as an image source are conceivable.

There are various devices and image sources functioning as the image processing device of the embodiment as described above, but hereinafter, an example in which the imaging device 1 is the image source and the mobile terminal 2 is the image processing device will be described. That is, this example is an example in which the image file MF formed by the imaging in the imaging device 1 is transferred to the mobile terminal 2, and the acquired image file MF is subjected to image processing in the mobile terminal 2.

First, a configuration example of the imaging device 1 serving as an image source will be described with reference to FIG. 2.

As described in FIG. 1B, when it is assumed that the image file MF captured by the mobile terminal 2 is subjected to image processing in the mobile terminal 2, the mobile terminal 2 may have the same configuration as the following imaging device 1 in terms of an imaging function.

As illustrated in FIG. 2, the imaging device 1 includes a lens system 11, an imaging element unit 12, a camera signal processing unit 13, a recording control unit 14, a display unit 15, an output unit 16, an operation unit 17, a camera control unit 18, a memory unit 19, a driver unit 22, and a sensor unit 23.

The lens system 11 includes, for example, lenses such as a cover lens, a zoom lens, and a focus lens, and an aperture mechanism. Light (incident light) from a subject is guided by the lens system 11 and condensed on the imaging element unit 12. Although not illustrated, an optical image stabilization mechanism that corrects shake (interframe shake) and blur of an image due to camera shake or the like may be provided in the lens system 11.

The imaging element unit 12 includes, for example, an image sensor 12a (an imaging element), such as a complementary metal oxide semiconductor (CMOS) type or charge coupled device (CCD) type image sensor.

This imaging element unit 12 executes, for example, correlated double sampling (CDS) processing, automatic gain control (AGC) processing, and the like for an electrical signal obtained by photoelectric conversion of light received by the image sensor 12a, and further performs analog/digital (A/D) conversion processing. An imaging signal as digital data is output to the camera signal processing unit 13 or the camera control unit 18 in a subsequent stage.

An optical image stabilization mechanism (not illustrated) is, for example, a mechanism for correcting shake of an image by moving the image sensor 12a instead of the lens system 11, or a spatial optical image stabilization mechanism using a gimbal (a balanced optical image stabilization mechanism), and any scheme may be used.

In the optical image stabilization mechanism, blur in the frame is also corrected as will be described below in addition to shake (interframe shake).

The camera signal processing unit 13 is configured as an image processing processor by, for example, a digital signal processor (DSP). The camera signal processing unit 13 performs various types of signal processing on a digital signal (a captured image signal) from the imaging element unit 12. For example, the camera signal processing unit 13 performs preprocessing, simultaneous processing, YC generation processing, resolution conversion processing, codec processing, and the like as camera processing.

Further, the camera signal processing unit 13 performs various types of correction processing. However, it is assumed that image stabilization may or may not be performed in the imaging device 1.

In the preprocessing, clamping processing for clamping black levels of R, G, and B to a predetermined level, processing for correction between the color channels of R, G, and B, or the like is performed on the captured image signal from the imaging element unit 12.

In the simultaneous processing, color separation processing is performed so that image data for each pixel has all color components of R, G, and B. For example, in the case of an imaging element using color filters in a Bayer array, demosaic processing is performed as the color separation processing.

In the YC generation processing, a luminance (Y) signal and a color (C) signal are generated (separated) from image data of R, G, and B.

In the resolution conversion processing, resolution conversion processing is executed for the image data subjected to various types of signal processing.

Figure 3:
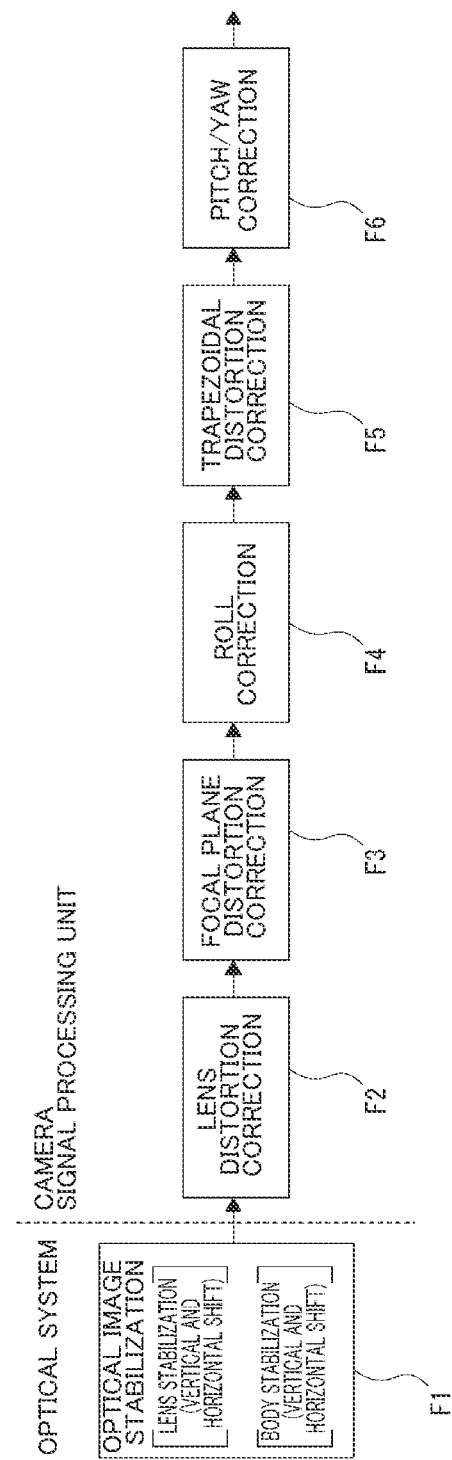
FIG. 3 is an illustrative diagram of image correction processing in the imaging device of the embodiment.

An example of various types of correction processing (internal correction of the imaging device 1) that is performed by the camera signal processing unit 13 is illustrated in FIG. 3. In FIG. 3, the optical image stabilization that is performed by the lens system 11 and the correction processing that is performed by the camera signal processing unit 13 are illustrated in execution order.

In the optical image stabilization as processing F1, in-lens image stabilization due to shifting in a yaw direction and a pitch direction of the lens system 11 or in-body image stabilization due to shifting in the yaw direction and the pitch direction of the image sensor 12a is performed so that an image of the subject is formed on the image sensor 12a in a state in which an influence of camera shake is physically canceled out. One or both of the in-lens image stabilization and the in-body image stabilization may be used. When both of the in-lens image stabilization and the in-body image stabilization are used, it is conceivable that in the in-body image stabilization, shifting in the yaw direction and the pitch direction is not performed. Further, neither the in-lens image stabilization nor the in-body image stabilization may be adopted, and for image stabilization, only electronic image stabilization or only optical image stabilization may be performed.

In the camera signal processing unit 13, processing from processing F2 to processing F7 is performed through spatial coordinate transformation for each pixel.

In processing F2, lens distortion correction is performed.

In processing F3, the focal plane distortion correction is performed as one element of the electric image stabilization. This, for example, corrects distortion in a case in which reading using a rolling shutter scheme is performed by the CMOS type image sensor 12a.

Roll correction is performed in processing F4. That is, correction of a roll component is performed as one element of the electric image stabilization.

In processing F5, trapezoidal distortion correction is performed on a trapezoidal distortion amount caused by the electric image stabilization. The trapezoidal distortion amount caused by the electric image stabilization is perspective distortion caused by cropping a place away from a center of the image.

In processing F6, shifting or cropping in the pitch direction and the yaw direction is performed as one element of the electric image stabilization.

For example, the image stabilization, the lens distortion correction, and the trapezoidal distortion correction are performed by the above procedure.

It is not essential to perform all of the processing listed here, and an order of the processing may be changed appropriately.

In the codec processing in the camera signal processing unit 13, coding processing for recording or communication, and file generation, for example, are performed on the image data subjected to the various types of processing. For example, generation of an image file MF in an MP4 format used for recording an MPEG-4 compliant moving image/audio is performed. It is also conceivable to perform generation of a file in a format such as Joint Photographic Experts Group (JPEG), Tagged Image File Format (TIFF), or Graphics Interchange Format (GIF) as a still image file.

The camera signal processing unit 13 also performs generation of metadata to be added to the image file MF using, for example, information from the camera control unit 18.

Further, although an audio processing system is not illustrated in FIG. 2, in fact, an audio recording system and an audio processing system are included, and the image file MF may include audio data together with image data serving as a moving image.

The image data has a preset aspect ratio, and all frames of the image data correspond to an imaged area (captured area) to be described below.

The recording control unit 14 performs, for example, recording and playback on a recording medium using a non-volatile memory. The recording control unit 14 performs processing of recording the image file MF such as moving image data or still image data, a thumbnail image, or the like on the recording medium, for example.

An actual form of the recording control unit 14 can be considered in various ways. For example, the recording control unit 14 may be configured as a flash memory and a writing/reading circuit thereof built into the imaging device 1, or may be in the form of a card recording/playback unit that performs recording and playback access for a recording medium that can be attached to and detached from the imaging device 1, such as a memory card (a portable flash memory, or the like). Further, the recording control unit 14 may be realized as a hard disk drive (HDD) or the like as a form built into the imaging device 1.

The display unit 15 is a display unit that performs various displays to an imaging person, and is, for example, a display panel or viewfinder using on a display device such as a liquid crystal panel (LCD: Liquid Crystal Display) or an organic electro-luminescence (EL) display disposed in a housing of the imaging device 1.

The display unit 15 causes various displays to be executed on the display screen on the basis of an instruction of the camera control unit 18.

For example, the display unit 15 causes the recording control unit 14 to display a playback image of the image data read from the recording medium.

Further, image data of the captured image of which a resolution has been converted for a display by the camera signal processing unit 13 may be supplied to the display unit 15, and the display unit 15 may perform a display on the basis of the image data of the captured image in response to an instruction from the camera control unit 18. Accordingly, a so-called through image (a monitoring image of a subject), which is a captured image that is being subjected to composition confirmation, is displayed.

Further, the display unit 15 causes a display of various operation menus, icons, messages, or the like, that is, a graphical user interface (GUI) to be executed on the screen on the basis of the instruction of the camera control unit 18.

The output unit 16 performs data communication or network communication with an external device by wire or wirelessly.

For example, captured image data (still image file or moving image file) is transmitted and output to an external display device, recording device, playback device, or the like.

Further, the output unit 16 is a network communication unit, and may perform, for example, communication based on various networks such as the Internet, a home network, and a local area network (LAN), and perform transmission or reception of various pieces of data to or from a server, a terminal, or the like on the network.

The operation unit 17 collectively indicates an input device allowing the user to perform various operation inputs. Specifically, the operation unit 17 indicates various operators (keys, a dial, a touch panel, a touch pad, or the like) provided in the housing of the imaging device 1.

The operation of the user is detected by the operation unit 17, and a signal according to the input operation is sent to the camera control unit 18.

The camera control unit 18 is configured of a microcomputer (arithmetic processing device) including a central processing unit (CPU).

The memory unit 19 stores information or the like that the camera control unit 18 uses for processing. As the illustrated memory unit 19, for example, a read only memory (ROM), a random access memory (RAM), a flash memory, and the like are comprehensively shown.

The memory unit 19 may be a memory area built into the microcomputer chip serving as the camera control unit 18, or may be configured of a separate memory chip.

The camera control unit 18 executes a program stored in the ROM, flash memory, or the like of the memory unit 19 to control the entire imaging device 1.

For example, the camera control unit 18 controls operations of respective necessary units with respect to, for example, control of a shutter speed of the imaging element unit 12, an instruction for various types of signal processing in the camera signal processing unit 13, an imaging operation or a recording operation according to a user operation, a playback operation of recorded image files, an operation of the lens system 11 such as zoom, focus, and aperture adjustments in a lens barrel, and an operation of a user interface.

The RAM in the memory unit 19 is used for temporary storage of data, programs, and the like as a work area when various types of data processing of the CPU of the camera control unit 18 are performed.

The ROM or flash memory (a nonvolatile memory) in the memory unit 19 is used for storage of an operating system (OS) allowing the CPU to control each unit, content files such as image files, application programs for various operations, firmware, and the like.

A motor driver for a zoom lens drive motor, a motor driver for a focus lens drive motor, and a motor driver for an aperture mechanism motor, for example, are provided in the driver unit 22.

These motor drivers apply a drive current to the corresponding driver in response to an instruction from the camera control unit 18, to execute movement of a focus lens and zoom lens, opening and closing of aperture blades of the aperture mechanism, and the like.

The sensor unit 23 comprehensively indicates various sensors mounted in the imaging device.

The sensor unit 23 has, for example, an inertial measurement unit (IMU) mounted therein and detects, for example, an angular velocity using an angular velocity (gyro) sensor for three axes of pitch, yaw, and roll, and detects an acceleration using an acceleration sensor.

Further, a position information sensor, an illuminance sensor, or the like may be mounted as the sensor unit 23.

For example, the image file MF as a moving image captured and generated by the above imaging device 1 can be transferred to an image processing device such as the mobile terminal 2 and subjected to image processing.

Figure 4:
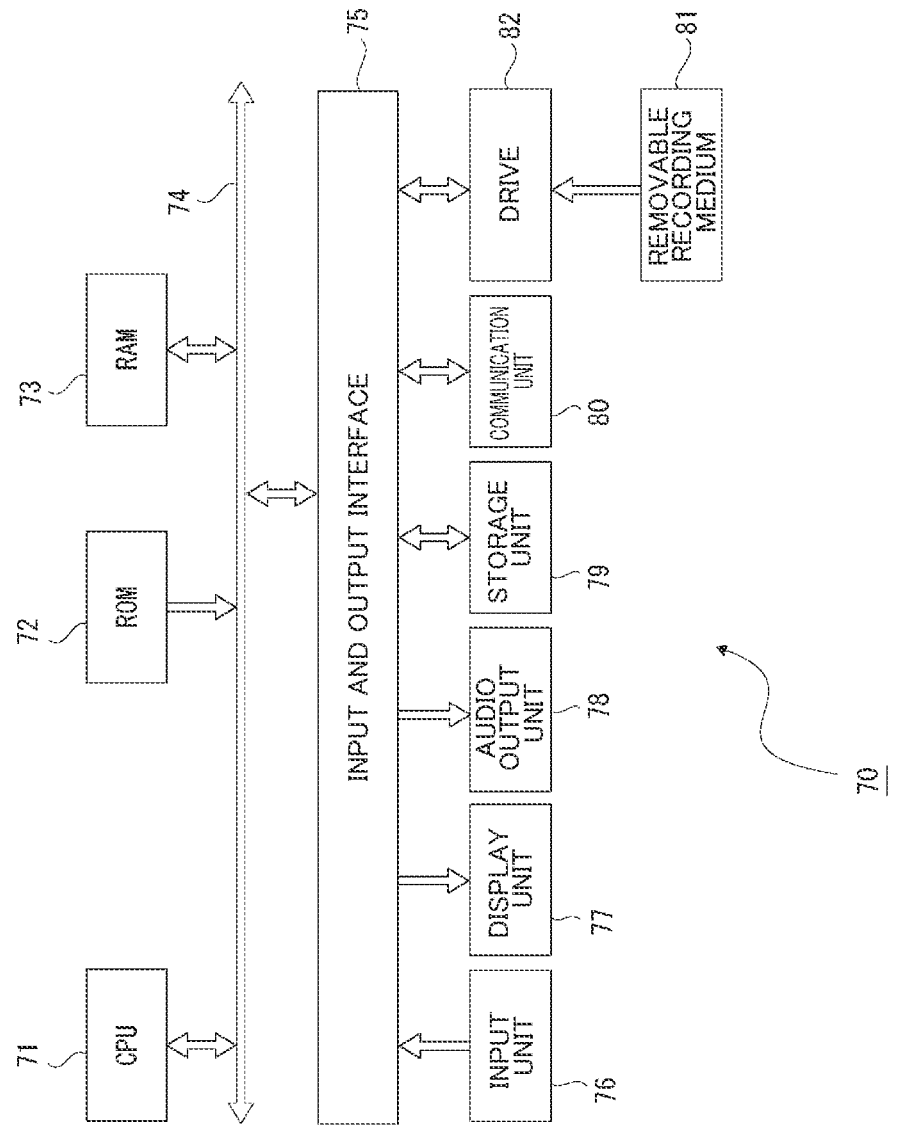
FIG. 4 is a block diagram of an information processing device of the embodiment.

The mobile terminal 2 can be realized as an information processing device having the configuration illustrated in FIG. 4, for example. Similarly, the personal computer 3 or the server 4 can also be realized by the information processing device having the configuration illustrated in FIG. 4.

In FIG. 4, a CPU 71 of an information processing device 70 executes various types of processing according to a program stored in a ROM 72 or a program loaded from a storage unit 79 into a RAM 73. The RAM 73 also appropriately stores data and the like necessary for the CPU 71 to execute various types of processing.

The CPU 71, ROM 72, and RAM 73 are connected to each other via a bus 74. An input and output interface 75 is also connected to the bus 74.

An input unit 76 including an operator or an operation device is connected to the input and output interface 75.

For example, various operators or operation devices such as a keyboard, mouse, keys, dial, touch panel, touch pad, and remote controller are assumed as the input unit 76.

An operation of the user is detected by the input unit 76, and a signal corresponding to the input operation is interpreted by the CPU 71.

Further, a display unit 77 configured of an LCD, an organic EL panel, or the like and an audio output unit 78 configured of a speaker or the like are connected to the input and output interface 75 as one body or separate bodies.

The display unit 77 is a display unit that performs various displays, and is configured of, for example, a display device provided in the housing of the information processing device 70, or, for example, a separate display device connected to the information processing device 70.

The display unit 77 executes a display of various images for image processing, a moving image that is a processing target, and the like on the display screen on the basis of an instruction of the CPU 71. Further, the display unit 77 displays various operation menus, icons, messages, or the like, that is, a graphical user interface (GUI) on the basis of an instruction of the CPU 71.

The storage unit 79 configured of a hard disk, a solid-state memory, or the like, or a communication unit 80 configured of a modem or the like may be connected to the input and output interface 75.

The communication unit 80 performs communication processing via a transmission line such as the Internet, and performs communication with various devices using wired/wireless communication, bus communication, or the like.

A drive 82 is also connected to the input and output interface 75 as necessary, and a removable recording medium 81 such as a magnetic disk, an optical disc, a magneto-optical disc, or a semiconductor memory is appropriately mounted in the drive 82.

Using the drive 82, it is possible to read data files such as an image file MF or various computer programs from the removable recording medium 81. The read data file is stored in the storage unit 79 or an image or audio included in the data file are output by the display unit 77 or the audio output unit 78. Further, the computer program or the like read from the removable recording medium 81 is installed in the storage unit 79, as necessary.

In the information processing device 70, for example, software for image processing in the image processing device of the present disclosure can be installed via network communication using the communication unit 80 or via the removable recording medium 81. Alternatively, the software may be stored in the ROM 72, the storage unit 79, or the like in advance.

Figure 5:
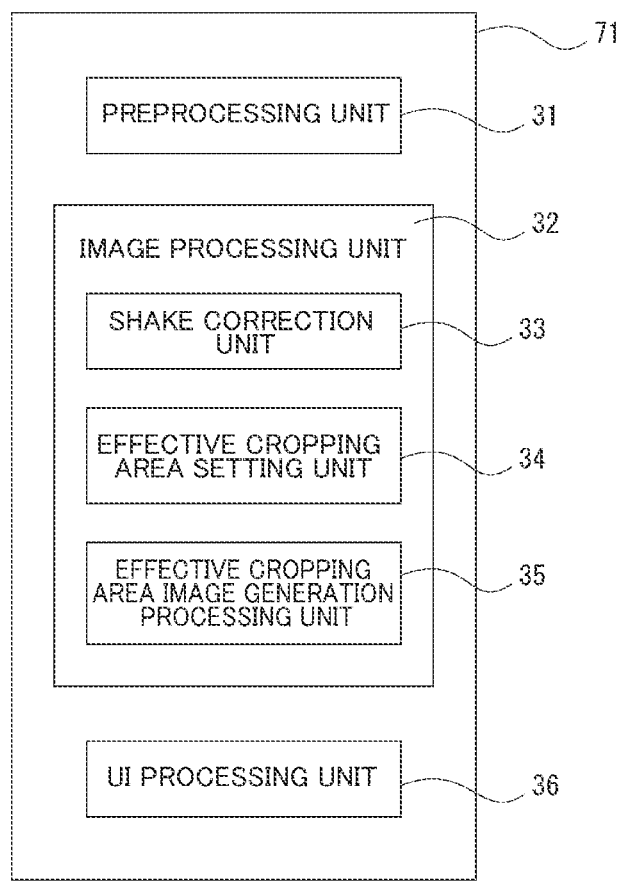
FIG. 5 is an illustrative diagram of a functional configuration of an image processing device of the embodiment.

For example, using such software (application program), a functional configuration as illustrated in FIG. 5 is constructed in the CPU 71 of the information processing device 70.

That is, the information processing device 70 (CPU 71) has functions of a preprocessing unit 31, an image processing unit 32, and a UI processing unit 36.

The preprocessing unit 31 has, for example, a function of performing import of the image file MF constituting the moving image generated by the imaging device 1 and preprocessing at the time of the import.

In the present specification, the "import" refers to the fact that, for example, an image file MF that is allowed to be accessed due to the information processing device 70 storing the image file MF in, for example, the storage unit 79 is set as an image processing target, and means performing preprocessing for image processing. For example, import does not mean transferring from the imaging device 1 to the mobile terminal 2.

The preprocessing unit 31 imports the image file MF designated by the user operation or the like so that the image file MF becomes the image processing target, and also performs processing regarding the metadata added to the image file MF as preprocessing. For example, the preprocessing unit 31 performs processing of extracting and storing the metadata corresponding to each frame of the moving image.

The image processing unit 32 has a function of performing image processing on the imported image file MF. The function of the image processing unit 32 includes functions of a shake correction unit 33, an effective cropping area setting unit 34, and an effective cropping area image generation processing unit 35 as illustrated in FIG. 5.

The shake correction unit 33 has a function of performing shake correction using posture information corresponding to the frame for each frame serving as image data constituting a moving image as the image file MF. For example, the shake correction unit 33 performs shake correction in a state in which pasting processing from a plane model to a celestial sphere model has been performed for each frame. That is, at the time of capturing an image as an image file MF, a subject image is projected onto a plane, but the shake correction is performed in a state in which the subject image is projected onto the celestial sphere model.

Here, the "shake" to be corrected refers to a vibration of the image due to a motion of the imaging device 1 that has captured the image file MF, and in particular, refers to a vibration component generated between the frames (shake of the image between the frames). "(Inter-frame) shake correction" refers to correcting shake that appears as such vibration between frames. The electric image stabilization based on shifting or cropping scheme described above is included in "shake correction". Further, in the above-described optical image stabilization, "interframe shake correction" and "blur correction" are performed at the same time. When the imaging element unit 12 includes the CMOS type image sensor 12a using a rolling shutter scheme mounted therein, amounts of shake and blur differ for each line.

The effective cropping area setting unit 34 sets the effective cropping area of the image on the basis of the information on the operation of the user, information on a tracking target, and the like. The effective cropping area setting unit 34 includes a function of performing protrusion prevention processing for correcting the cropping area so that the cropping area does not protrude from the area in which the shake correction is effectively maintained.

The setting of the effective cropping area is not limited to the setting of a fixed cropping area according to the operation of the user, and the setting of the effective cropping area may be performed to include the tracking target according to the designation of the tracking target of the user.

In this case, the effective cropping area setting unit 34 also performs processing of specifying a position of the tracking target in each frame of the moving image through image analysis, inter-frame comparison, or the like.

The effective cropping area image generation processing unit 35 has a function of performing cropping processing on an output image that is an image of the effective cropping area designated by the effective cropping area setting unit 34 from the image projected onto the plane from a virtual spherical surface of the celestial sphere model in a state in which the shake correction unit 33 performs the shake correction.

The UI processing unit 36 has a function of performing, for example, reception of a user operation for import or image processing, and control of a display output according to the processing.

As illustrated, the UI processing unit 36 includes a reception unit 36a and a display control unit 36b. The reception unit 36a mainly performs reception of a user operation for image processing, and the display control unit 36b mainly performs display control according to the processing that is executed on the basis of the user operations for image processing.

The UI processing unit 36 performs reception of the user operations or display control using the reception unit 36a or the display control unit 26b through respective screens such as an import screen, a preview screen, a framing screen, a trimming screen, a speed screen, an aspect ratio setting screen, and an export screen, which will be described below.

Details of the processing that is executed as the reception unit 36a or the display control unit 36b by the CPU 71 will be described below.

Figure 6:
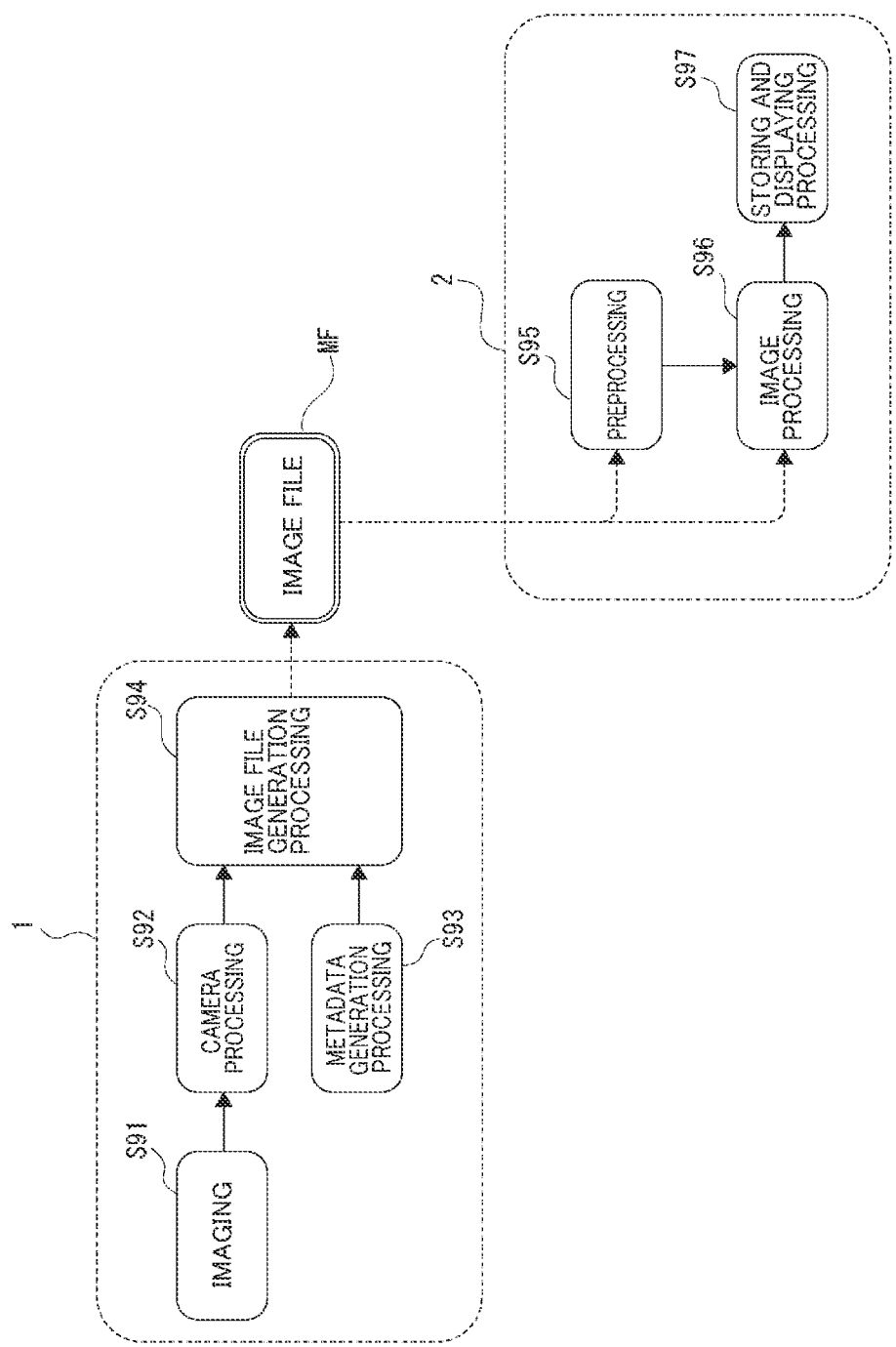
FIG. 6 is an illustrative diagram of an example of a flow of processing of the embodiment.

Details of the processing using the functions in FIG. 5 above will be described below. For example, processing in a flow as illustrated in FIG. 6 is performed by the imaging device 1 and the mobile terminal 2 corresponding to the information processing device 70 having the functions in FIG. 5.

The imaging device 1 performs imaging (step S91), camera processing (step S92), metadata generation processing (step S93), and image file generation processing (step S94).

The imaging in step S91 indicates an output of a captured image signal (RAW data output) in the imaging element unit 12.

The camera processing in step S92 is so-called development processing, and includes the various types of signal processing described above, which are performed on the captured image signal by the camera signal processing unit 13. The camera processing includes various types of correction processing described with reference to FIG. 3.

Further, the metadata generation processing of step S93 is, for example, processing of generating metadata associated with an image according to IMU data obtained by the sensor unit 23 or a camera control signal, and is performed in the camera signal processing unit 13 or the camera control unit 18.

In the camera signal processing unit 13, the image file generation processing of step S94 is performed to generate an image file including the image data subjected to the camera processing of step S92 and the metadata generated through the metadata generation processing of step S93, and the image file MF is generated.

The image file MF is acquired by the mobile terminal 2 via some route as described above.

In the mobile terminal 2, the image file MF is set as an image processing target, and storage and management of the metadata associated with each frame are performed as preprocessing (step S95) at the time of importing the image file MF. Further, the image processing in step S96 can be performed on the image file MF imported and subjected to preprocessing at any point in time. In this image processing, the shake correction of the shake correction unit 33, setting of the effective cropping area in the effective cropping area setting unit 34, and plane projection and cropping processing in the effective cropping area image generation processing unit 35, and the like are performed.

Storing and displaying processing is performed as step S97 in order to display or store a progress or result of the image processing.

According to such a flow, the user can perform image processing and perform playback, storing, uploading, and the like on the moving image captured by the imaging device 1, using the mobile terminal 2.

When the imaging device 1 has an image processing function of the image processing device of the present disclosure as illustrated in FIG. 1B, the camera control unit 18 or the camera signal processing unit 13 may include the functions as illustrated in FIG. 5.

Figure 7:
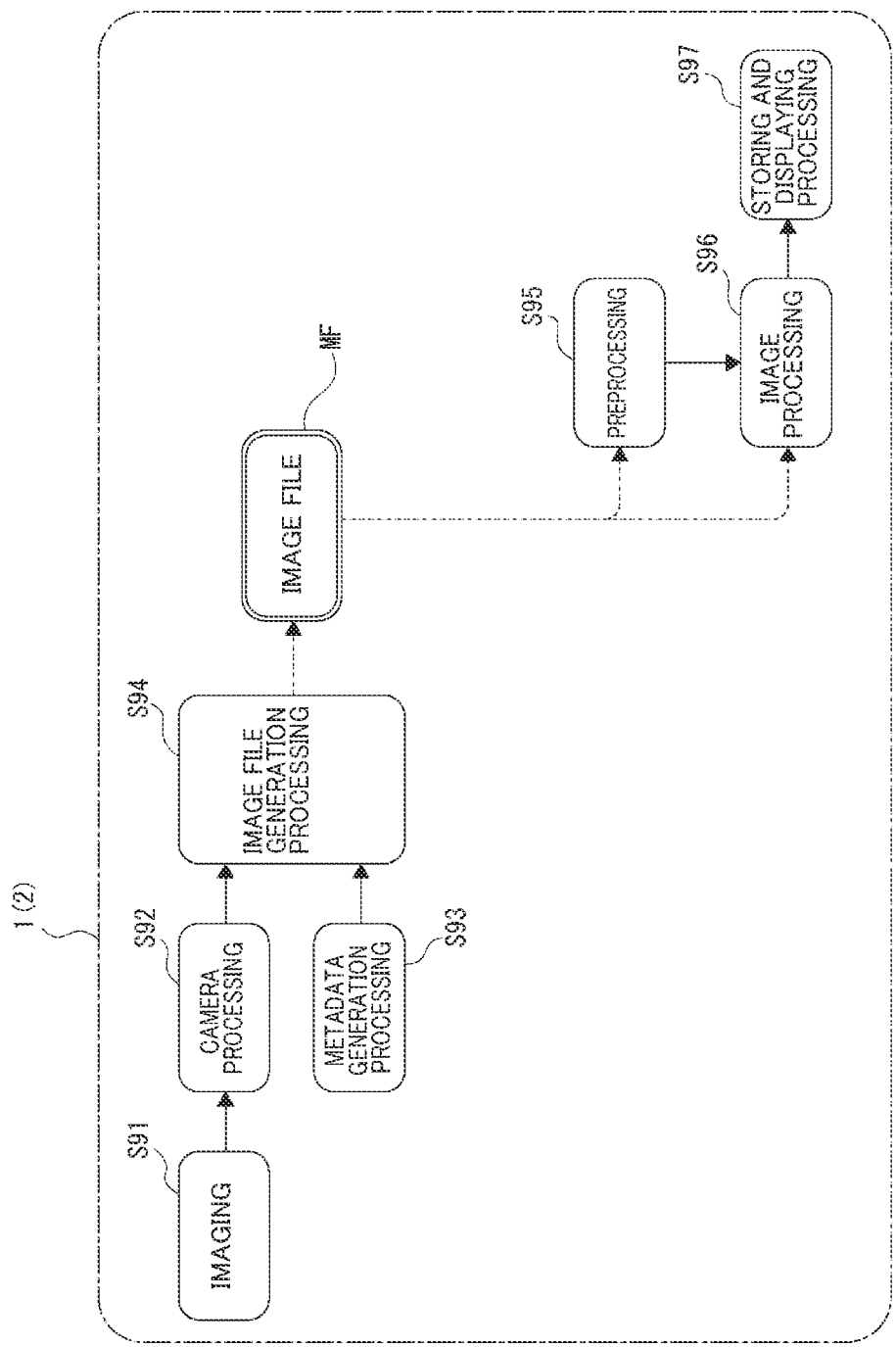
FIG. 7 is an illustrative diagram of an example of a flow of processing of the embodiment.

A flow of the processing in this case is illustrated in FIG. 7. That is, a case in which the preprocessing of step S95, the image processing of step S96, and the storing and displaying processing of step S97 are also performed in the imaging device 1 is illustrated.

Further, in FIG. 1B, a case in which the mobile terminal 2 performs imaging is also mentioned, but in this case, it is conceivable for the processing illustrated in FIG. 7 to be performed in the mobile terminal 2.

Figure 8:
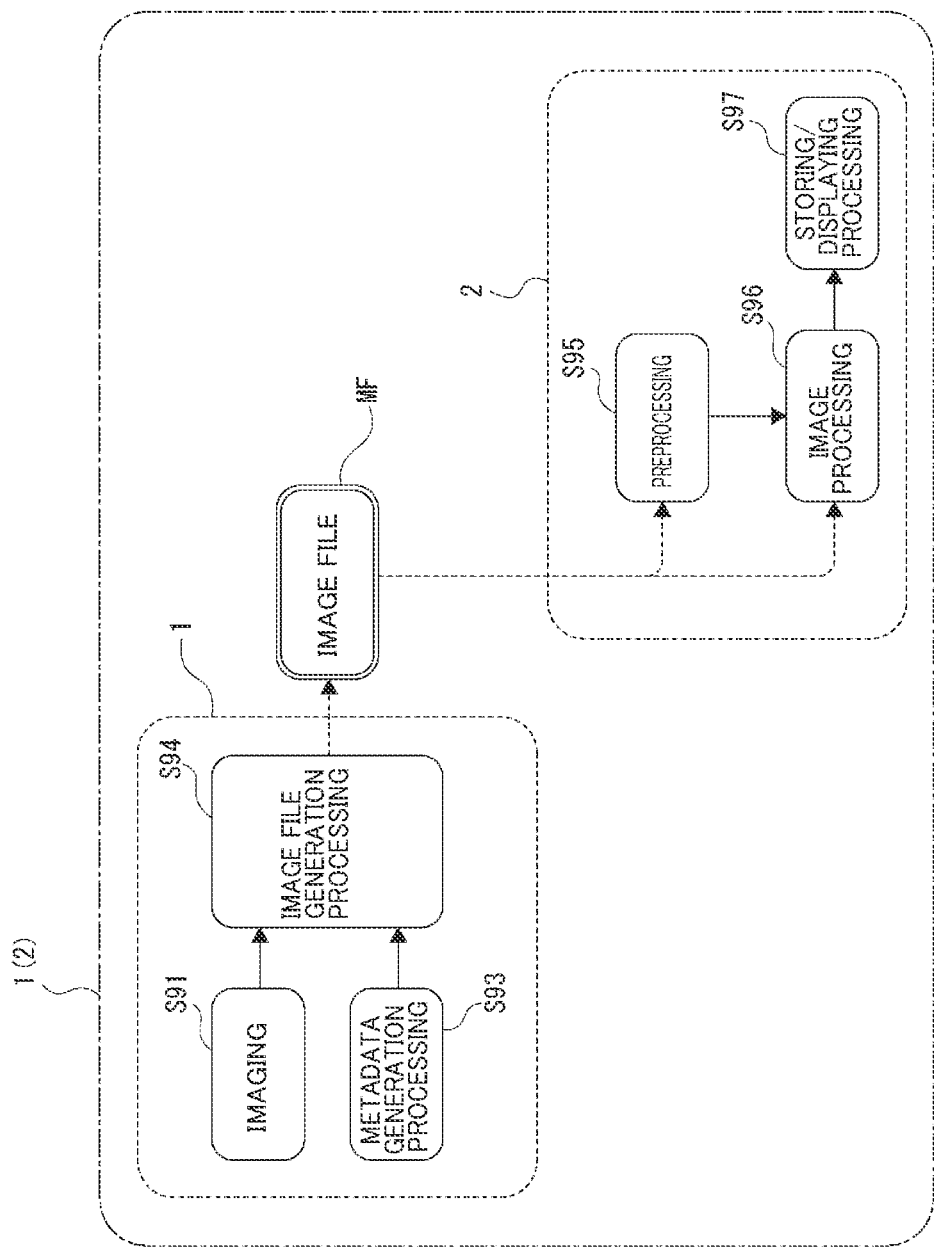
FIG. 8 is an illustrative diagram of an example of a flow of processing of the embodiment.

FIG. 8 illustrates a case in which RAW data is an image processing target as another example.

For example, when the imaging and the image processing are performed by the imaging device 1 and the mobile terminal 2 as indicated by being surrounded by broken lines, the imaging device 1 performs the image file generation processing of step S94 using the captured image signal (RAW data) obtained by the imaging in step S91 and the metadata generated in the metadata generation processing of step S93, to generate the image file MF. In the case of the RAW data, the camera processing described in step S92 in FIGS. 6 and 7 is not performed.

The mobile terminal 2 performs preprocessing (step S95), the image processing (step S96), and the storing and displaying processing (step S97) on such an image file MF.

When the RAW data is an image processing target as illustrated in FIG. 8, a case in which the electric image stabilization or optical image stabilization is performed in the imaging device 1 is also assumed, and a case in which the electric image stabilization or optical image stabilization is not performed in the imaging device 1 is also assumed.

In addition, in the cases of FIGS. 6 and 7 in which the camera processing is performed, the case in which the electric image stabilization or optical image stabilization is performed in the imaging device 1 is also assumed, and the case in which the electric image stabilization or optical image stabilization is not performed in the imaging device 1 is also assumed.

Further, the imaging device 1 (or the mobile terminal 2) surrounded by an alternate long and short dash line in FIG. 8 indicates a case in which the imaging or the image processing for RAW data is performed in the imaging device 1 (or in the mobile terminal 2).

That is, the preprocessing of step S95, the image processing of step S96, and the storing and display processing of step S97 may be performed in the imaging device 1.

Further, in the mobile terminal 2, the imaging in step S91, the metadata generation processing in step S93, and the image file generation processing in step S94 may be performed.

<2. Image File and Metadata>

Content of the image file MF and content of the metadata will be described. FIG. 9A illustrates data included in the image file MF. As illustrated in FIG. 9A, the image file MF includes various pieces of data as "header", "sound", "movie", and "metadata".

In the "header", for example, information indicating the presence or absence of metadata is described together with information such as a file name and a file size. The "sound" is audio data recorded together with the moving image. For example, 2-channel stereo audio data is stored.

The "movie" is moving image data, and includes image data as respective frames (#1, #2, #3, . . . ) constituting the moving image.

As the "metadata", additional information associated with the respective frames (#1, #2, #3, . . . ) constituting the moving image is described.

An example of content of the metadata is illustrated in FIG. 9B. For example, IMU data, coordinate transformation parameter HP, timing information TM, and camera parameter CP are described for one frame. These are a part of metadata content, and here, only information related to the image processing to be described below is shown.

As the IMU data, a gyro (angular velocity data), an accelerator (acceleration data), and a sampling rate are described.

The IMU mounted in the imaging device 1 as the sensor unit 23 outputs the angular velocity data and the acceleration data at a predetermined sampling rate. Generally, this sampling rate is higher than a frame rate of the captured image, so that many IMU data samples can be obtained in one frame period.

Therefore, as the angular velocity data, n samples such as gyro sample #1, gyro sample #2, . . . gyro sample #n illustrated in FIG. 9C are associated with one frame. Further, as the acceleration data, m samples such as accelerator sample #1, accelerator sample #2, . . . accelerator sample #m are associated with one frame. In some cases, n=m, and in other cases, n≠m.

Although the metadata is described herein in an example in which the metadata is associated with each frame, for example, the IMU data may not be completely synchronized with the frame. In such a case, for example, time information associated with time information of each frame is provided as an IMU sample timing offset in the timing information TM.

The coordinate transformation parameter HP is a general term for parameters that are used for correction with coordinate transformation of each pixel in the image. Further, non-linear coordinate transformation such as lens distortion is also included.

The coordinate transformation parameter HP is a term that can include at least a lens distortion correction parameter, a trapezoidal distortion correction parameter, a focal plane distortion correction parameter, an electric image stabilization parameter, and an optical image stabilization parameter.

The lens distortion correction parameter is information for directly or indirectly ascertaining how distortion such as barrel aberration and pincushion aberration is corrected and returning to an image before lens distortion correction. Metadata regarding the lens distortion correction parameter as one piece of metadata will be briefly described.

Figure 10A:
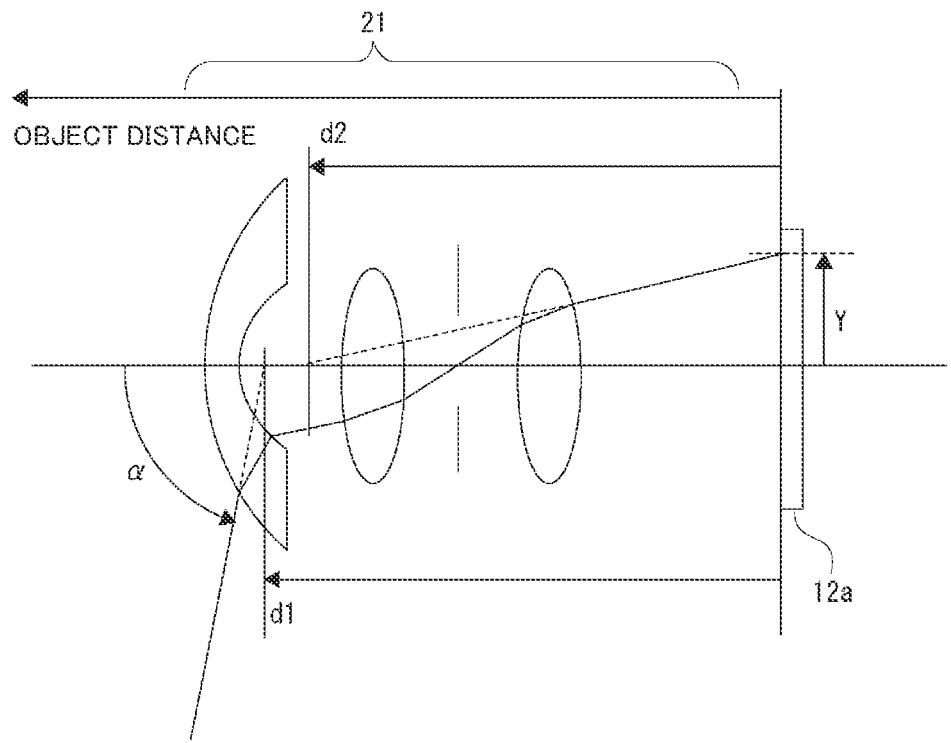
FIGS. 10A and 10B are illustrative diagrams of metadata regarding lens distortion correction.

FIG. 10A illustrates an image height Y, an angle α, an incidence pupil position d1, and an exit pupil position d2 in a schematic diagram of the lens system 11 and the image sensor 12a.

The lens distortion correction parameter is used to know an angle of incidence on each pixel of the image sensor 12a in image processing. Therefore, it is sufficient to know a relationship between the image height Y and the angle α.

Figure 10B:
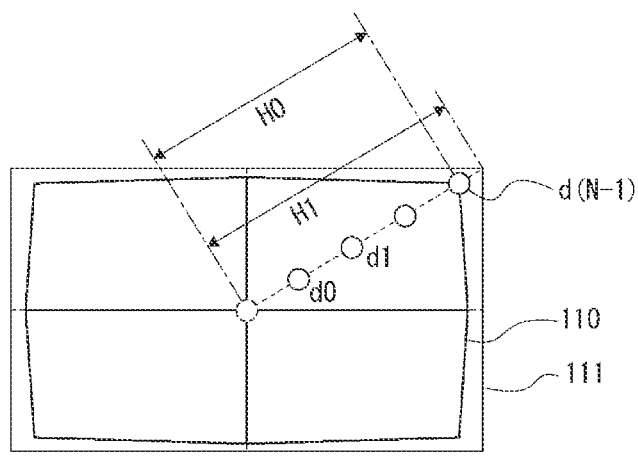

FIG. 10B illustrates an image 110 before lens distortion correction and an image 111 after the lens distortion correction. A maximum image height H0 is a maximum image height before distortion correction, and is a distance from a center to a farthest point of an optical axis. The maximum image height H1 is a maximum image height after distortion correction.

Metadata required to understand a relationship between the image height Y and the angle α is the maximum image height H0 before distortion correction and data d0, d1, . . . d(N−1) of incidence angles with respect to N image heights. It is assumed that "N" is about 10 as an example.

Referring back to FIG. 9B, the trapezoidal distortion correction parameter is a correction amount when trapezoidal distortion caused by shifting the cropping area from a center through the electric image stabilization is corrected, and is also a value according to a correction amount for the electric image stabilization.

The focal plane distortion correction parameter is a value indicating an amount of correction for each line with respect to the focal plane distortion.

For the electric image stabilization and optical image stabilization, the parameter is a parameter indicating an amount of correction in each of axial directions of yaw, pitch, and roll.

The parameters of the lens distortion correction, the trapezoidal distortion correction, the focal plane distortion correction, and the electric image stabilization are collectively referred to as coordinate transformation parameters, but this is because such correction processing is correction processing for an image formed on each pixel of the image sensor 12a of the imaging element unit 12 and is a parameter of a correction processing involving coordinate transformation of each pixel. The optical image stabilization is also one coordinate transformation parameter, but this is because the correction of shake of an inter-frame component in the optical image stabilization is processing involving coordinate transformation of each pixel.

That is, when reverse correction is performed using these parameters, image data subjected to the lens distortion correction, the trapezoidal distortion correction, the focal plane distortion correction, the electric image stabilization, and the optical image stabilization can be returned to a state before each correction processing, that is, a state when an image is formed on the image sensor 12a of the imaging element unit 12.

Further, respective parameters of the lens distortion correction, the trapezoidal distortion correction, and the focal plane distortion correction are generically called an optical distortion correction parameter because distortion correction processing is for a case in which an optical image itself from the subject is an image captured in an optically distorted state, and each of them is intended for optical distortion correction.

That is, when reverse correction is performed using these parameters, the image data subjected to the lens distortion correction, the trapezoidal distortion correction, and the focal plane distortion correction can be returned to a state before the optical distortion correction.

The timing information TM in the metadata includes respective pieces of information on an exposure time (shutter speed), an exposure start timing, a readout time (curtain speed), the number of exposure frames (long exposure information), an IMU sample offset, and a frame rate.

In the image processing of the embodiment, these are mainly used to associate the line of each frame with the IMU data.

However, even when the image sensor 12a is of a CCD type or a CMOS type using a global shutter scheme, correction according to an exposure centroid becomes possible using the exposure start timing and the curtain speed when the exposure centroid shifts using an electronic shutter or a mechanical shutter.

An angle of view (focal length), a zoom position, and lens distortion information are described as the camera parameter CP in the metadata.

<3. Overview of Screen Transition>

An example of screen transition at the time of image processing in the mobile terminal 2 will be described.

Figure 11:
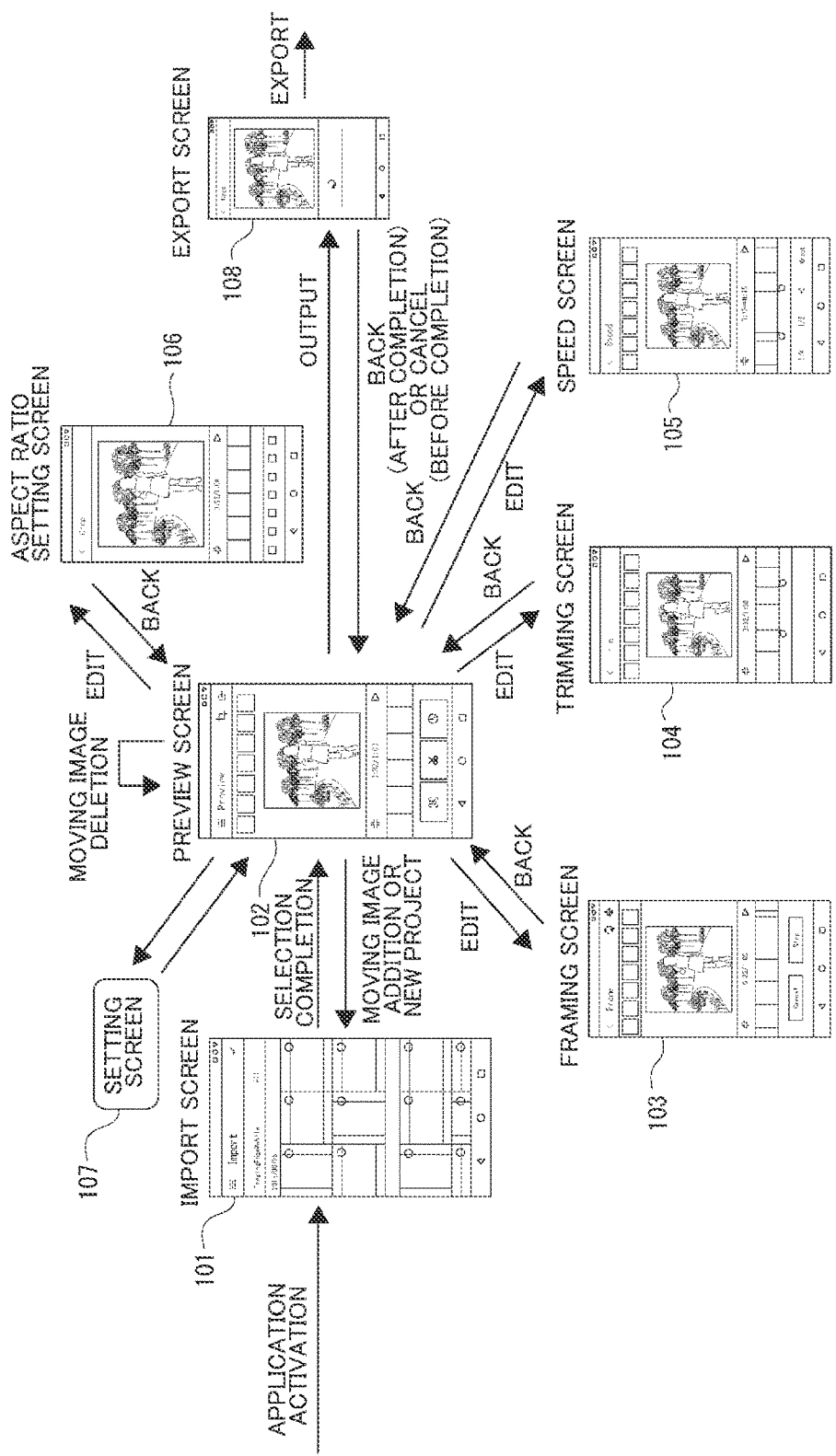
FIG. 11 is an illustrative diagram of screen transition regarding image processing of the embodiment.

FIG. 11 illustrates a transition of various screens appearing on a display screen of the mobile terminal 2. Each screen will be briefly described.

Among respective screens that will be described below, an image that is output on a preview screen 102, a framing screen 103, a trimming screen 104, a speed screen 105, an aspect ratio setting screen 106, and an export screen 108 is an output image oPD subjected to processing of step ST19 in FIG. 14 that will be described below. However, an image that is output on these screens may not always be the output image oPD subjected to the processing in FIG. 14, but in this case, an area set or visually recognized by the user and a final area after the processing in FIG. 14 or a degree of distortion may slightly differ from each other.

[Import Screen 101]

When an application program for moving image processing is activated, the import screen 101 appears.

The import screen 101 is a screen before start of moving image processing. A thumbnail and the like of the image file MF are displayed on the import screen 101 so that the user can select the image file MF that is a processing target.

The selected image file MF is imported and preprocessed as the image file MF that is a processing target.

[Preview Screen 102]

The user completes an operation for selecting one or a plurality of image file MFs on the import screen 101, so that the display transitions to the preview screen 102 through import processing. On the preview screen 102, a list of imported moving images (image file MF) that can be subjected to image processing is displayed, and preview playback of a designated moving images in the list becomes possible.

The user can perform operations for various types of image processing starting from the preview screen, such as an operation of changing brightness or changing the color, on the image file MF shown on the preview screen 102.

On the preview screen 102, the user can perform operations such as playback of a selected moving image (image file MF), addition or deletion of the moving image, and resetting of the image processing.

The moving image playback is performed on the preview screen 102.

When addition of a moving image that is an image processing target or an operation with respect to a new project (new image processing action) is performed, the display returns to the import screen 101 and selection is enabled. The moving image deletion (exclusion from the image processing target) can be performed on the preview screen 102.

[Framing Screen 103]

A predetermined operation from the preview screen 102 causes the display to transition to the framing screen 103. The framing screen 103 is a screen for individually framing moving images designated as the processing targets on the preview screen 102 among the imported moving images.

On the framing screen 103, for example, the user can perform operations such as designation of the effective cropping area of the image, enlargement and reduction of the image, rotation of the image, designation of the tracking target, and designation of the placement position of the tracking target inside the screen in a state in which a still image of a certain frame of the moving image that is a processing target is displayed.

Thereafter, the display returns to the preview screen 102 according to a predetermined operation from the framing screen 103.

An image displayed on the framing screen 103 is an entire image of a certain frame (a first frame of the moving image, a paused frame, or the like), or a part cropped from the entire image. The user can move the displayed range up, down, left, or right or perform enlargement, reduction, and rotation operations to designate the effective cropping area of the image.

Figure 12A:
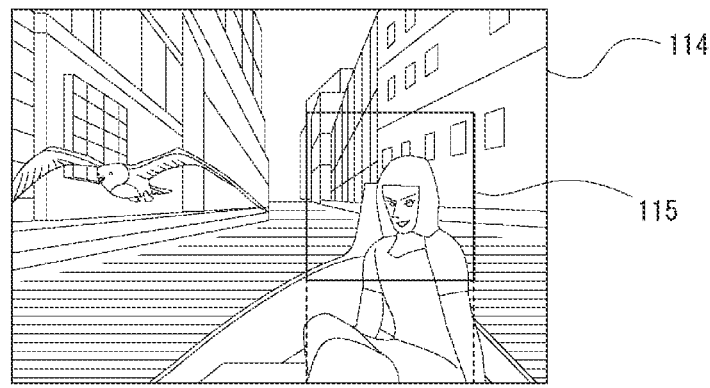
FIGS. 12A, 12B, and 12C are illustrative diagrams for cropping area designation of the embodiment.

An example will be given. FIG. 12A illustrates an entire image 114 of a certain frame and a display frame 115. It is assumed that a range of the display frame 115 is a range that is displayed on the framing screen 103. That is, a part of the entire image 114 is cropped and displayed on the framing screen 103. The range of the display frame 115 corresponds to the effective cropping area.

The user performs, for example, a dragging operation or a pinch-out or pinch-in operation on the framing screen 103, making it possible to move, or enlarge, reduce, or rotate a range included in the display frame 115.

Figure 12B:
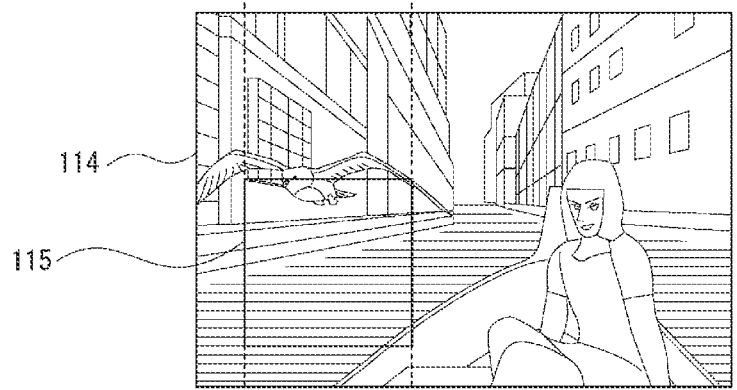

For example, a dragging operation on the screen moves the range included in the display frame 115 as illustrated in FIGS. 12A to 12B. That is, the image is moved up, down, left, or right with respect to the display frame 115, which changes a displayed range.

Figure 12C:
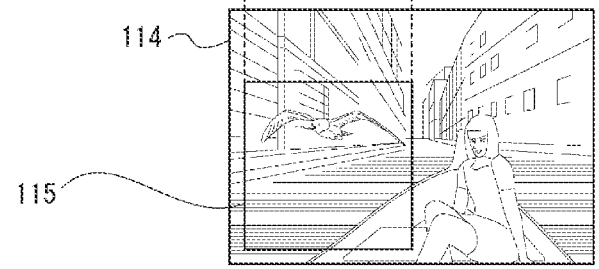

Further, when the user instructs the enlargement or reduction of the image through, for example, the pinch-out or pinch-in operation, the range included in the display frame 115 changes. For example, when the reduction operation is performed from FIG. 12B, a result thereof is as illustrated in FIG. 12C. That is, the entire image 114 is reduced with respect to the display frame 115 and the range of the subject included in the display frame 115 is widened so that the image included in the display frame 115 (viewed by the user) is reduced. That is, the displayed image is reduced, so that a wider range is displayed.

Although not illustrated, conversely, when the user performs an enlargement operation, the entire image 114 is enlarged with respect to the display frame 115, and the range of the subject included in the display frame 115 is narrowed. That is, a narrower range is enlarged and displayed.

An operation with respect to such a range displayed by the display frame 115 is an operation for designating the cropping area, which is performed by the user.

Further, the user can designate the effective cropping area as described above and designate the tracking target and the placement position thereof.

Figure 13A:
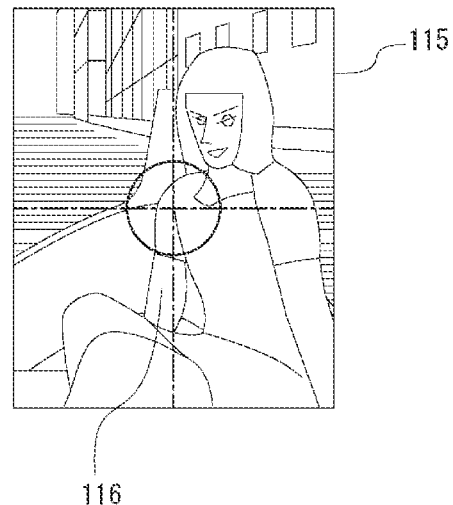
FIGS. 13A and 13B are illustrative diagrams of tracking designation of the embodiment.

For example, when the user performs an operation for designating the tracking target on the framing screen 103, a target designation aiming 116 is displayed as illustrated in FIG. 13A. The user can arbitrarily designate a position of the target designation aiming through a dragging operation, a tapping operation, or the like. For example, it is possible to designate a portion of a face of a person as illustrated in FIG. 13B.

Figure 13B:
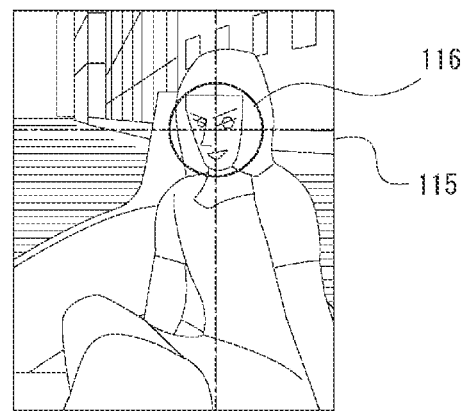

In a state of FIG. 13B, the face of the person is designated as the tracking target, and the placement position within the screen of the tracking target is designated so that the tracking target is disposed on the upper right side within the screen.

That is, on the framing screen 103, the effective cropping area can be designated through a selection of the range included in the display frame 115, and a combination of the range included in the display frame 115 with an operation for designating the tracking target makes the operation for designating the tracking target and the placement position thereof possible.

The above operation is performed as an operation on the displayed still image of one frame, but the designation is reflected in other frames in the same moving image. When the tracking target is not designated only by moving, enlarging, reducing, and rotating the image range in the display frame 115, a range designated through operations for moving, enlarging, reducing, and rotating the image range is a fixed effective cropping area in each frame.

On the other hand, when the tracking target and the placement position thereof has been designated together with the image range that is included in the display frame as described above, the effective cropping area is calculated for the other frames within the moving image according to the designation. That is, in each of frames constituting the moving image, since a position within the screen of the tracking target also changes, the effective cropping area is calculated and changed for each frame.

Specifically, in each frame, the effective cropping area is calculated so that the designated tracking target is located at the designated placement position in a size of the effective cropping area designated by an operation for enlarging or reducing the display frame 115.

The size of the effective cropping area may be appropriately changed depending on change in size of the tracking target.

On the framing screen 103, operations for moving, enlarging, reducing, and rotating the range included in the display frame 115 while playing back and displaying the moving image may be performed or the operation for designating the tracking target or the placement position thereof may be performed.

[Trimming Screen 104]

A predetermined operation from the preview screen 102 causes the display to transition to the trimming screen 104. The trimming screen 104 is a screen for individually trimming (cutting in a time axis direction) the moving image designated as the processing target on the preview screen 102 among the imported moving images.

On the trimming screen 104, a range to be trimmed in the moving image can be selected. For example, a bar is displayed in the time axis direction of the moving image and an operation can be performed to designate a start point and an end point of the range to be cut.

The display returns to the preview screen 102 according to a predetermined operation from the trimming screen 104.

In this specification, trimming does not include processing of cropping a partial area in one frame.

[Speed Screen 105]

A predetermined operation from the preview screen 102 causes the display to transition to the speed screen 105. The speed screen 105 is a screen for individually speed-processing the moving images designated as the processing targets on the preview screen 102 among the imported moving images.

For example, on the speed screen 105, an operation can be performed to select a range for setting a speed (playback speed) in the moving image or to designate the playback speed in the range.

The display returns to the preview screen 102 according to a predetermined operation from the speed screen 105.

More specifically, the speed is a playback speed for performing slow motion or high-speed playback by setting a frame rate different from a frame rate set in the timing information TM included in the metadata.

[Aspect Ratio Setting Screen 106]

A predetermined operation from the preview screen 102 causes the display to transition to the aspect ratio setting screen 106. The aspect ratio setting screen 106 is a screen for setting an aspect ratio of an output moving image in units of files with respect to the imported moving image.

When aspect ratios of the imported moving image and the set output image (output moving image) differ, there may be the same meaning as that of the setting of the effective cropping area that is performed in the framing screen.

That is, even when the effective cropping area is not set on the framing screen, an effective cropping area of the output image having a different aspect ratio is set from the imaged area.

For example, an aspect ratio such as "1:1", "4:5", "5:4", "16:9", and "9:16" can be selected on the aspect ratio setting screen 106.

The display returns to the preview screen 102 according to a predetermined operation from the aspect ratio setting screen 106.

All or some of functions of the aspect ratio setting screen 106, for example, a batch selection operation of the aspect ratios may be enabled by, for example, a dialog displayed on the preview screen 102.

Further, the aspect ratio setting screen 106 may be used as a screen for setting an aspect ratio of all of a plurality of frames constituting the moving image designated as the processing target on the preview screen 102 among the imported moving images.

[Setting Screen 107]

A predetermined operation from the preview screen 102 causes the display to transition to the setting screen 107. On the setting screen 107, a setting operation for, for example, an operation of the application program is enabled. The display returns to the preview screen 102 according to a predetermined operation from the setting screen 107.

[Export Screen 108]

A predetermined operation from the preview screen 102 causes the display to transition to the export screen 108. The export screen 108 is a screen when processing of exporting a moving image reflecting the image processing content performed on each of the above screens is being performed. That is, after the user performs operations of various types of image processing, the user returns to the preview screen 102 and instructs export. Accordingly, the display transitions to the export screen 108, and an export processing of the moving image processed according to the image processing content is executed.

The exported moving image can be arbitrarily recorded by the user or uploaded to a website, social networking service (SNS), or the like via network communication of the mobile terminal 2 and shared.

When the user performs a cancel operation during the export processing, or when the export processing is completed, the display returns to the preview screen 102.

<4. Image Processing>

A specific example of processing regarding a moving image that is executed while performing the user interface on each screen will be described.

Figure 14:
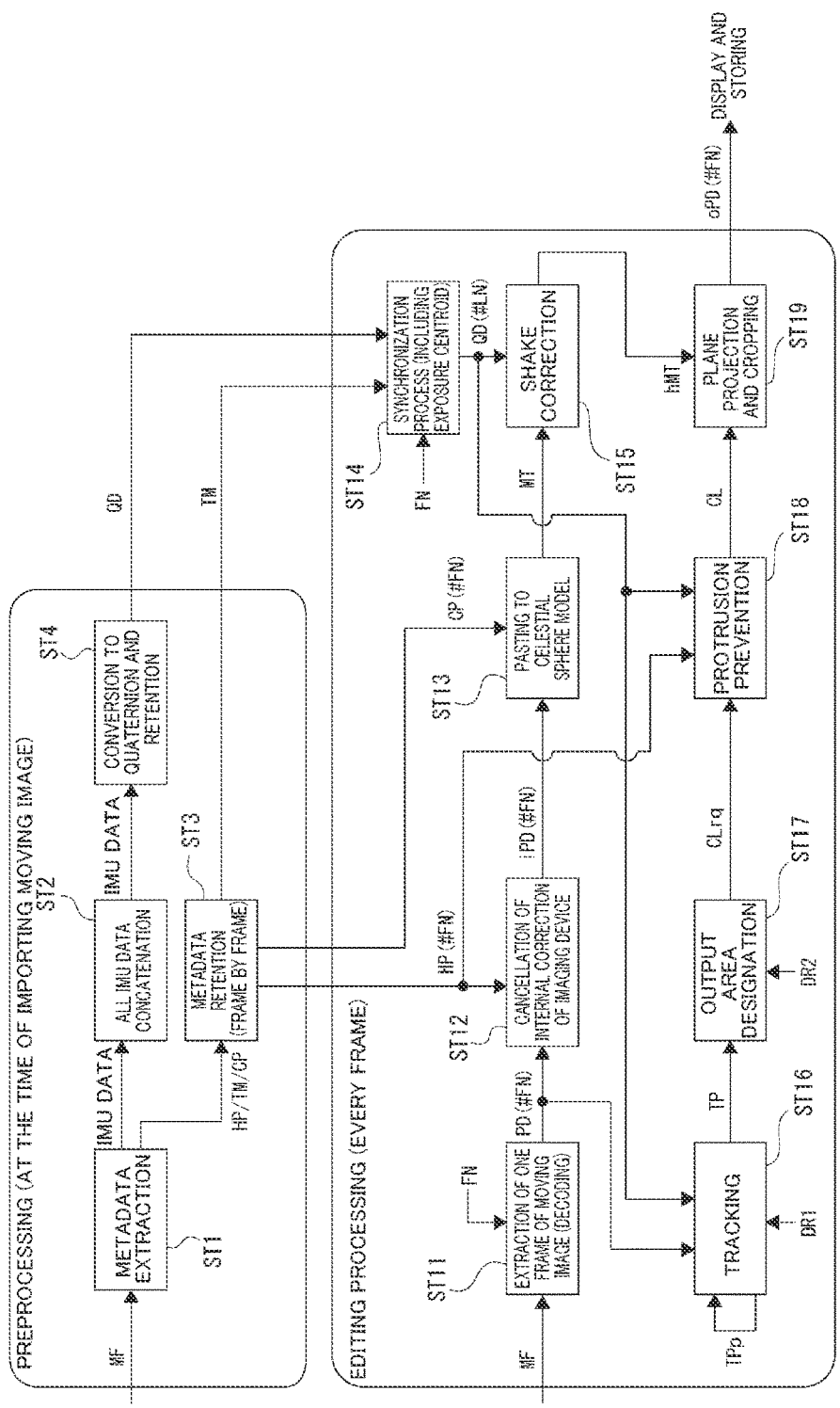
FIG. 14 is an illustrative diagram of image processing of the embodiment.

FIG. 14 illustrates a procedure as preprocessing that is performed at the time of importing the moving image (image file MF) by the preprocessing unit 31 (CPU 71) of FIG. 5 and a procedure as image processing that is performed by the image processing unit 32 (CPU 71), and illustrates a relationship between pieces of information that are used in the respective processing.

First, preprocessing will be described. The preprocessing is performed on the image file MF selected as the image processing target on the import screen 101. In this preprocessing, metadata extraction (step ST1), concatenation of all pieces of IMU data (step ST2), metadata holding (step ST3), conversion to quaternion (posture information of the imaging device 1), and holding (step ST4) are performed.

As the metadata extraction in step ST1, the preprocessing unit 31 reads the image file MF that is a target and extracts the metadata included in the image file MF as described with reference to FIGS. 9A, 9B, and 9C.

Some or all of steps ST1, ST2, ST3, and ST4 may be performed on the imaging device 1 side. In this case, in the preprocessing, content after processing to be described below is acquired as metadata.

The preprocessing unit 31 performs concatenation processing on the IMU data (angular velocity data (gyro sample) and acceleration data (accelerator sample)) in the extracted metadata in step ST2.

This is processing of arranging and concatenating all pieces of IMU data associated with all the frames in chronological order to construct IMU data corresponding to an entire sequence of the moving image.

Integration processing is performed on the concatenated IMU data to calculate a quaternion QD indicating the posture of the imaging device 1 at each point in time on a sequence of moving images, and store and hold the quaternion QD. The calculation of the quaternion QD is an example.

It is also possible to calculate the quaternion QD using only the angular velocity data.

The preprocessing unit 31 performs processing of holding the metadata other than the IMU data, that is, the coordinate transformation parameter HP, the timing information TM, and the camera parameter CP among the extracted metadata in step ST3. That is, the coordinate transformation parameter HP, the timing information TM, and the camera parameter CP are stored in a state corresponding to each frame.

The above preprocessing is performed to allow various types of image processing to be performed via an interface using each screen starting from the preview screen 102 described above.

The image processing of FIG. 14 indicates processing that is normally performed when the moving image of the image file MF or the paused still image is played back on each screen as the preview screen 102, the framing screen 103, the trimming screen, the speed screen 105, and the aspect ratio setting screen 106 while reflecting information of the effective cropping area designated by the user on the framing screen 103.

The image processing unit 32 (CPU 71) performs respective processing including extraction of one frame of moving image (step ST11), cancellation of internal correction of the imaging device (step ST12), pasting to the celestial sphere model (step ST13), synchronization processing (step ST14), and shake correction (ST15). The processing of steps ST11 to ST15 is processing using a function of the shake correction unit 33 of FIG. 5.

Further, the image processing unit 32 (CPU 71) performs respective processing that are tracking (step ST16), display area designation (step ST17), and protrusion prevention (step ST18). The processing of steps ST16, ST17, and ST18 is processing using functions of the effective cropping area setting unit 34 of FIG. 5. Further, the image processing unit 32 (CPU 71) performs processing of plane projection and cropping (step ST19). The processing of step ST19 is processing using the function of the effective cropping area image generation processing unit 35 in FIG. 5.

The image processing unit 32 performs each processing of steps ST11 to ST19 above on each frame at the time of playback of the image of the image file MF. For example, when an image is displayed on each screen such as the framing screen 103 or trimming screen 104 described above, each processing of steps ST11 to ST19 is performed on each frame.

In step ST11, the image processing unit 32 decodes one frame of the moving image (image file MF) along a frame number FN. Image data PD (#FN) of one frame is output.

"(#FN)" indicates a frame number and indicates that information corresponds to such a frame.

When the moving image is not subjected to encoding processing such as compression, the decoding processing in step ST11 is unnecessary.

In step ST12, the image processing unit 32 performs processing of canceling the internal correction performed on the image data PD (#FN) of one frame by the imaging device 1. Therefore, the image processing unit 32 performs reverse correction of the correction performed by the imaging device 1 by referring to a coordinate transformation parameter HP (#FN) stored in correspondence to the frame number (#FN) at the time of preprocessing. Accordingly, image data iPD (#FN) in a state in which the lens distortion correction, the trapezoidal distortion correction, the focal plane distortion correction, the electric image stabilization, and the optical image stabilization have been canceled in the imaging device 1 is obtained.

In step ST13, the image processing unit 32 performs pasting of image data iPD (#FN) of one frame that is in a state in which various corrections have been canceled, to the celestial sphere model. In this case, the camera parameter CP (#FN) stored in correspondence to the frame number (#FN), that is, the angle of view, the zoom position, and the lens distortion information are referred to.

Figure 15A:
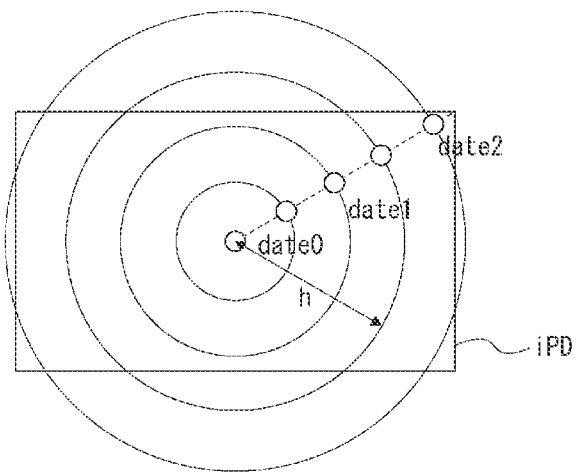
FIGS. 15A, 15B, and 15C are illustrative diagrams of pasting to a celestial sphere model of the embodiment.
Figure 15B:
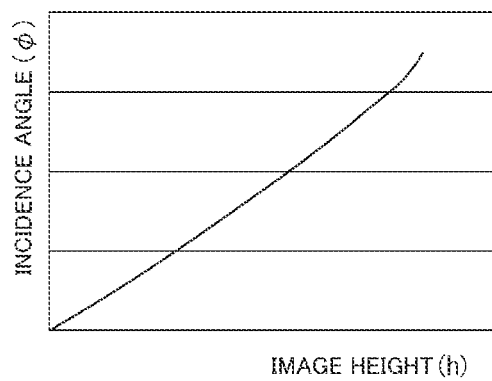
Figure 15C:
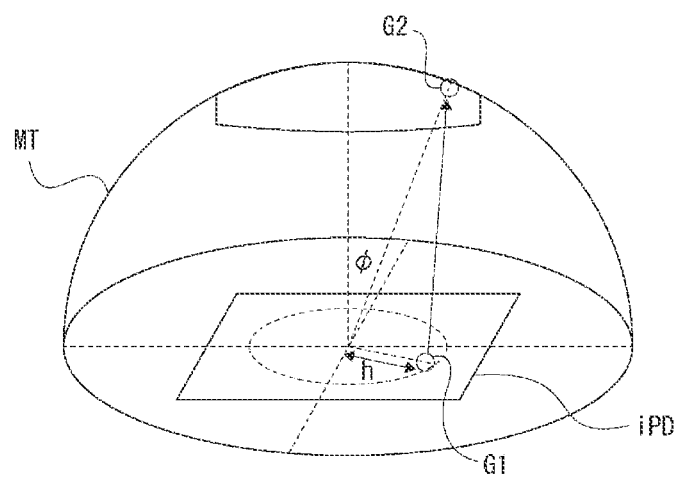

FIGS. 15A, 15B, and 15C illustrate an overview of pasting to the celestial sphere model.

Image data iPD is illustrated in FIG. 15A. An image height h is a distance from a center of the image. Each circle in FIG. 15A indicates a position in which the image height h is equal.

A "relationship between an image sensor surface and an incidence angle φ" in the frame is calculated from the angle of view, zoom position, and lens distortion information for the frame of this image data iPD, and "data0" . . . "dataN−1" at respective positions on the image sensor surface are obtained. A one-dimensional graph of the relationship between the image height h and the incidence angle φ as illustrated in FIG. 15B is represented from "data0" . . . "dataN−1". The incidence angle φ is an angle of a light ray (an angle seen from the optical axis).

This one-dimensional graph is rotated once around a center of the captured image, and a relationship between each pixel and the incidence angle is obtained.

Accordingly, each pixel of the image data iPD is mapped to a celestial sphere model MT, like a pixel G2 at celestial sphere coordinates from a pixel G1 in FIG. 15C.

Accordingly, an image (data) of the celestial sphere model MT in which the captured image is pasted to an ideal celestial spherical surface in a state in which lens distortion has been removed can be obtained. This celestial sphere model MT is a model in which a unique parameter or distortion of the imaging device 1 that has originally captured the image data iPD is removed and a range seen by an ideal pinhole camera is pasted to a celestial spherical surface.

Therefore, the image of the celestial sphere model MT is rotated in a predetermined direction in this state, such that the shake correction can be realized.

Here, the posture information (quaternion QD) of the imaging device 1 is used for the shake correction. Therefore, the image processing unit 32 performs a synchronization processing in step S14.

In the synchronous processing, processing of specifying and acquiring a quaternion QD (#LN) suitable for each line in correspondence to the frame number FN is performed.

"(#LN)" indicates a line number in the frame and indicates that information corresponds to the line.

The quaternion QD (#LN) for each line is used because an amount of shake differs for each line when the image sensor 12a is of a CMOS type and imaging using a rolling shutter scheme is performed.

For example, when the image sensor 12a is of a CCD type and imaging using a global shutter scheme is performed, a frame-by-frame quaternion QD (#FN) may be used.

In the case of a global shutter of the CCD or CMOS type image sensor as the image sensor 12a, a centroid is shifted when an electronic shutter (or a mechanical shutter) is used, and thus, a quaternion at a timing at a center of an exposure period of the frame (which is shifted depending on a shutter speed of the electronic shutter) may be used.

Here, blur appearing in the image is considered.

The blur is image bleeding due to relative motion between the imaging device and the subject in the same frame. That is, this is image bleeding due to shake within the exposure time. When the exposure time becomes longer, an influence of the bleeding as the blur is stronger.

In the electric image stabilization, when a scheme for controlling the image range to be cropped for each frame is used, "shake" occurring between frames can be reduced or eliminated, but relative shake within the exposure time cannot be reduced by the electric image stabilization.

Further, when the cropping area is changed due to the image stabilization, posture information of each frame is used, but when the posture information deviates from a center of the exposure period such as a start or end timing of the exposure period, a direction of shake within the exposure time based on the posture is biased, and bleeding is easily noticeable. Further, the exposure period differs for each line in a rolling shutter of the CMOS type image sensor.

Therefore, in the synchronization processing of step ST14, the quaternion QD is acquired for each frame of the image data on the basis of the timing of the exposure centroid for each line.

Figure 16:
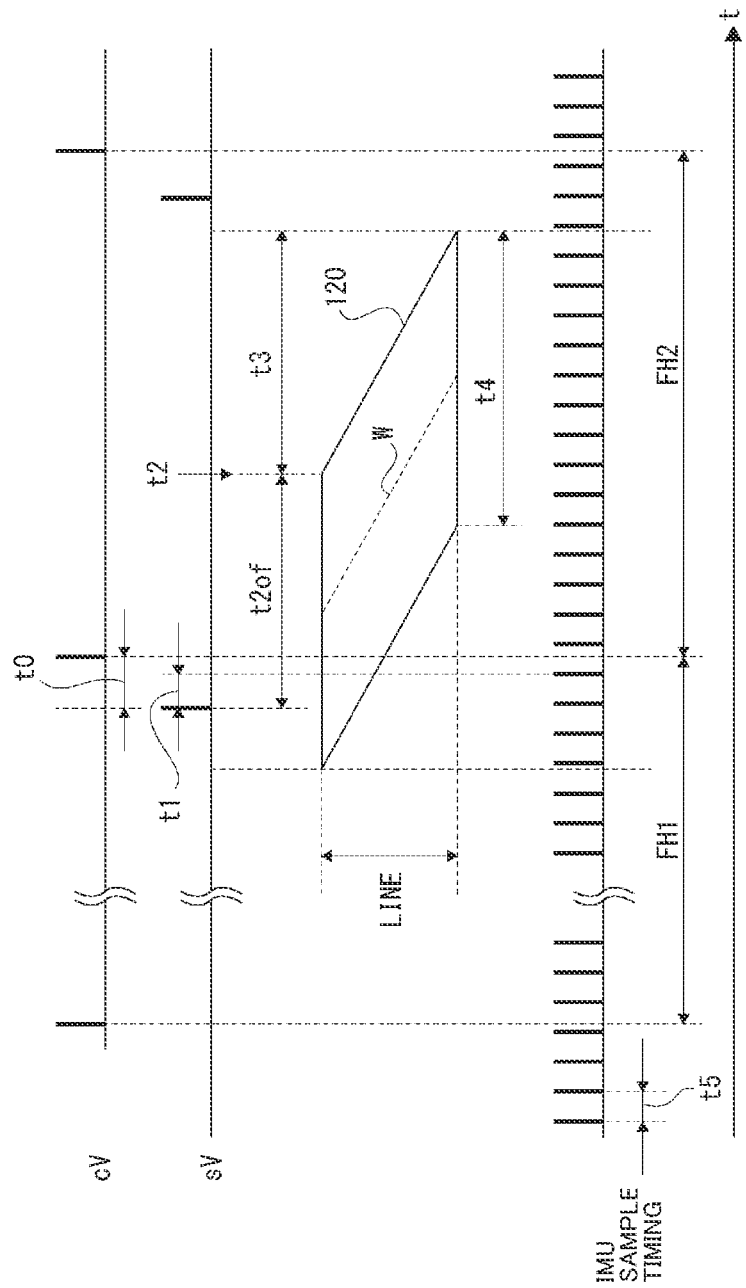
FIG. 16 is an illustrative diagram of a sample timing of IMU data of the embodiment.

FIG. 16 illustrates a synchronization signal cV of the imaging device 1 in a vertical period, a synchronization signal sV of the image sensor 12a generated from the synchronization signal cV, and a sample timing of the IMU data, and also illustrates an exposure timing range 120.

The exposure timing range is a range schematically indicating, in a parallelogram, an exposure period of each line of one frame when the exposure time is t4 in the rolling shutter scheme. Further, a temporal offset t0 of the synchronization signal cV and the synchronization signal sV, an IMU sample timing offset t1, a readout start timing t2, a readout time (curtain speed) t3, and an exposure time t4 are shown. The readout start timing t2 is a timing at which a predetermined time t2 of has passed from the synchronization signal sV.

Each piece of IMU data obtained at each IMU sample timing is associated with the frame. For example, the IMU data in a period FH1 is metadata associated with the current frame indicating the exposure period in a parallelogram, and the IMU data in the period FH1 is metadata associated with the next frame. However, by concatenating all pieces of IMU data in step ST2 of FIG. 14, the association between each frame and the IMU data is released so that the IMU data can be managed in chronological order.

In this case, the IMU data corresponding to an exposure centroid (timing indicated by a broken line W) of each line of the current frame is specified. This can be calculated when a temporal relationship between the IMU data and an effective pixel area of the image sensor 12a is known.

Therefore, IMU data corresponding to the exposure centroid (the timing indicated by the broken line W) of each line is specified using information that can be acquired as the timing information TM corresponding to the frame (#FN). That is, the information is information on the exposure time, the exposure start timing, the readout time, the number of exposure frames, the IMU sample offset, and the frame rate.

The quaternion QD calculated from the IMU data of the exposure centroid is specified and used as the quaternion QD (#LN) which is the posture information for each line.

This quaternion QD (#LN) is provided to the shake correction in step S15. In the shake correction in step S15, the image processing unit 32 rotates the image of the celestial sphere model MT to which the image of the frame has been pasted in step S14 so that a change in posture (shake) is canceled using the quaternion QD (#LN) for each line, to perform the shake correction. An image of the celestial sphere model hMT subjected to the shake correction is sent to the processing of step ST19.

In step ST19, the image processing unit 32 projects the image of the celestial sphere model hMT subjected to the shake correction onto a plane and crops the image to obtain an image (output image data oPD) subjected to the shake correction.

In this case, the shake correction is realized through the rotation of the celestial sphere model MT, and use of the celestial sphere model MT prevents a trapezoidal shape from being formed regardless of a cropped portion, and as a result, the trapezoidal distortion is also eliminated. Further, in the celestial sphere model MT, because the range seen by the ideal pinhole camera is pasted to the celestial spherical surface as described above, there is no lens distortion. Rotation of the celestial sphere model MT is performed according to the quaternion QD (#LN) for each line, which eliminates the focal plane distortion correction.

Further, since the quaternion QD (#LN) corresponds to the exposure centroid of each line, an image in which the blur is not noticeable is obtained.

Association between the image after the plane projection in step S19 and the celestial sphere model MT is as follows.

Figure 17A:
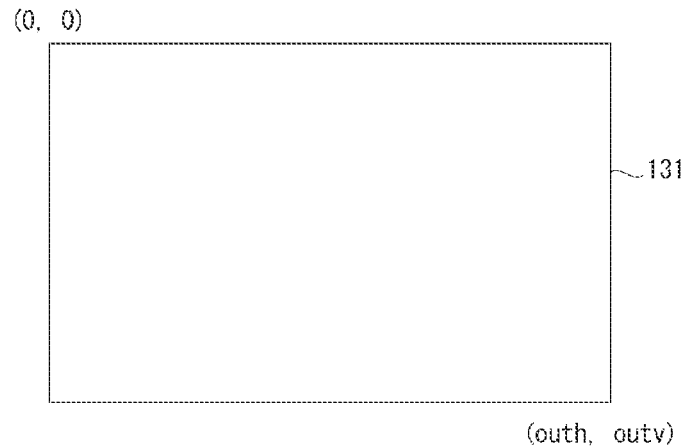
FIGS. 17A and 17B are illustrative diagrams of association between an output image and the celestial sphere model of the embodiment.

FIG. 17A illustrates an example of a rectangular coordinate plane 131 subjected to plane projection. Coordinates of the image subjected to the plane projection are (x, y).

Figure 17B:
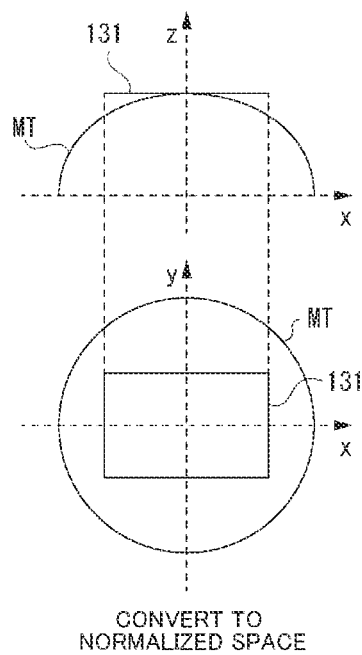

As illustrated in FIG. 17B, the coordinate plane 131 is disposed (normalized) in a three-dimensional space so that the coordinate plane 131 comes in contact with the celestial sphere model MT on the celestial sphere model MT and at a center of the celestial sphere model MT. That is, a center of the coordinate plane 131 is disposed at a position that matches a center of the celestial sphere model MT and is in contact with the celestial sphere model MT.

In this case, coordinates are normalized on the basis of a zoom magnification or a size of the effective cropping area CL. For example, when a horizontal coordinate of the coordinate plane 131 is 0 to outh and a vertical coordinate is 0 to outv as illustrated in FIG. 17A, outh and outv are an image size. For example, the coordinates are normalized using the following equation.

$$x_{norm} = \frac{1}{zoom} \cdot \frac{(x - outh/2)}{r}$$ [Math. 1]

$$y_{norm} = \frac{1}{zoom} \cdot \frac{(y - outv/2)}{r}$$

$$z_{norm} = 1$$

WHERE. $r = min(outh, outv)/2$

In (Math. 1) above, min (A, B) is a function of returning a smaller value of A and B. Further, "zoom" is a parameter for controlling enlargement and reduction. Further, xnorm, ynorm, and znorm are normalized x, y, and z coordinates. According to each of the above equations of (Math. 1) above, coordinates of the coordinate plane 131 are normalized to coordinates on a spherical surface of a hemisphere having a radius of 1.0.

Figure 18A:
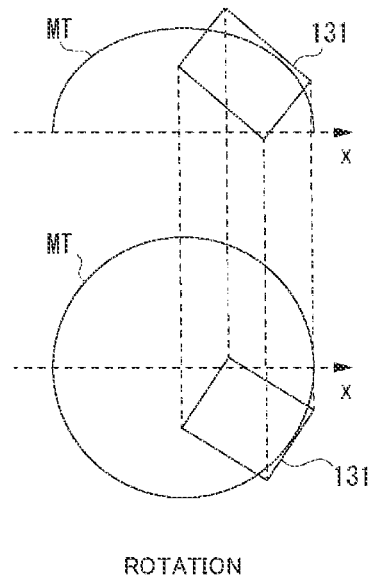
FIGS. 18A and 18B are illustrative diagrams of rotation and perspective projection of an output coordinate plane of the embodiment.

For rotation for obtaining a direction of the effective cropping area CL, the coordinate plane 131 is rotated through rotation matrix calculation, as illustrated in FIG. 18A. That is, a rotation matrix of (Math. 2) below is used to rotate a pan angle, tilt angle, and roll angle. Here, the pan angle is a rotation angle at which the coordinates are rotated around a z-axis. Further, the tilt angle is a rotation angle at which the coordinates are rotated around an x-axis, and the roll angle is a rotation angle at which the coordinates are rotated around a y-axis.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix}$$ [Math. 2]

$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

In (Math. 2) above, "Rt" is the tilt angle, "Rr" is the roll angle, and "Rp" is the pan angle. Further, (xrot, yrot, zrot) are coordinates after rotation.

These coordinates (xrot, yrot, zrot) are used for calculation of celestial sphere correspondence points in perspective projection.

Figure 18B:
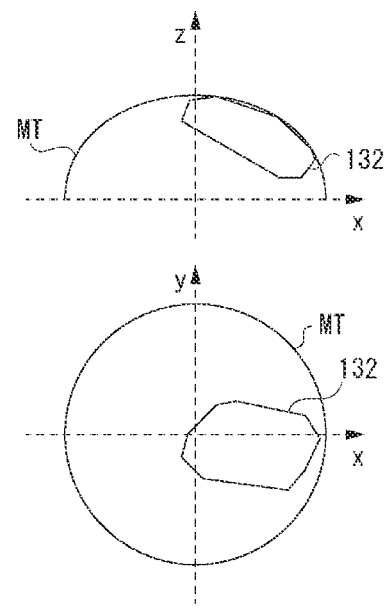

As illustrated in FIG. 18B, the coordinate plane 131 is perspectively projected onto a surface of the celestial sphere (area 132). That is, when a straight line is drawn from the coordinate toward a center of the celestial sphere, a point intersecting the spherical surface is obtained. Each coordinate is calculated as follows.

$$x_{sph} = x_{rot} / \sqrt{x_{rot}^2 + y_{rot}^2 + z_{rot}^2}$$ [Math. 3]

$$y_{sph} = y_{rot} / \sqrt{x_{rot}^2 + y_{rot}^2 + z_{rot}^2}$$

$$z_{sph} = z_{rot} / \sqrt{x_{rot}^2 + y_{rot}^2 + z_{rot}^2}$$

In (Math. 3), xsph, ysph, and zsph are coordinates obtained by projecting coordinates on the coordinate plane 131 onto coordinates on a surface of the celestial sphere model MT.

Image data subjected to plane projection can be obtained in this relationship.

The above has been described without considering the processing of the effective cropping area setting unit 34 but, for example, the effective cropping area for the image projected onto the plane using the above scheme are set in the processing of steps ST16, ST17, and ST18 of FIG. 14.

The image processing unit 32 performs tracking as step ST16.

This tracking processing is processing of detecting the position of the tracking target designated by the operation information DR1 of the user in the image data PD (#FN) of the current frame.

The operation information DR1 is information on an operation for designating the tracking target by operating the target designation aiming 116 on the framing screen 103 as described with reference to FIGS. 13A and 13B.

When the operation for designating the tracking target is performed, the image processing unit 32 recognizes a designated subject and stores the subject as the tracking target. Thereafter, processing of determining the position of the tracking target in the screen is performed for each frame.

The determination of the position of the tracking target in the screen is made through a subject determination (for example, face determination or person determination) based on image analysis, or made by using an in-screen position information TPp of the tracking target in a previous frame.

The in-screen position information TP of the tracking target in the image data PD (#FN) of the current frame that has been determined is provided to the processing of step S17. The in-screen position information TP may be information indicating a range in which the tracking target is imaged in a coordinate system of the current frame, using the coordinate values.

In step ST17, the image processing unit 32 performs output area designation. This is processing of setting a requested cropping area CLrq according to operation information DR2 of a user operation. The processing can be said as processing of designating an area of the image to be finally displayed as an output image, as the requested cropping area CLrq.

The setting of the requested cropping area CLrq here means provisional setting (a candidate for the effective cropping area CL as an area actually subjected to cropping processing) before processing of the next step ST18 is performed. This step ST17 is processing of designating the effective cropping area CL on the basis of the user operation or the information on the tracking target, but the effective cropping area CL before the correction in the protrusion prevention processing to be described below is called the requested cropping area CLrq.

For example, there is also a case in which the requested cropping area CLrq set in step ST17 becomes the effective cropping area CL as it is, such as a case in which the protrusion prevention processing is not performed or a case in which the protrusion prevention processing is performed but no substantial correction is performed.

Operation information DR2 input by the user includes information on an operation for designating the effective cropping area CL, an operation for selecting the aspect ratio, and an operation for designating the tracking target placement position.

Operation information of the operation for designating the effective cropping area is information on the operation for designating the range inside the display frame 115 on the framing screen 103 as described with reference to FIGS. 12A, 12B, and 12C.

Operation information of the operation for selecting the aspect ratio is operation information of the aspect ratio selected on the aspect ratio setting screen 106. Selection on the aspect ratio setting screen 106 causes, for example, the aspect ratio of the display frame 115 on the framing screen 103 or the like to be changed, so that the user can designate an arbitrary aspect ratio and then designate the effective cropping area on the framing screen 103 in a state of the aspect ratio.

The operation information of the operation for designating the tracking target placement position is information on the operation for designating the placement position of the tracking target in the screen as illustrated in FIG. 13B. The information on the placement position of the tracking target may be a coordinate value of a coordinate system in the fixed display frame 115 having the selected aspect ratio, not a coordinate system within a frame of the image data PD.

In step S17, the image processing unit 32 sets the requested cropping area CLrq using the operation information DR2 and the in-screen position information TP of the tracking target.

Specifically, for example, a coordinate range as the cropping area is calculated according to the operation for designating the cropping area and the operation of selecting the aspect ratio in the operation information DR2. The in-screen position information TP (coordinate value of the image data PD within the frame) of the tracking target matches (or approaches) the coordinate value designated as the placement position in the coordinate system inside the display frame 115 as the effective cropping area.

Thus, for example, when a face of the person who is a subject is set as the tracking target and an upper right position from a center of the screen is the placement position of the tracking target as illustrated in FIG. 13B, the effective cropping area is set so that a position of the face is a position at the upper right from a center in each frame.

It is not always necessary for all or part of an area (for example, an area of a face image) indicated by the in-screen position information TP (a coordinate value in the frame of the image data PD) to strictly correspond to the tracking target placement position. This is because the position of the face within the frame changes greatly for each frame, a pixel range (a size of the face on the screen) in which the face is imaged changes, or a face part is out of the frame and cannot follow. Alternatively, it is conceivable that matching with the target placement position cannot be made due to the protrusion prevention processing to be described below. In that sense, the position of the tracking target (in-screen position information TP) may be as close as possible to the tracking target placement position (a specific position inside the display frame 115) designated through the operation.

The image processing unit 32 performs the protrusion prevention processing in step ST18 on the requested cropping area CLrq set as described above, and sets a result of the protrusion prevention processing as the effective cropping area CL that is actually used in step S19.

In this protrusion prevention processing, the quaternion QD (#LN) or the coordinate transformation parameter HP for a plurality of previous and subsequent frames including such a frame are used.

For example, the requested cropping area CLrq serving as a candidate set in step ST17 can be used as it is in step S19, but then, a range corresponding to the inside of the display frame 115 exceeds a range of rotation and projection in the shake correction using the celestial sphere model MT and the shake correction may not function effectively, or an image loss may occur because a part of the image displayed by exceeding a pixel range of the image sensor 12a is lost.

Therefore, the protrusion prevention processing is performed to limit the cropping area so that a high-quality moving image can be output without causing such a problem.

The protrusion prevention processing is performed as a three-step processing including association with the imaged area illustrated in FIG. 19 (a first process), calculation of the movable area (hereinafter also referred to as an "available area") (a second process), and correction of the display range (a third process).

In FIG. 19, an imaged area (hereinafter also referred to as the "captured area") 61, the available area (movable area) 62, the requested cropping area CLrq, and the effective cropping area CL are shown.

The captured area (imaged area) 61 is an area in which an image is captured so that a subject can be displayed. That is, the captured area is a range in which the subject is imaged.

The available area (movable area) 62 is an area that allows cropping taking previous and subsequent frames into account. That is, the available area is a range in which the shake correction through the rotation of the shake correction celestial sphere model MT in step ST15 is effectively maintained.

The requested cropping area CLrq is an area to be displayed, which is determined according to the user operation or a tracking result.

The effective cropping area CL is an area obtained by moving the requested cropping area CLrq to be accommodated in the available area 62. This effective cropping area CL is an area that is actually cropped.

The first processing (processing of association with an imaging angle of view) in FIG. 19 is processing of setting the captured area 61 on the celestial sphere model MT, and the captured area 61 matches the imaged area.

Specifically, the processing is processing of allocating an imaged area to on the celestial sphere model MT in consideration of the angle of view or distortion of the lens using the coordinate transformation parameter HP.

For the area to be allocated, an area to which inverse correction using the coordinate transformation parameter HP has been applied is used.

Further, the captured area 61 illustrated in FIG. 19 is directed in a direction in which the shake is canceled on the celestial sphere model MT in order to apply the shake correction onto the celestial sphere model MT.

The second processing (the calculation of the movable area) is processing of calculating the available area 62 (movable area) of the current frame using information on the previous and subsequent frames.

The third processing (the correction of the display range) is processing of correcting the requested cropping area CLrq into the effective cropping area CL using the calculated available area 62.

When the effective cropping area CL is at least finally within the captured area 61 in which a subject exists, an image loss does not occur in a playback image or a display image. That is, when the cropping area does not protrude from the captured area 61, an image loss does not occur.

FIG. 20A illustrates a relationship between the captured area 61 and the cropping area 60 in frames #i, #i+1, and #i+2.

A subject range included (that is, captured) in the captured area 61 varies due to an influence of shake. Here, when the cropping area 60 of each frame is set so that the effective shake correction is maintained, for example, the cropping area 60 indicated by a broken line is formed in the frame #i+1 and an image loss occurs.

On the other hand, when the cropping area 60 is allowed to move over the entire captured area 61 so that an image loss does not occur, a corrected shake motion may appear directly. That is, the shake correction does not work effectively. For example, the cropping area 60 of the frame #i+1 is indicated by a solid line so that the image loss does not occur, but shake appears.

Therefore, the available area 62 is calculated as a range in which the shake correction can be effectively maintained, and the cropping area 60 is prevented from protruding from the available area 62 in the protrusion prevention.

Specifically, the available area 62 is set as a frame with a margin so that the cropping area 60 does not go to a portion that is likely to protrude in advance using shake information of previous and subsequent frames, and the cropping area 60 moves only in a range thereof.

Since the available area 62 has a meaning of a shake correction margin, the available area 62 is dynamically changed for each frame depending on a magnitude of the shake.

FIG. 20B illustrates a state in which the available area 62 is set within the captured area 61 in the frames #i, #i+1, and #i+2 so that the cropping area 60 does not protrude from the available area 62. In this case, the image loss does not occur, and the shake correction is also effectively maintained.

In the protrusion prevention processing, the requested cropping area CLrq is corrected for each frame so that the effective cropping area CL such as the cropping area 60 of FIG. 20B can be obtained.

An example in which the available area 62 is calculated will be described.

A first calculation scheme is illustrated in FIGS. 21A and 21B.

The available area 62 is set using respective captured areas 61 (imaged areas) of a plurality of consecutive frames including a frame that is the processing target and frames at subsequent points in time in the time axis direction from the frame that is the processing target. In this case, the available area 62 is a range commonly included in the captured areas 61 that are in a state in which the shake has been corrected in the respective frame of the plurality of frames.

FIG. 21A illustrates a superposition of captured areas 61 of a plurality of previous and subsequent consecutive frames (from frame #i-m to frame #i+m) when the current frame is frame #i.

The captured area 61 of each frame is associated with the celestial sphere model MT with the shake correction reflected therein. That is, for each frame, the imaging angle of view (captured area 61) is allocated onto the celestial sphere model MT in consideration of the angle of view or distortion of the lens using the coordinate transformation parameter HP, and rotation is performed using the quaternion QD (#LN). In FIG. 21A, the captured areas 61 that are associated with the celestial sphere model MT and directed in a direction in which the shake correction is canceled are overlapped and shown.

A range commonly included in the captured areas 61 of the plurality of frames, that is, a range in which an AND is taken is a range shaded in FIG. 21A, which is referred to as the available area 62 as illustrated in FIG. 21B.

Since the captured area 61 of each frame is moved by an amount of shake correction, the captured areas 61 of ±m frames before and after such a frame are overlapped and the AND is taken so that the common range is within the captured area 61. Therefore, this range is designated as the available area 62.

As a method of taking the AND, since the area is always a convex polygon, processing of taking intersection of two convex polygons may be repeated for the number of captured areas 61.

In order to reduce a degree of contribution of a frame that is farther from the current frame in time, the amount of shake correction applied to the captured area 61 may be decreased or a frame before the applied shake correction may be increased.

When the degree of contribution is not adjusted according to a time distance, a shape of the available area 62 changes discontinuously when a frame in which a large shake occurs is removed from a range of the ±m frame. On the other hand, it is possible to prevent the available area 62 from temporarily greatly varying by reducing the degree of contribution to the available area 62 for the captured area 61 of the frame far in time.

Further, although the captured area 61 in the range of ±m frames has been used, it is also conceivable to use the captured area 61 up to +m frames that are consecutive in a backward direction on the time axis.

A second calculation scheme will be described as an example in which the available area 62 is calculated with reference to FIGS. 22A, 22B, 22C, and 22D. This is an example in which the available area 62 is a range shown when a low-frequency variation component of change in each end point of the captured area 61 for each of a plurality of frames is accommodated within the captured area 61 of each frame.

Specifically, this is a scheme for calculating the available area 62 on the basis of the quaternion QD to which a low-pass filter is applied.

FIG. 22A is represented in one dimension for simplification of illustration and description, but a solid line indicates a change in an upper end and a lower end of the captured area 61 in each frame. That is, this is a change for each frame due to shake.

A broken line indicates a low-frequency variation component 61L at the upper end and the lower end of the captured area 61 obtained by applying a low-pass filter. An alternate long and short dash line indicates the upper end and the lower end as the available area 62.

Here, the available area 62 can be said as an area desiring that it is guaranteed that the available area 62 is inside the captured area 61 in a plurality of frames, but it cannot be guaranteed that the available area 62 is inside the captured area 61 only by applying a low-pass filter.

Therefore, the low-frequency variation component 61L of the captured area 61 is compensated with an amount protruding from the captured area 61 weighted with a temporal distance, thereby obtaining the available area 62 so that the available area 62 is smoothly accommodated inside the captured area 61.

In FIG. 22B, a part of FIG. 22A (the range of ±m frames) is enlarged, and a direction of weighting is indicated by an arrow.

FIG. 22C illustrates weighting causing the low-frequency variation component 61L to be accommodated in the captured area 61 in two dimensions.

An example of a specific calculation is as follows.

For each frame (#i), a quaternion (q_crcti) necessary to accommodate the low-frequency variation component 61L in the captured area 61 is obtained.

For j∈[−m, m]

Wj=1−|j/m| q_crct_smoothi=max{slerp (q_crcti+j, q_identity; Wj)}, and the quaternion q_crct_smoothi for smooth correction is obtained for all four end points (this equation is a max function for "j").

The quaternion q_crct_smoothi corresponds to a maximum weighting value indicated by an arrow in FIG. 22B.

Slerp is spherical linear interpolation, and q_identity is a unit quaternion.

This is calculated and applied for each end point of the low-frequency variation component 61L as illustrated in FIG. 22C.

The quaternion q_crct is obtained as an amount of rotation until collision with side of the captured area 61 occurs at the time of rotation in a direction toward a center of the captured area 61 for each end point of the low-frequency variation component 61L.

The available area 62 can be calculated using, for example, the first and second calculation schemes.

However, when the available area 62 is created using a motion of the previous and subsequent frames as in the above example, the available area 62 may become too small such that the requested cropping area CLrq is not accommodated when the motion is large.

Figure 23A:
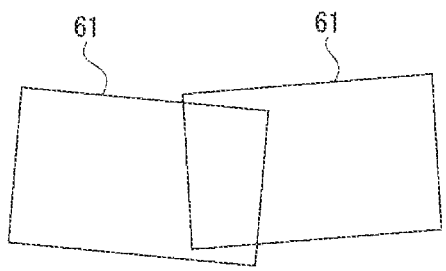
FIGS. 23A, 23B, 23C, 23D, 23E, and 23F are illustrative diagrams of expansion of the available area of the embodiment.
Figure 23B:
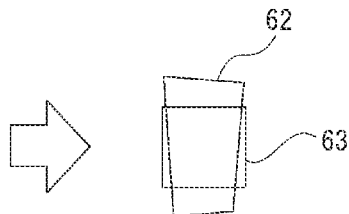

FIG. 23A illustrates a state in which the captured area 61 after the shake correction greatly deviates due to a violent motion between frames. In this case, the available area 62 becomes small as illustrated in FIG. 23B, and the requested cropping area CLrq cannot be accommodated.

Therefore, when a size or shape is such that the requested cropping area CLrq is not accommodated in the available area 62, the available area 62 is expanded so that the requested cropping area CLrq is accommodated.

Figure 23C:
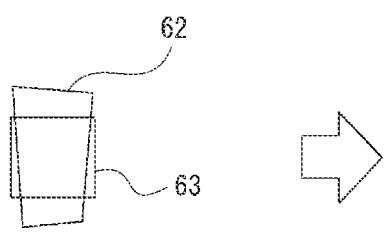

As a scheme therefor, the requested cropping area CLrq is aligned with a center of the available area 62, and the available area 62 is updated so that a protruding portion is accommodated, as illustrated in FIG. 23C. That is, the available area 62 is updated as illustrated in FIG. 23D.

Figure 23D:
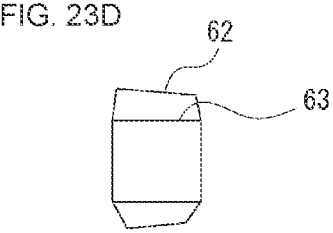

Specifically, a new convex polygon is created by a set of "vertices of the requested cropping area CLrq outside the available area 62" and "vertices of the available area 62 outside the requested cropping area CLrq" in a state of FIG. 23C, and set as an extended available area 62 of FIG. 23D.

Figure 23E:
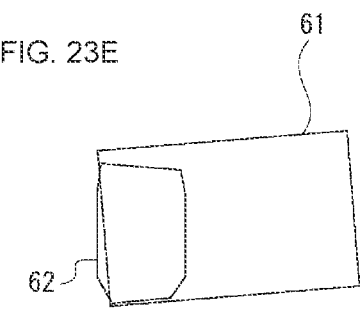
Figure 23F:
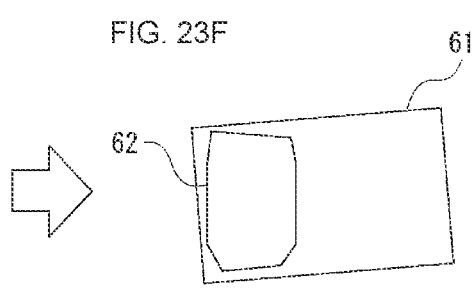

In this case, it cannot be guaranteed that the available area 62 is accommodated in the captured area 61 due to the expansion of the available area 62. For example, the available area 62 may protrude from the captured area 61, as illustrated in FIG. 23E.

Therefore, the available area 62 is moved so that the available area 62 is accommodated in the captured area 61, as illustrated in FIG. 23D.

The expansion of the available area 62 as described above is performed, making it possible to cope with a case of severe shake.

Next, the correction of the display range shown as the third processing in FIG. 19 will be described. That is, this is processing of correcting the requested cropping area CLrq so that the requested cropping area CLrq is accommodated in the calculated available area 62.

When the requested cropping area CLrq protrudes from the available area 62, the requested cropping area CLrq is moved, and movement directions include a yaw direction, a pitch direction, and a roll direction.

In this example, when the requested cropping area CLrq protrudes from the available area 62, correction of a yaw component and a pitch component is preferentially performed.

Figure 24A:
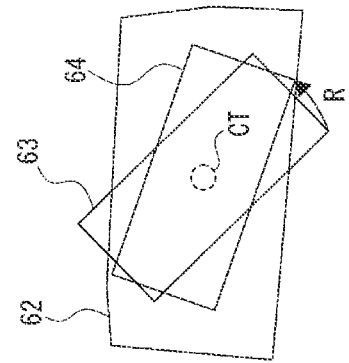
FIGS. 24A, 24B, and 24C are illustrative diagrams of correction of a display range in protrusion prevention processing of the embodiment.

That is, as illustrated in FIG. 24A, the requested cropping area CLrq is moved toward a central CT of the available area 62 by a minimum necessary amount. Here, the roll component is not changed, but is moved due to change in the yaw component and the pitch component (arrow yp).

When the requested cropping area CLrq is accommodated in the available area 62 due to this movement, the correction of the display range is completed. That is, the moved requested cropping area CLrq is set as the effective cropping area CL.

On the other hand, depending on a shape or size of the available area 62, the requested cropping area CLrq may not be accommodated well in the available area 62 only by movement due to change in the yaw component and the pitch component.

Figure 24B:
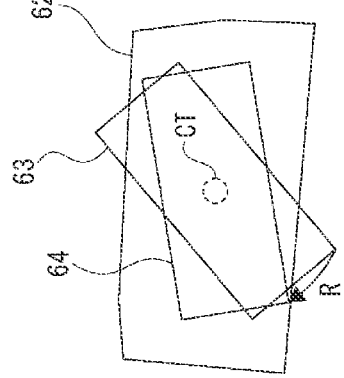
Figure 24C:
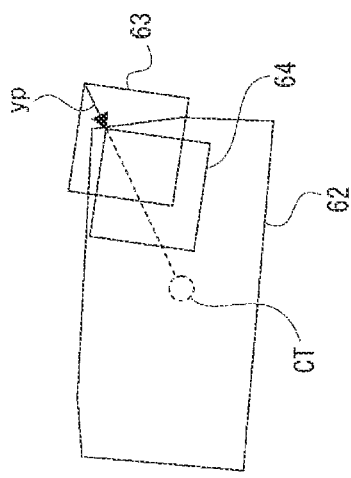

In such a case, first, a center of the requested cropping area CLrq is made to overlap the center of the available area 62. The roll component is changed as illustrated in FIGS. 24B and 24C. In this case, the entire requested cropping area CLrq is rotated by a minimum amount of rotation required so that the requested cropping area CLrq is accommodated in the available area 62, as indicated by an arrow R in FIGS. 24A, 24B, and 24C. The requested cropping area CLrq that is in a state in which the requested cropping area CLrq is accommodated in the available area 62 is set as the effective cropping area CL.

Figure 25:
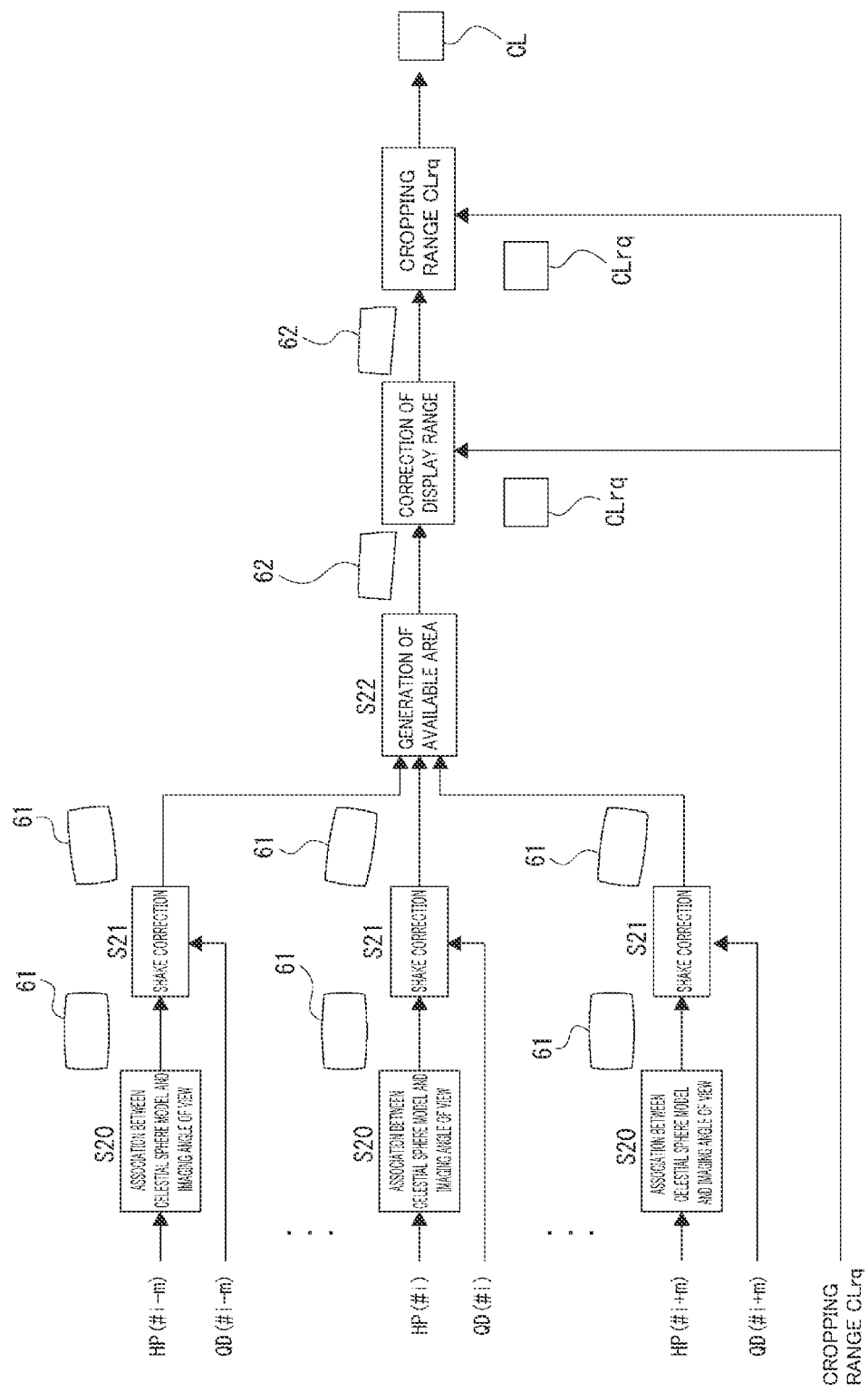
FIG. 25 is an illustrative diagram of a procedure for the protrusion prevention processing of the embodiment.

FIG. 25 illustrates an overall flow of the protrusion prevention processing. In FIG. 25, m frames (frames #i−m to frame #i+m) before and after a current frame #i are shown.

For each frame, in step S20, the celestial sphere model MT and the imaging angle of view are associated with each other using a corresponding coordinate transformation parameter HP (HP(#i−m) . . . HP(#i+m)). Accordingly, the captured area 61 is expressed on the ideal celestial sphere.

Then, as step S21, the shake correction is performed using the corresponding quaternion QD (QD (#i−m) . . . QD (#i+m)).

For example, the quaternion QD (#i) corresponding to frame #i is the quaternion QD (LN) corresponding to each line in the frame #i.

In this step S21, the captured area 61 directed in a direction in which the shake is canceled is expressed on the celestial sphere model MT.

The available area 62 is generated in step S22 using the captured area 61 for each frame. The first calculation scheme, the second calculation scheme, and the like described above can be used.

The calculated available area 62 is expanded as necessary in step S23. That is, the requested cropping area CLrq determined by the requested cropping area CLrq and the available area 62 are compared with each other, and the above-described expansion processing is performed when the requested cropping area CLrq is not accommodated in the available area 62.

When the available area 62 is settled, the display range is corrected in step S24. That is, the requested cropping area CLrq is corrected and set as the effective cropping area CL, as described with reference to FIGS. 24A, 24B, and 24C. The effective cropping area CL is finally provided, as the cropping area CL corrected in the protrusion prevention processing, to the plane projection and cropping processing of step ST19 in FIG. 14.

In the protrusion prevention processing as illustrated in FIG. 25, dynamical change of the shake correction margin is realized by reflecting shake information of the previous and subsequent frames in the available area 62.

Further, the aspect ratio, cropping position, and size of the output image are expressed by the requested cropping area CLrq and the requested cropping area CLrq is accommodated in the available area 62, so that processing that considers the shake correction, cropping position, and the like at the same time is realized.

Although the above description has been made assuming the image file MF captured using a normal lens, the same processing can be applied to an image file MF captured using, for example, a fisheye lens.

However, in the case of a normal lens and a fisheye lens, an expression of the captured area 61 is different.

Figure 26B:
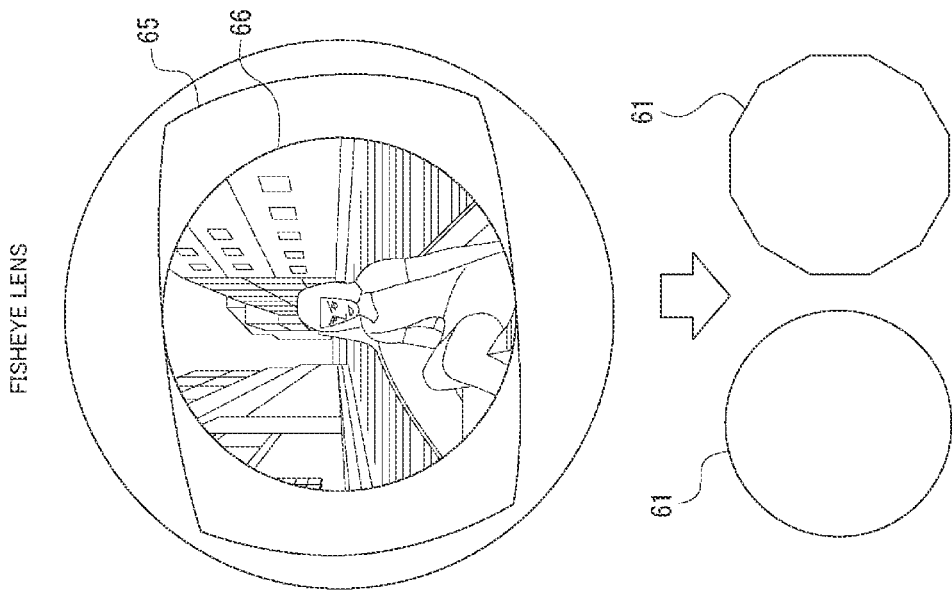
FIGS. 26A and 26B are illustrative diagrams of a difference in a captured area depending on a lens of the embodiment.
Figure 26A:
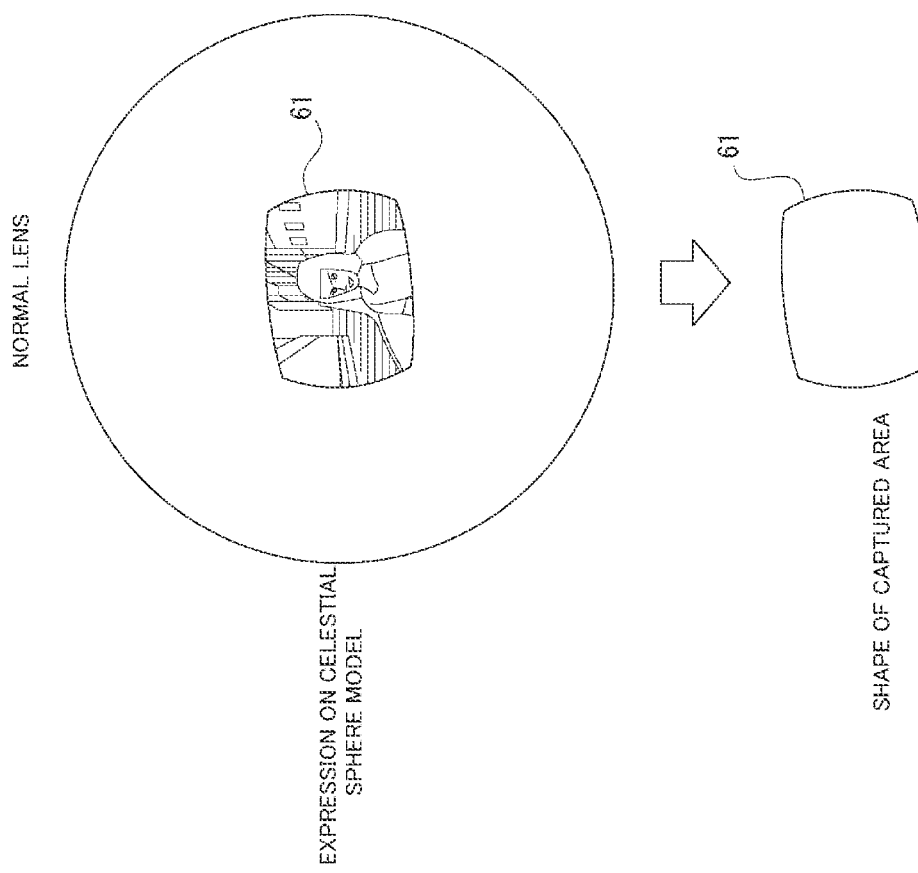

FIG. 26A illustrates expression on the celestial sphere model MT and a shape of the captured area 61 in the case of a normal lens, and FIG. 26B illustrates expression on the celestial sphere model MT and a shape of the captured area 61 in the case of a fisheye lens. In the case of imaging using a fisheye lens, a circular image formation area 66 is formed within an imaging pixel range 65 of the image sensor 12a, and thus, the captured area 61 is represented by a circle or a polygon as illustrated in FIG. 26A.

<5. Conclusion and Modification Examples of Image Processing>

The following effects can be obtained by the image processing in the above embodiment.

The image processing device of the embodiment includes the shake correction unit 33 that performs the shake correction using the posture information (the IMU data and the quaternion QD) corresponding to each frame on each of frames of image data constituting the moving image, which are the frames subjected to the processing of pasting to the celestial sphere model MT. Further, the image processing device includes the effective cropping area setting unit 34 that performs, on the requested cropping area CLrq, the protrusion prevention processing for performing correction so that the effective cropping area CL from each frame does not protrude from the movable area in which the effective shake correction is maintained, to thereby set the effective cropping area CL to be applied to each frame. Further, the image processing device includes the effective cropping area image generation processing unit 35 that performs the processing of generating the effective cropping area image that is an image projected from the celestial sphere model MT onto the plane model after the shake correction is performed by the shake correction unit 33, which is an image of the effective cropping area CL set by the effective cropping area setting unit 34.

That is, the shake caused by camera shake or the like in the image captured by the imaging device 1 is corrected through coordinate transformation on the celestial sphere model MT, and the effective cropping area CL of the image subjected to the shake correction and the plane projection is set.

Rotation taking the correction for the shake into account is performed on each frame on the celestial sphere model MT for the shake correction, such that a correction without trapezoidal distortion can be performed. Then, by obtaining a plane projection image according to the requested cropping area CLrq set through, for example, a user operation or some automatic control, the effective cropping area CL in which the requested cropping area CLrq has been reflected can be set, the shake correction can be performed, and the output image data oPD without trapezoidal distortion can be obtained. Further, it is possible to output a moving image in which the shake correction has been appropriately reflected, by performing the protrusion prevention processing.

Accordingly, a high-quality image with less shake or distortion after an output area suitable for the user and a request of automatic control is reflected in the original image file MF can be obtained.

In the embodiment, an example in which the image of the effective cropping area CL is cropped after the shake correction is performed in the celestial sphere model MT and the plane projection is made has been described, but the present technology is not limited thereto. That is, it is also possible to generate the image of the effective cropping area CL by cropping the image of the effective cropping area CL in a state in which the shake correction is performed in the celestial sphere model MT and projecting the image onto the plane.

Further, the shake correction unit 33 may perform at least the processing of step ST15 of FIG. 14, and some or all of steps ST11, ST12, ST13, and ST14 may be performed outside the function of the shake correction unit 33 (for example, a device different from the image processing device including the shake correction unit 33). Further, FIG. 8 illustrates a case in which the RAW data is an image processing target, but in this case, in the shake correction unit 33, the processing of canceling the internal correction of the imaging device in step ST12 is not necessary.

In the embodiment, an example in which the effective cropping area setting unit 34 sets the effective cropping area CL using the operation information (DR1 and DR2) based on the user operation has been given.

Accordingly, the shake correction is performed after a user's intention or an output area desired by the user is appropriately reflected, and the output image data oPD without trapezoidal distortion can be obtained.

In the embodiment, an example in which the effective cropping area setting unit 34 performs setting of the effective cropping area CL using the tracking target information regarding the tracking target has been given.

This makes the cropping area setting taking the tracking target into account possible. Further, in the embodiment, an example in which the effective cropping area setting unit 34 sets the tracking target using the operation information DR1 based on the user operation has been given.

This makes the cropping area setting taking the subject (tracking target) that the user wants to pay attention into account possible. That is, it is possible to obtain an output image on which shake correction is appropriately performed while capturing a subject to be noticed.

Of course, processing when the tracking target is not designated is also assumed. For example, the user may not perform designation of the tracking target as described with reference to FIGS. 13A and 13B. In such a case, setting of the effective cropping area CL according to the operation described with reference to FIGS. 12A, 12B, and 12C may be performed.

Further, processing of automatically designating the tracking target regardless of a setting by the user may be performed. For example, this is processing of performing face detection and automatically setting a face as a tracking target when the face is detected.

In the embodiment, an example in which the tracking target is determined on the basis of the operation information DR1 for designating the tracking target, and the effective cropping area CL of each frame constituting the moving image is set according to the position in the image of the determined tracking target has been given.

That is, when the subject of the tracking target is designated by the operation of the user, the effective cropping area CL is set in consideration of the placement of the tracking target in each frame.

This makes the cropping position setting possible so that the subject (tracking target) that the user wants to pay attention is not out of frame as the moving image progresses.

In the embodiment, an example in which the effective cropping area CL of each frame constituting the moving image is set by using the operation information DR2 for designating the placement position of the tracking target in the screen has been given.

Accordingly, the user designates a place at which a subject (tracking target) to which the user wants to pay attention is displayed inside the screen, and the cropping area setting can be performed so that the tracking target is located at the placement position (near the placement position) inside the screen in each frame. Therefore, moving image processing in which the moving image progresses in a state in which the subject serving as the tracking target is near a placement position desired by the user, such as a position from a center or the left side of the screen, is realized.

There may be a processing example in which the placement position of the tracking target is not designated. For example, this is a processing example for preventing at least the tracking target from being out of frame.

Further, the tracking target placement position may be automatically designated. For example, the tracking target placement position is automatically set to a predetermined position such as the center of the screen or a position near the right. This makes the cropping area setting possible so that the tracking target can be captured at a predetermined position even when the user does not perform an operation for designating the tracking target placement position.

In the embodiment, an example in which the operation information DR2 for designating the output area of the image is used for setting of the effective cropping area CL has been given.

For example, the area of the output image can be designated through a user operation on the framing screen 103 described with reference to FIGS. 12A, 12B, and 12C, and the operation information DR2 is used for setting of the effective cropping area CL.

This makes it possible to obtain an output image on which the shake correction has been appropriately performed while cropping the output area of the image arbitrarily designated by the user.

In the embodiment, an example in which the operation information DR2 for designating the aspect ratio of the image is used for setting of the effective cropping area CL has been given.

For example, the aspect ratio of the output image can be designated through an operation of the user on the aspect ratio setting screen 106, and the operation information DR2 is used for setting of the cropping area.

This makes it possible to obtain an output image having an aspect ratio arbitrarily designated by the user, on which the shake correction has been appropriately performed.

In the embodiment, an example in which the first processing of setting the requested cropping area CLrq at the coordinates of the celestial sphere model MT in which the shake correction unit 33 has performed the shake correction, the second processing of obtaining the movable area (available area 62) that allows a variation in the requested cropping area CLrq in the imaged area (captured area 61), and the third processing of setting the effective cropping area CL by correcting the requested cropping area CLrq so that the requested cropping area CLrq is accommodated in the movable area (available area 62) are performed as the protrusion prevention processing that is performed on each frame of the image data has been given.

Accordingly, the tracking target or the output area arbitrarily designated by the user, or the cropping area based on the aspect ratio or the like does not vary indefinitely depending on image content, or the like, but is corrected into a range in which the shake correction can be maintained appropriately. Therefore, it is possible to obtain the output image data oPD on which the shake correction has been appropriately performed, while reflecting various designations of the user. Further, in order for the shake correction to be able to be appropriately maintained, an imaged area (captured area 61) is set at the coordinates of the celestial sphere model MT in which the shake correction has been performed, a movable area (available area 62) is calculated in the imaged area, and the requested cropping area CLrq is corrected so that the requested cropping area CLrq is accommodated in the available area 62. The corrected requested cropping area CLrq is set as the final effective cropping area CL. That is, the cropping area is limited by the available area 62. This makes it possible to appropriately perform a cropping area setting in which the shake correction in the celestial sphere model MT is reflected.

In the second processing in the protrusion prevention processing of the embodiment, an example in which the available area 62 is set using respective captured areas 61 of the plurality of consecutive frames including the frame that is the processing target and the frames at the subsequent points in time and the frames at the previous point in time in the time axis direction from the frame that is the processing target has been described.

That is, the captured areas 61 of the plurality of consecutive frames is used as in the first calculation scheme of FIGS. 21A and 21B or the second calculation scheme of FIGS. 22A, 22B, 22C, and 22D, making it possible to detect the image range that is commonly included in the respective frames even when there is shake occurring in the time axis direction (between the frames) for a certain period of time. This is an area in which the image is not lost in a period of the plurality of frames and the shake correction is effective. This is referred to as the available area 62. Accordingly, the available area 62 is dynamically changed depending on the magnitude of the shake, so that the cropping area setting that does not cause an image loss due to the shake and can also maintain the shake correction on the moving image based on the output image data oPD is realized. Therefore, it is possible to easily create a high-quality moving image.

The available area 62 can also be set using respective captured areas 61 of the plurality of consecutive frames including the frame that is the processing target and the frames at subsequent points in time in the time axis direction from the frame that is the processing target.

Further, the available area 62 can also be set using respective captured areas 61 of the plurality of consecutive frames including the frame that is the processing target and the frame at a previous point in time in the time axis direction from the frame that is the processing target.

In the embodiment, an example in which the available area 62 is the range that is commonly included in the captured areas 61 that is in a state in which the shake correction for each of the plurality of frames has been performed has been given.

That is, it is possible to set the available area 62 that is a range in which no image loss occurs even when a cropping frame is set, by using the captured area 61 that is in a state in which the shake correction has been performed on the plurality of consecutive frames, as described as the first calculation scheme in FIGS. 21A and 21B. Since this is a range common to the captured areas 61 that are in a state in which the shake correction has been performed, the shake correction is also in an effective range.

Further, in this case, the captured area 61 may be used as it is, but the degree of contribution is adjusted depending on the time distance by changing a degree of the shake correction of the captured area 61 depending on a distance from the current frame, making it possible to mitigate an influence of, for example, large shake at a distant point in time and smooth a change in the available area 62. This does not cause a state in which the angle of view changes suddenly in the playback moving image.

In the embodiment, an example in which the available area 62 is the range shown when the low-frequency variation component 61L of the change in each end point of the captured area 61 for each of the plurality of frames is accommodated in the captured area 61 of each frame has been given.

That is, this is an example described as the second calculation scheme in FIGS. 22A, 22B, 22C, and 22D.

The available area 62 of each frame is set using the low-frequency variation component 61L of the change in each end point of the captured area 61, making it possible to smooth the change of the available area 62 in the time axis direction and obtain a moving image in which the change of the cropping area does not suddenly occur.

However, since it is not possible to compensate for the fact that the image loss does not occur (that is, the cropping area is within the captured area 61) simply by using the low-frequency variation component 61L, a position of each end point defined by the low-frequency variation component 61L is corrected so that the cropping area is accommodated in the captured area 61 for each frame. This makes it possible to obtain a moving image in which an image loss does not occur and a change in the cropping area is smooth.

The third processing in the protrusion prevention processing of the embodiment is performed by moving the requested cropping area CLrq toward the center of the available area 62 without rotating the requested cropping area CLrq until the requested cropping area CLrq is accommodated in the available area 62.

That is, as the correction of the display range, the requested cropping area CLrq is moved without being rotated by a necessary distance until the requested cropping area CLrq is accommodated in the available area 62, as described in FIGS. 24A, 24B and 24C. Accordingly, the tracking target or the output area arbitrarily designated by the user, or the cropping area based on the aspect ratio or the like is moved into the available area 62 not to cause rotation as much as possible, thereby preventing the image from rotating unnecessarily on the moving image that is played back.

Further, in the third processing of the embodiment, when the requested cropping area CLrq is not accommodated in the available area 62 by movement of the requested cropping area CLrq toward the center of the available area 62 without rotation of the requested cropping area CLrq, the requested cropping area CLrq is rotated so that the requested cropping area CLrq is accommodated in the available area 62.

That is, the requested cropping area CLrq is rotated only when the requested cropping area CLrq is not accommodated in the available area 62 in a state in which the requested cropping area CLrq is not rotated. Thus, the rotation is performed only when the rotation is unavoidable as correction of the cropping area, so that the image loss is prevented as much as possible.

In the embodiment, the shake correction unit 33 acquires the posture information (quaternion QD) corresponding to each frame on the basis of the metadata generated at the time of capturing the image data (image file MF) that is a processing target, and uses the posture information for the shake correction. The quaternion QD, which is the posture information of the imaging device, is calculated from the IMU data added as the metadata. The shake correction on the celestial sphere model MT is performed using the quaternion QD, making it possible to perform appropriate shake correction according to a situation at the time of imaging. In particular, in the case of the embodiment, since the internal correction of the camera performed at the time of imaging is canceled, reflecting the posture of the imaging device 1 at the time of imaging as it is enables optimum shake correction.

In the embodiment, an example in which the shake correction is performed on each frame of the image data using the posture information (quaternion QD (LN)) acquired on the basis of the timing of the exposure centroid for each line has been given (see step SST14 in FIG. 14).

Relative shake between the subject and the imaging device in the exposure period causes so-called blur, which becomes more noticeable when the exposure time becomes longer depending on the shutter speed. In this case, when posture information at an exposure start timing of each line is used, relative shake in the exposure period of each line becomes shake in one direction when viewed from the posture information, and becomes more noticeable on the image.

On the other hand, when the posture information is acquired on the basis of the IMU data at the centroid position in the exposure period of each line as illustrated in FIG. 16, relative shake in the exposure period becomes bidirectional shake when viewed from a state of the posture information, and visually, the shake seems to be offset in a time direction so that the blur is less noticeable in the image.

In the embodiment, the shake correction unit 33 performs correction cancellation processing on the image data that is a processing target using the metadata associated with the image data, and performs the processing of pasting to the celestial sphere model MT in a state in which return to a state before the correction processing, which has already been performed, is performed (see step SST12 in FIG. 14).

For example, in the imaging device 1, the correction processing such as image stabilization is performed at the time of imaging, but the correction that has already been performed is cancelled and then the shake correction is performed on the image data that is a processing target.

Accordingly, appropriate shake correction can be performed on original captured image data, for example, image data that is in a state of being taken out from the imaging element unit 12, without being affected by the correction at the time of imaging. That is, high-quality shake correction can be realized according to processing capacity of the image processing device without being affected by, for example, performance of the imaging device 1 that has performed imaging.

In the embodiment, the shake correction unit 33 performs the correction cancellation using the coordinate transformation parameter HP associated with each frame of the image data as metadata.

The coordinate transformation parameter HP is information in a case in which an image frame (an image range including the angle of view) of the captured image is changed, such as respective parameters of lens distortion, trapezoidal distortion, focal plane distortion, electric image stabilization, and optical image stabilization. This makes it possible to cancel the correction regarding the image frame at the time of imaging, and to perform return to an original state when the image frame (range of the image) is corrected by the imaging device 1.

The image processing device of the embodiment includes the preprocessing unit 31 that extracts and stores the metadata corresponding to each frame of the image data with respect to the image file MF including the image data constituting the moving image and the corresponding metadata.

Accordingly, the metadata for each frame can be used in the processing of the shake correction unit 33 or the processing of the effective cropping area setting unit 34.

The processing of steps ST1 to ST4 is illustrated in FIG. 14 as the processing using the function of the preprocessing unit 31 of the image processing device of the embodiment, but the present technology is not limited thereto. The preprocessing unit 31 may perform at least processing of calculating the posture information according to the metadata (for example, step ST4), and holding of the metadata (for example, step ST3).

Further, the processing of steps ST11 to ST19 is illustrated in FIG. 14 as the processing using functions of the image processing unit 32, but the present technology is not limited thereto. For example, the processing of step ST11 may be performed externally, and in that case, the image processing unit 32 may perform the processing of steps ST12 to ST19.

Further, the image processing unit 32 may not perform the processing of canceling the correction inside the imaging device in step ST12.

Further, it is also conceivable that the image processing unit 32 does not perform processing regarding the tracking in step ST16.

Further, it is also conceivable that the image processing unit 32 does not perform the synchronization processing of step ST14.

At least, the image processing device of the present disclosure may perform steps ST13 (pasting to the celestial sphere model MT), step ST15 (shake correction), step ST17 (output area designation), step ST18 (protrusion prevention processing), and step ST19 (plane projection and cropping) as the processing of the image processing unit 32.

A technology described in the embodiment can be applied to the following cases of respective examples as image stabilization in the imaging device 1. Optical image stabilization referred to hereinafter is correction of shake of an inter-frame component. Further, the electric image stabilization also includes a case of only focal plane correction.

Case in which optical image stabilization is performed and the electric image stabilization is not performed Case in which neither optical image stabilization nor the electric image stabilization is performed Case in which optical image stabilization is not performed and the electric image stabilization is performed.

Case in which both optical image stabilization and the electric image stabilization are performed The processing of the image processing device of the embodiment can be applied to the image captured by the imaging device 1 in each of these cases.

<6. UI for Image Processing>

Next, details of the display screen related to image processing of which the overview is shown with reference to FIG. 11 or the like will be described.

Here, the reception of user operations on various screens or the display control according to the operations to be described below is realized through processing of the CPU 71 shown as the reception unit 36a or the display control unit 36b of the UI processing unit 36 described above.

[Import Screen]

FIG. 27 is a diagram illustrating an example of the import screen 101. As described above, the import screen 101 is a screen that appears on the display unit 77 according to the activation of the application program for moving image processing, and selection of the image file MF that is a processing target is performed by the user.

As illustrated in FIG. 27, a menu button I11, a folder selection area I12, a thumbnail display area I13, and a selection completion button I14 are provided in the import screen 101.

When the menu button I11 is operated (for example, a touch operation), a menu panel I1ia shown outside the screen in FIG. 27 is displayed. The menu panel I11a is shown outside the screen for the convenience of illustration, and in reality, the menu panel I11a is overlaid on the menu button I11.

A setting button I11b is disposed on the menu panel I11a, and when the setting button I11b is operated, the setting screen 107 described above is called.

An application folder button I12a and an "All" button I12b are displayed in the folder selection area I12. The application folder button I12a is a button for selecting a folder for the application program for moving image processing secured in the mobile terminal 2, and when the application folder button I12a is operated, a thumbnail image I13a of the image file MF stored in an application folder is displayed in the thumbnail display area I13. Further, the "All" button I12b is a button for selecting a folder in which all the image file MFs are stored in the mobile terminal 2, and when the "All" button is operated, the thumbnail image I13a of the image file MF stored in the folder is displayed in the thumbnail display area I13. In the folder selection area I12, the application folder button I12a has been selected by default.

In the thumbnail display area I13, some frame images in the image file MF are displayed as respective thumbnail images I13a, but in this example, an image of a first frame is displayed. In this example, in the case of the image file MF of which a playback time exceeds one hour, the thumbnail image I13a is displayed in a grayout manner and an error dialog is displayed at the time of tapping.

Figure 28:
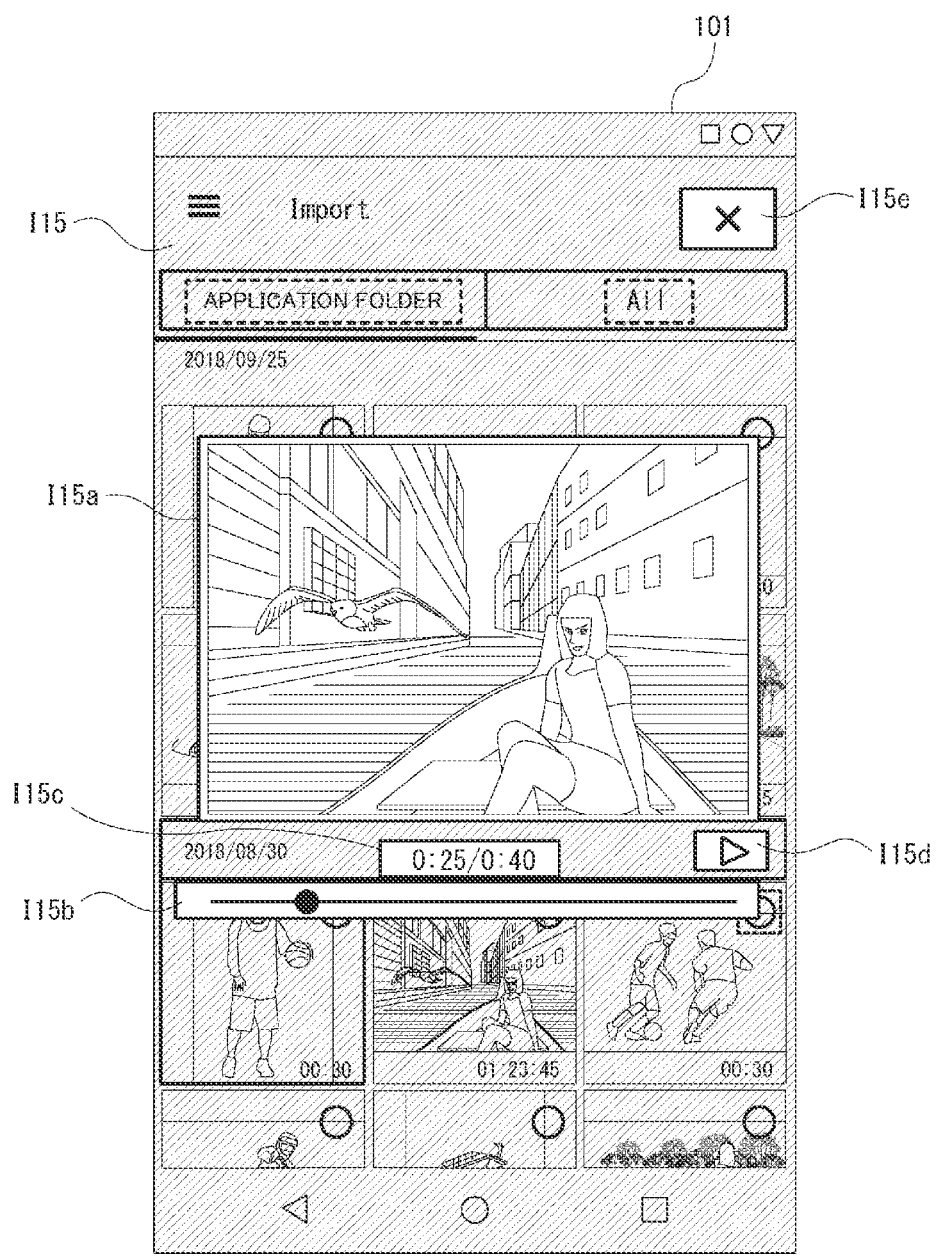
FIG. 28 is a diagram illustrating an example of an import screen at the time of overlay playback.

When a predetermined operation (for example, an operation for tapping a part other than the selection reception button I13b that will be described below) is performed with respect to the thumbnail image I13a displayed in the thumbnail display area I13, the moving image of the corresponding image file MF is overlaid and played back in the import screen 101 in an aspect illustrated in FIG. 28. In the import screen 101 at the time of overlay playback, an overlay display area I15 (in this example, an entire area of the import screen 101 is overlaid) is provided, a moving image display area I15a in which the playback moving image is displayed is provided in the overlay display area I15, and a seek bar I15b, playback time information I15c, a playback button I15d, and a close button I15e are displayed. When the playback button I15d is operated, the moving image playback in the moving image display area I15a is started, and when the playback button I15d is operated again, the moving image playback is paused. The seek bar 15b indicates a playback completion portion and other portions in different display aspects, and fast forward/rewind becomes possible according to an operation for sliding a round portion.

In this example, the playback time information I15c indicates both a total time of the moving image and a time of a portion being played back.

When the close button I15e is operated, the overlay playback ends and the import screen 101 returns to a state before the overlay playback (for example, a state illustrated in FIG. 27).

Although an example in which an operation for tapping a portion other than the selection reception button I13b in the thumbnail image I13a is an operation for instructing the overlay playback has been given above, a playback button Pb for an overlay playback instruction can also be provided, for example, as illustrated in a circled broken line in a lower portion of FIG. 27. In this case, a thumbnail selection operation (an operation for selecting an import target) to be described below is an operation for tapping a predetermined area other than a display area of the playback button Pb as indicated by a satin portion in FIG. 27.

As illustrated in FIG. 27, the selection reception button I13b is provided in each thumbnail image I13a in the thumbnail display area I13. When the selection reception button I13b is operated, the CPU 71 determines whether or not import is to be performed on the basis of the meta information of the image file MF. As a specific determination, the CPU 71 determines Whether or not a 51st image file MF is newly selected in a state in which 50 image file MFs have already been selected.

Whether a total time of a selected moving image exceeds 60 minutes when the newly selected image file MF is included.

Whether or not the image file MF is not processing target (an image file MF generated by the imaging device 1 other than a target model).

When a determination is made that import is possible (when a negative result is obtained in all the above determinations) as a result of the above determination, the CPU 71 sets a display aspect of the operated selection reception button I13b to a display aspect (for example, a specific color display) indicating a selected state (see FIG. 29A). Further, numerical information for indicating how many times has the image file MF been selected is indicated in the operated selection reception button I13b (see FIG. 29A). For example, in the case of the first selected image file MF, a notation of "1" is performed).

Here, when the selection reception button I13b in a selected state is operated again, a display aspect indicating the selected state of the selection reception button I13b is released, and the selected state of the corresponding image file MF is also released.

It is not essential to display the numerical information indicating how many times has the selection reception button I13b been selected.

In the import screen 101, the selection completion button I14 is deactivated by, for example, a grayout display in a state in which there is no image file MF in a selected state in the thumbnail display area I13 (see FIG. 27). When at least one image file MF is in a selected state in the thumbnail display area I13, the selection completion button I14, for example, is changed from a grayout display to a normal display and activated (FIG. 29A).

When the selection completion button I14 activated in this way is operated, the display transitions to, for example, a display of the preview screen 102 illustrated in FIG. 29B.

The selected image file MF is settled as the image file MF that is an image processing target by an operation of the selection completion button I14. In this example, the selected image files MF are concatenated in the selected order according to the operation of the selection completion button I14.

[Preview Screen]

Figure 30:
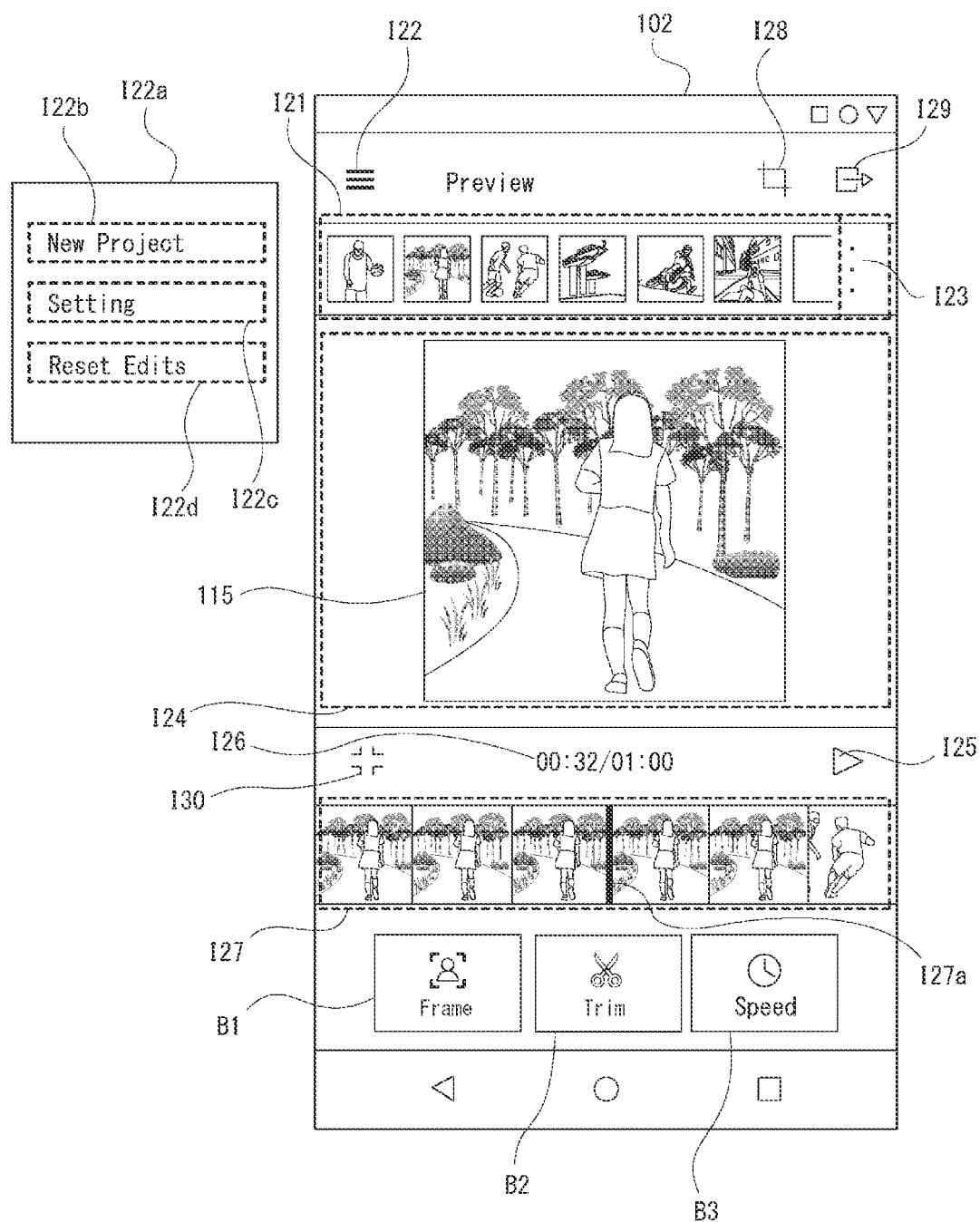
FIG. 30 is a diagram illustrating an example of a preview screen.

Details of the preview screen 102 will be described with reference to FIG. 30. As illustrated in FIG. 30, a moving image list area I21, a menu button I22, a moving image menu button I23, a preview area I24, a playback button I25, a playback time display area I26, a timeline I27, an aspect ratio setting button I28, and an export button I29 are provided in the preview screen 102, and a frame button B1, a trim button B2, and a speed button B3 are provided in a lower portion of the screen.

On the preview screen 102, thumbnail images of the image files MF selected as the image processing targets on the import screen 101 are displayed in the moving image list area I21 in an order of selection. When the number of selected image files MF is large and the image files MF cannot be displayed at a time, the image files MF can be scrolled horizontally by swipe. When the thumbnail image in the moving image list area I21 is tapped, a focus frame is displayed in the thumbnail image, and a first frame of the image file MF is displayed in the preview area I24. In this case, a playback position bar I27a on the timeline I27 also moves to that position (when the playback position bar I27a is tapped during playback, jumping occurs while continuing the playback).

Further, when the thumbnail image is long-pressed in the moving image list area I21, an order of the moving images can be changed through a drag and drop operation (when the order is changed, the timeline I27 is redrawn).

Figure 31:
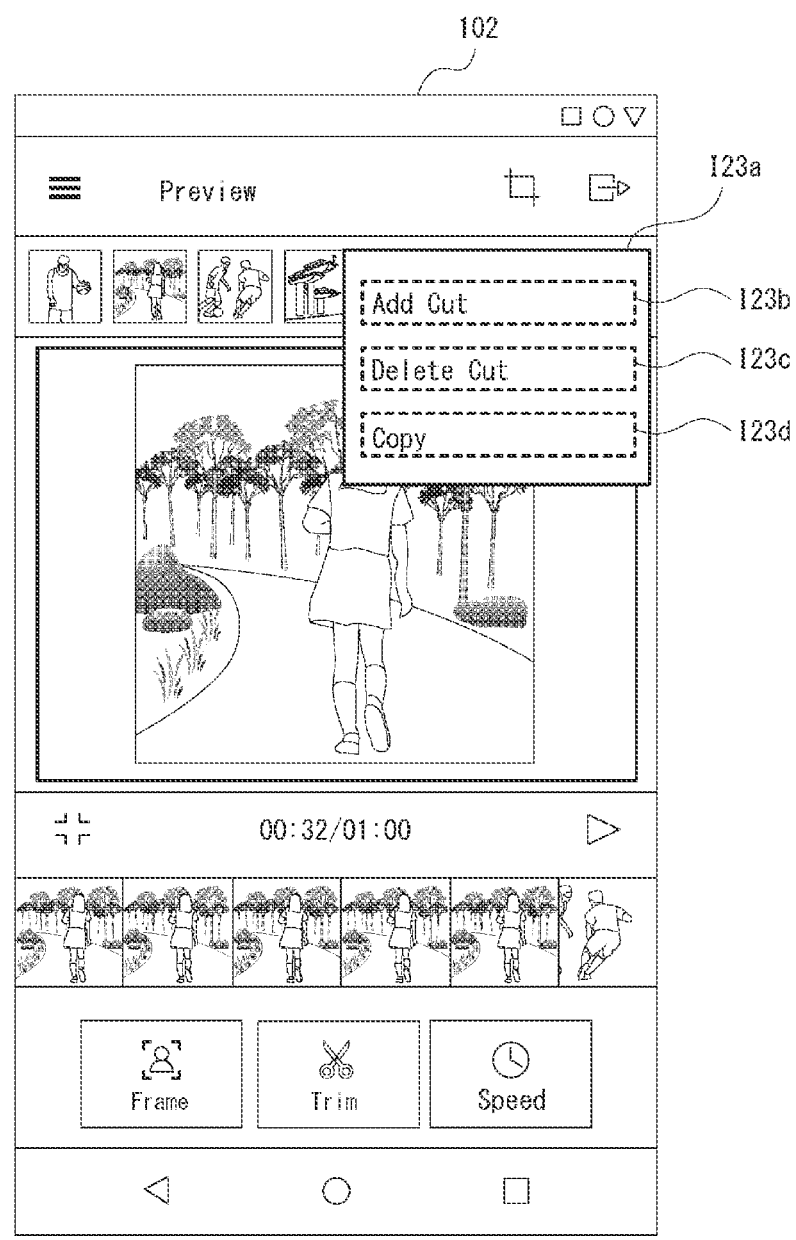
FIG. 31 is a diagram illustrating an example of the preview screen at the time of calling of a moving image menu panel.

The moving image menu button I23 is disposed near the moving image list area I21 and functions as a call instruction button of a moving image menu panel I23a. FIG. 31 illustrates the preview screen 102 when the moving image menu panel I23a is called. As illustrated in FIG. 31, a moving image addition button I23b, a moving image deletion button I23c, and a moving image copy button I23d are disposed on the moving image menu panel I23a. When the moving image addition button I23b is operated, the display transitions to the import screen, and the moving image that is an image processing target can be added. When the moving image deletion button I23b is operated, a confirmation dialog (not illustrated) is displayed on the preview screen 102, and when OK is tapped on the dialog, a moving image in focus in the moving image list area I21 is deleted (excluded from the image processing target). When the moving image is deleted in this way, the focus frame in the moving image list area I21 shifts to the next moving image (thumbnail image) (when the moving image at the end of the list is deleted, the focus frame shifts to a previous one).

When the moving image copy button I23d is operated, the moving image in focus is copied in the moving image list area I21 and inserted immediately after the moving image in focus. When the moving image that is a copy target is a moving image subjected to image processing such as framing, trimming, and speed that will be described below, the moving image is copied with image processing content maintained. When the moving image copy button I23d is operated and a total time exceeds one hour after copying, an error dialog is displayed according to the operation with respect to the moving image copy button I23d.

In FIG. 30, the menu button I22 functions as a call instruction button for a menu panel I22a as shown outside the screen in FIG. 30. The menu panel I22a is actually displayed in an overlaid manner inside the screen, like the previous menu panel I11a (FIG. 27). A new project button I22b, a setting button I22c, and processing reset button I22d are displayed on the menu panel I22a. When the new project button I22b is operated, a confirmation dialog is displayed, and when OK is tapped on the dialog, all pieces of content of the image processing performed until then are discarded and the transitions to the import screen 101 occurs. When the setting button I22b is operated, transitions to the setting screen 107 occurs. When the processing reset button I22d is operated, a confirmation dialog is displayed, and when OK is tapped on the dialog, image processing content of framing, trimming, and speed are all discarded. In this example, the addition of the moving image and the change of the aspect ratio (change on the aspect ratio setting screen 106) are not reset.

The preview area I24 is an area in which the moving image being played back is displayed and a frame image at a relevant playback position is displayed when playback is paused (temporarily stopped). The display frame 115 is disposed in the preview area I24, and in the preview screen 102 illustrated in FIG. 30 (that is, the preview screen 102 in which the preview area I24 is in a zoom-in display state that will be described below), a playback moving image or a paused image is displayed in the display frame 115.

Here, the display frame 115 corresponds to a frame indicating a cropping range from the original image (see description of the framing screen 103 that will be described below). An area inside the display frame 115 is an aspect of a "display area" defined in the claims.

The playback button I25 functions as a playback start instruction button for a moving image that is a current target (the moving image focused in the moving image list area I21). When the playback button I25 is operated, playback of the moving image that is the current target in the preview area I24 is started. When the playback is started, switching occurs from a display of the playback button I25 to the display of a pause button (not illustrated). When this pause button is operated, the moving image playback in the preview area I24 is paused, and switching occurs from the display of the pause button to the display of the playback button I25.

In the playback time display area I26, a total playback time (a sum of playback times of all the moving images selected as the image processing targets) and a time of a portion being currently played back are displayed.

In the timeline I27, a timeline in which all the moving images selected as image processing targets are concatenated is displayed. In this example, the playback position bar I27a is displayed within the timeline I27, and indicates a current playback position on the timeline I27. In the preview screen 102 in this example, the playback position bar I27a is fixed at left and right center positions of the timeline I27.

Further, in the timeline I27 on the preview screen 102 of this example, when the current playback position is the beginning of the concatenated moving images, the left side from the playback position bar I27a is painted black and displayed and when the current playback position is the end of the concatenated moving images, the right side from the playback position bar I27a is painted black and displayed.

Here, in the timeline I27 on the preview screen 102 of this example, when there is a moving image section in which processing of changing the playback speed in the speed screen 105 or a tracking processing in the framing screen 103 has been performed, a display for indicating the moving image section is performed.

Figure 32:
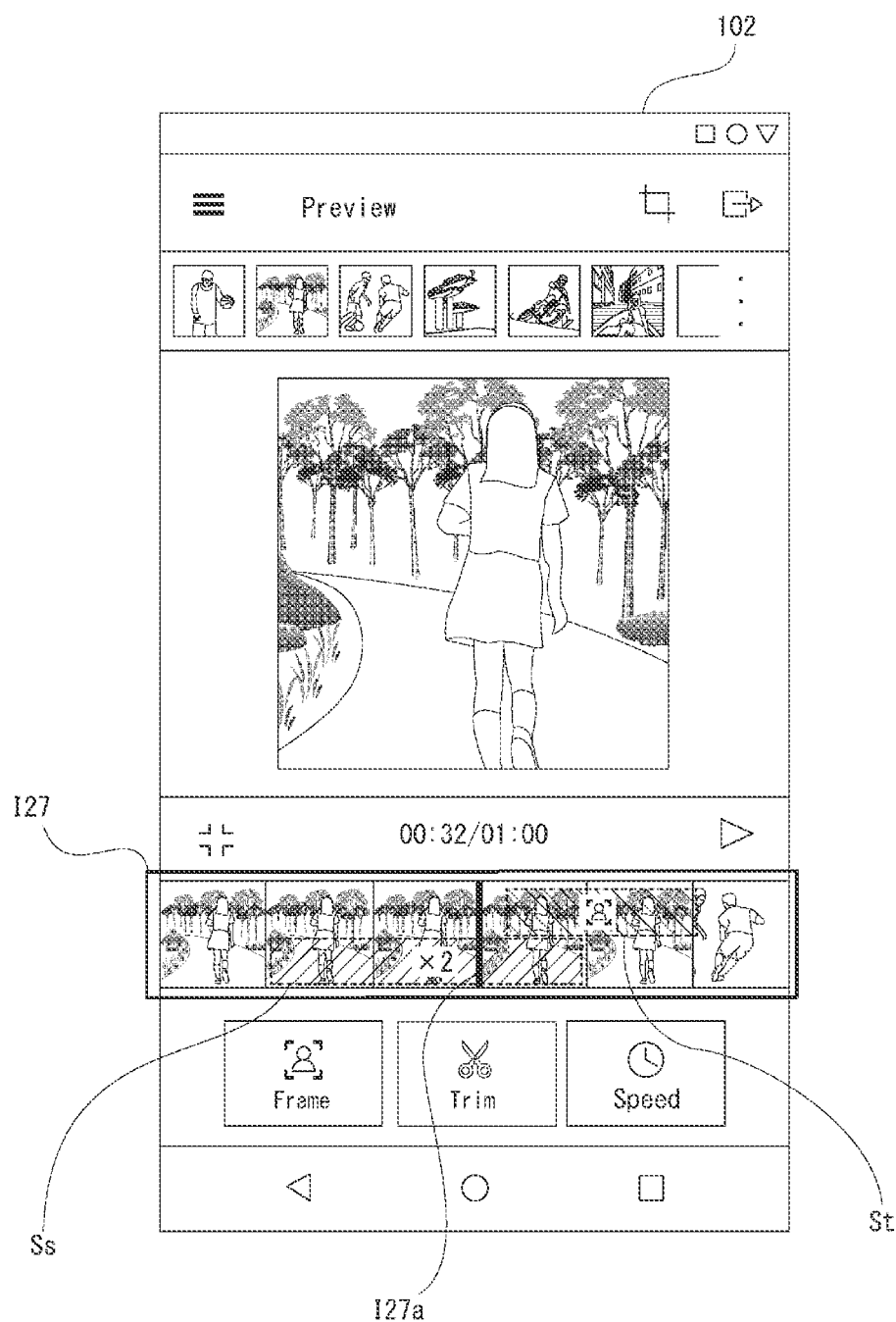
FIG. 32 is a diagram illustrating an example of the preview screen in which a display indicating a section in which a playback speed is changed or tracking processing is performed is performed.

FIG. 32 illustrates an example of a display in which a section in which the playback speed is changed and the tracking processing has been performed is shown on the timeline I27.

As illustrated in FIG. 32, in the example of FIG. 32, a section in which the playback speed has been changed is displayed as a speed bar Ss on the timeline I27 of the preview screen 102, and a section in which the tracking processing has been performed is set as a tracking bar St. In this example, information ("×2" in the illustrated example) indicating the playback speed set in the section is displayed within the speed bar Ss. Further, information indicating the section in which the tracking processing has been performed (an illustration imitating a person's upper body and a frame surrounding the upper body in the illustrated example) is displayed within the tracking bar St.

Further, in order to facilitate distinction between the respective sections, display colors of the speed bar Ss and the tracking bar St are made different from each other in this example.

In FIG. 30, a reduction button I30 is a button for switching a display of the preview area I24 to a zoom-out display.

Figure 33:
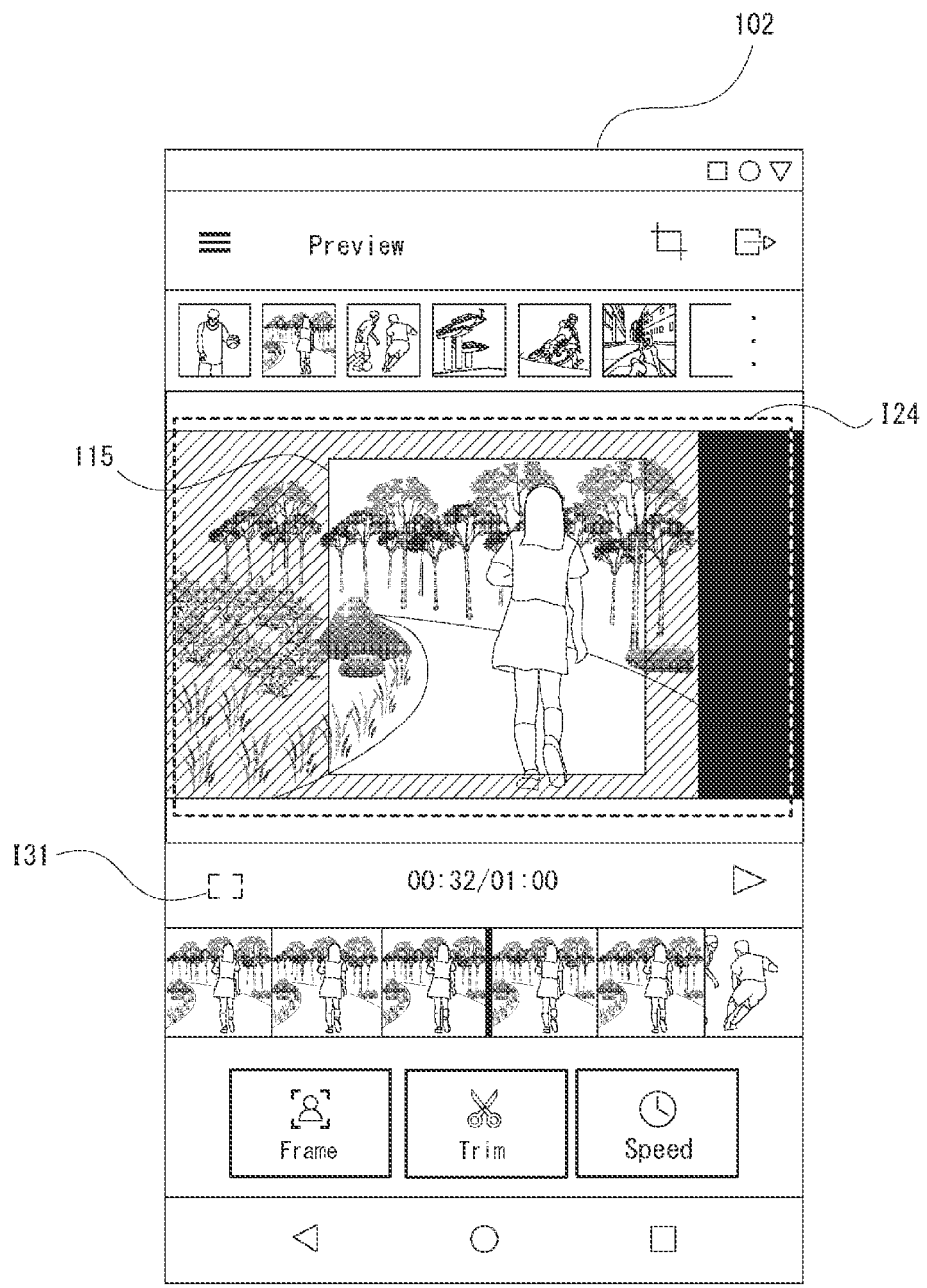
FIG. 33 is a diagram illustrating an example of the preview screen in which a preview area is in a zoom-out display state.

FIG. 33 illustrates a preview screen 102 in which the preview area I24 is put in a zoom-out display state according to an operation of the reduction button I30. As illustrated in FIG. 33, in the preview area I24 that is in a zoom-out display state, a size of the display frame 115 is reduced, and an image portion outside the display frame 115 is also displayed for the moving image in focus. That is, in the entire image of the captured area 61 (FIG. 19) described above, the image portion outside the display frame 115 (corresponding to the display area 63 in FIG. 19) is also displayed.

Here, the image of the captured area 61 can be rephrased as an image of a cropping source when cropping using the display frame 115 is performed, and is hereinafter referred to as an "original image" in such a sense.

In this example, an image portion outside the display frame 115 in the original image is displayed in a different display aspect from that for an image portion inside the display frame 115 so that a range cropped from the original image by the display frame 115 and another range can be clearly distinguished. Specifically, in this example, the image portion outside the display frame 115 in the original image is grayed out.

In this example, when the reduction button I30 is operated, the preview area I24 is put in a zoom-out display state as described above, and a display of the reduction button I30 is switched to a display of the enlargement button I31 (see FIG. 33). The enlargement button I31 is operated, making it possible for a display of the preview area I24 to be switched to a zoom-in display illustrated in FIG. 30 or 32. In the preview area I24 that is in a zoom-in display state, the size of the display frame 115 is enlarged as compared with the zoom-out state, and only the image portion inside the display frame 115 in the original image is displayed.

Further, when the enlargement button I31 is operated, the display of the enlargement button I31 is switched to the display of the reduction button I30, making it possible to switch the preview area I24 to the zoom-out display state again.

In FIG. 30, the frame button B1, the trim button B2, and the speed button B3 provided in the preview screen 102 function as buttons for instructing transitions to the framing screen 103, the trimming screen 104, and the speed screen 105, respectively. Further, the aspect ratio setting button I28 functions as a button for instructing a transition to the aspect ratio setting screen 106.

The export button I29 functions as a button for instructing a transition to the export screen 108 (a display state of a size selection dialog I70 that will be described below).

In this example, a length of a moving image that can be exported is limited to 2 seconds to 1 hour. Therefore, when the export button I29 is operated, the CPU 71 confirms a total time of a moving image that is an image processing target, and displays a predetermined error dialog in the preview screen 102 without performing the transition to the export screen 108 in each case in which the total time exceeds one hour and a case in which the total time is less than two seconds.

[Aspect Ratio Setting Screen]

Figure 34:
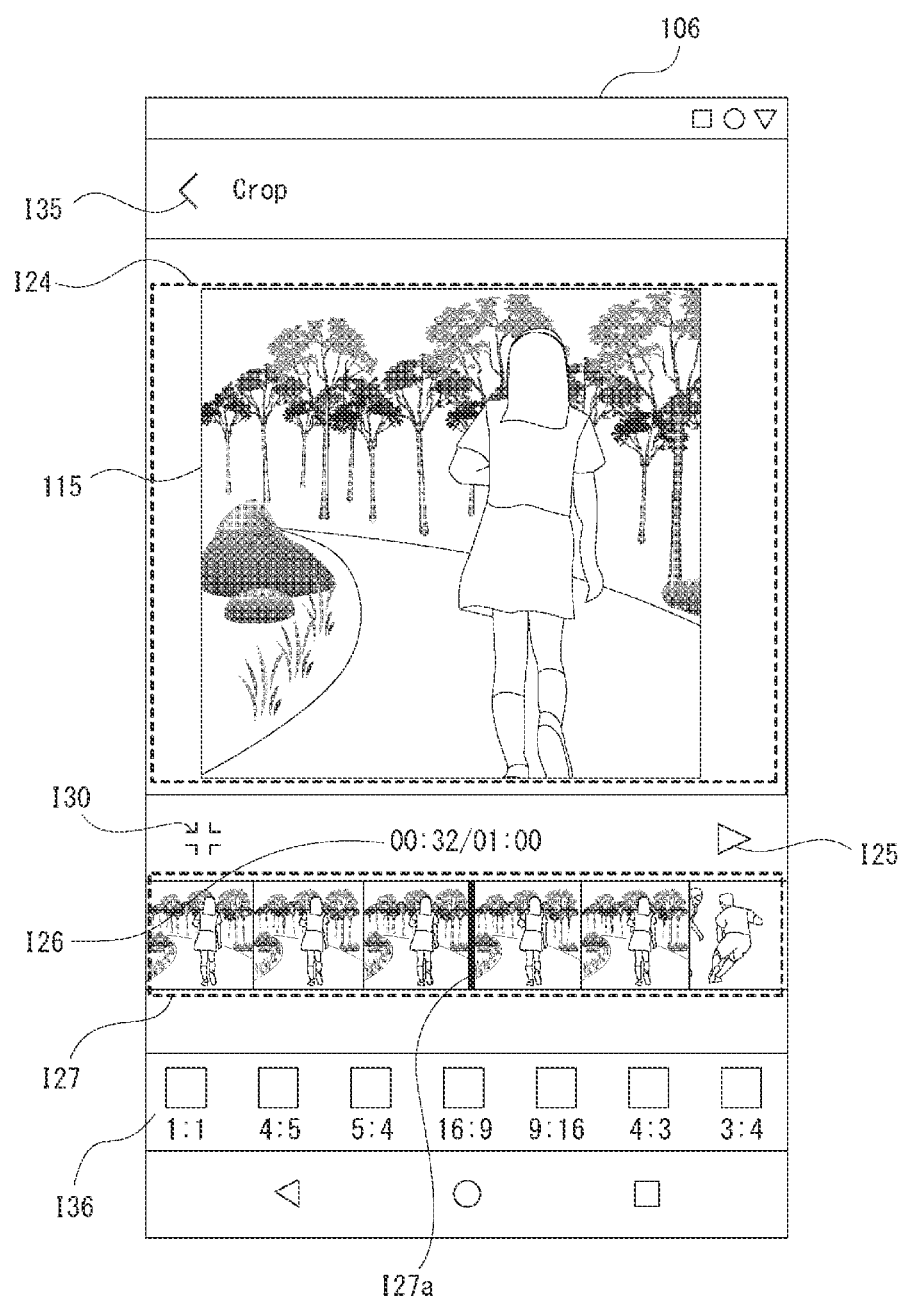
FIG. 34 is a diagram illustrating an example of an aspect ratio setting screen.

Next, the aspect ratio setting screen 106 illustrated in FIG. 34 will be described. As illustrated in FIG. 34, a back button I35 and an aspect ratio selection area I36 are provided in the aspect ratio setting screen 106. Further, a preview area I24, a playback button I25, a playback time display area I26, a timeline I27, and a reduction button I30 similar to those of the preview screen 102 are provided in the aspect ratio setting screen 106.

The back button I35 functions as a button for instructing the transition to the preview screen 102. When the back button I35 is operated on the aspect ratio setting screen 106, image processing content on the aspect ratio setting screen 106 is settled, and the display transitions to the preview screen 102.

In the aspect ratio selection area I36, a selection button for selecting the aspect ratio of the display frame 115 (that is, the aspect ratio of the cropped image) is provided for each of the various aspect ratios. When any of these selection buttons is operated, a corresponding aspect ratio is reflected in all the moving images that are image processing target at once. In this case, a position (cropping position) of the display frame 115 is at a center (for example, at a center of the original image), but the position can be changed on the framing screen 103 that will be described below.

A default value of the aspect ratio is an aspect ratio of a previously exported moving image. When the export has never been performed, an initial value "1:1" becomes the default value. Further, after the application program is updated, a previous value is forgotten and the aspect ratio returns to the initial value.

Figure 35:
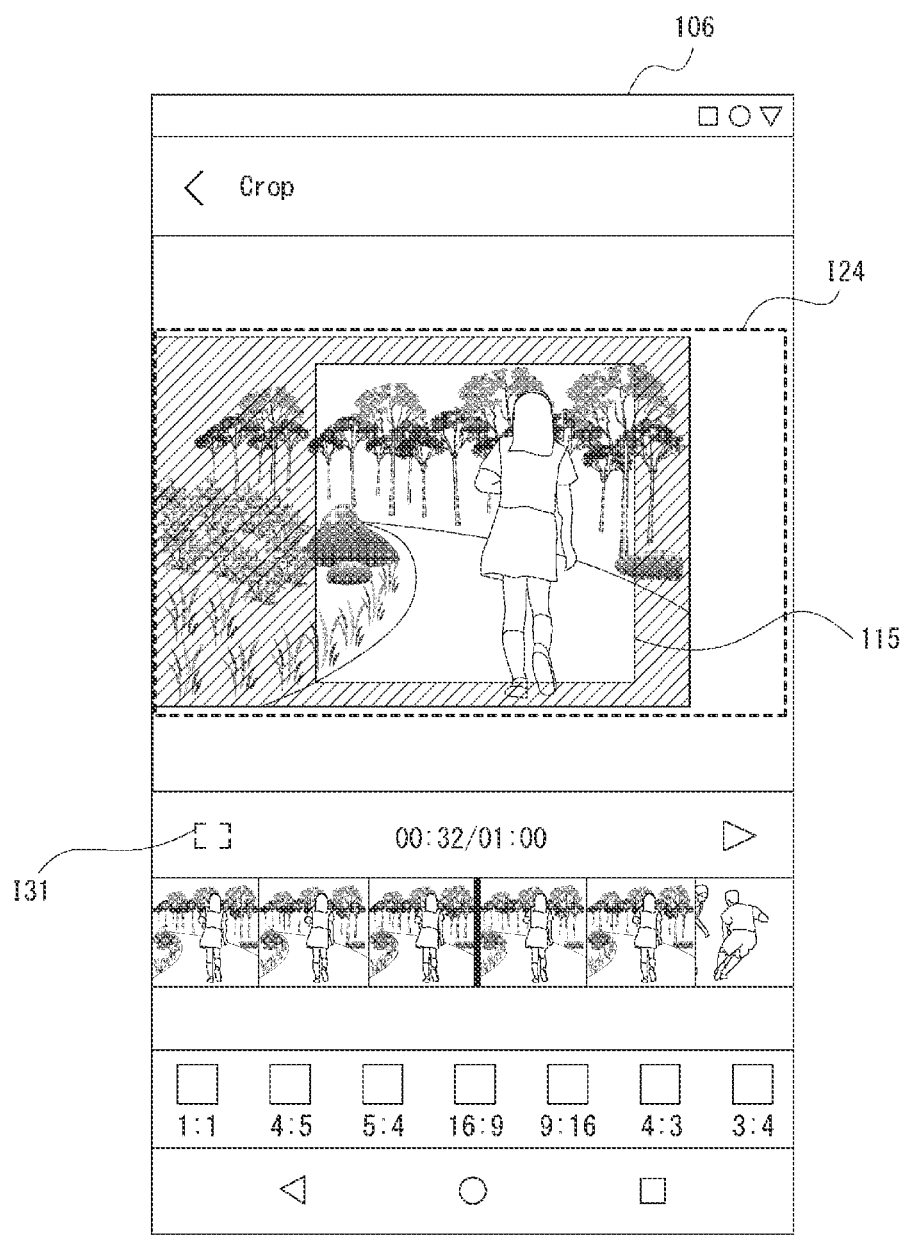
FIG. 35 is a diagram illustrating an example of an aspect ratio setting screen in which the preview area is in a zoom-out display state.

The reduction button I30 is also provided in the aspect ratio setting screen 106, making it possible for the display of the preview area I24 to be switched from the zoom-in display illustrated in FIG. 34 to the zoom-out display as illustrated in FIG. 35. In this case, the display of the reduction button I30 is switched to the display of the enlargement button I31, and the zoom-out display state and the zoom-in display state can be switched between each other.

[Trimming Screen]

Figure 36:
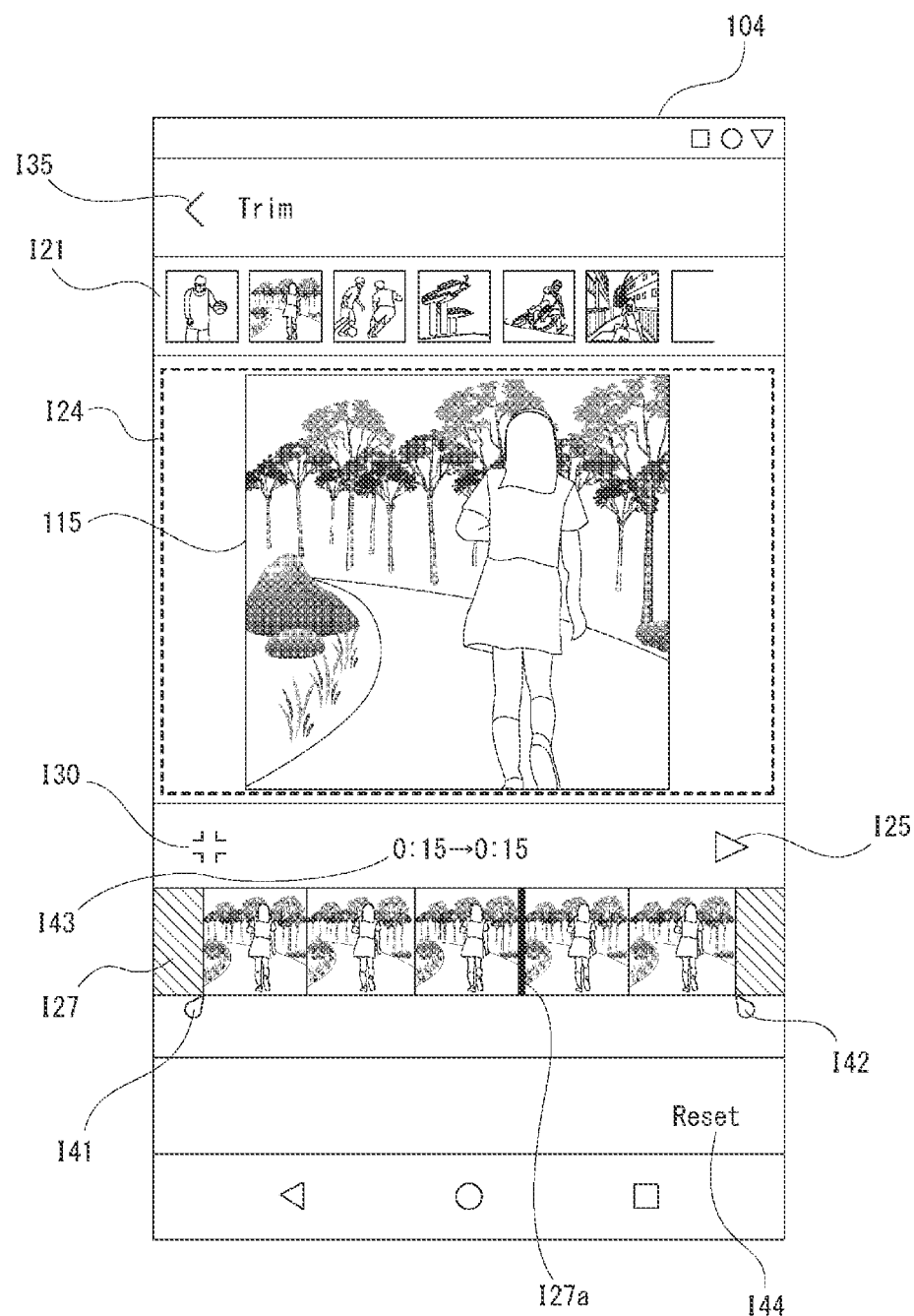
FIG. 36 is a diagram illustrating an example of a trimming screen.

FIG. 36 illustrates an example of the trimming screen 104.

In the trimming screen 104, a moving image list area I21, a preview area I24, a playback button I25, a timeline I27, and a reduction button I30 similar to those of the preview screen 102 are provided, and a back button I35 similar to that of the aspect ratio setting screen 106 is provided.

Further, on the trimming screen 104, a start point icon I41 and an end point icon I42 are provided for the timeline I27, and a time comparison display area I43 is provided above the timeline I27. Further, a reset button I44 is provided in the trimming screen 104.

The trimming screen 104 of this example is a screen that receives designation of a trimming section for the moving image focused in the moving image list area I21. Therefore, a timeline for the moving image focused in the moving image list area I21 is displayed in the timeline I27 in the trimming screen 104.

Further, the playback position bar I27a in the trimming screen 104 can be moved left and right according to a swipe operation, and when the playback position bar I27a is moved, a display image in the preview area I24 is changed into an image at a playback position indicated by the playback position bar I27a. Accordingly, the user can easily search for a trimming start and end points.

The start point icon I41 functions as an operator for instructing a start point of trimming, and the end point icon I42 functions as an operator for instructing an end point of trimming. The start point icon I41 and the end point icon I42 can be moved according to the swipe operation, and the start point and end point of trimming can be arbitrarily designated. In this example, an initial position of the start point icon I41 is a playback position of a first frame of the moving image in focus, and an initial position of the end point icon I43 is a playback position of a last frame of the moving image in focus.

Figure 37:
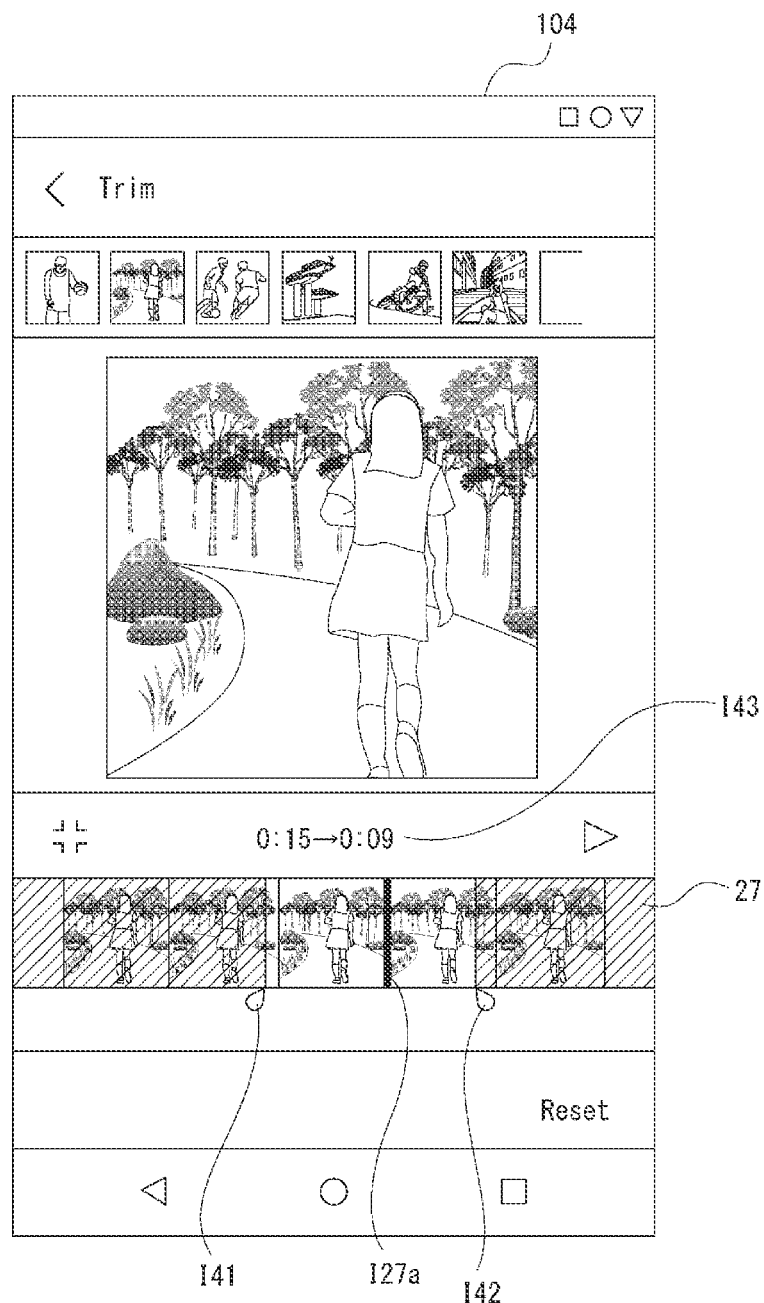
FIG. 37 is a diagram illustrating a trimming section designation operation.

FIG. 37 illustrates the trimming screen 104 when the start point icon I41 and the end point icon I42 are operated.

When the start point icon I41 and the end point icon I42 are operated, thumbnails of moving image portions excluded by trimming in the timeline I27 are displayed in a grayout manner, and a moving image portion extracted by trimming is clarified, as illustrated in FIG. 37.

Further, although not illustrated, for the start point icon I41 and the end point icon I42, information on a playback time corresponding to a position of the icon is displayed near the icon such as a portion above the icon while the icon is tapped.

On the trimming screen 104, a playback time of an entire moving image in focus and a playback time after trimming (a playback time of the moving image section instructed by the start point icon I41 and the end point icon I42) are displayed in the time comparison display area I43.

Further, when the reset button I44 is operated in the trimming screen 104, trimming content returns to an initial state (in this case, icons of the start point and the end point move to the left end and right end), and when the back button I35 is operated, image processing content in the trimming screen 104 is settled and the display transitions to the preview screen 102.

Figure 38:
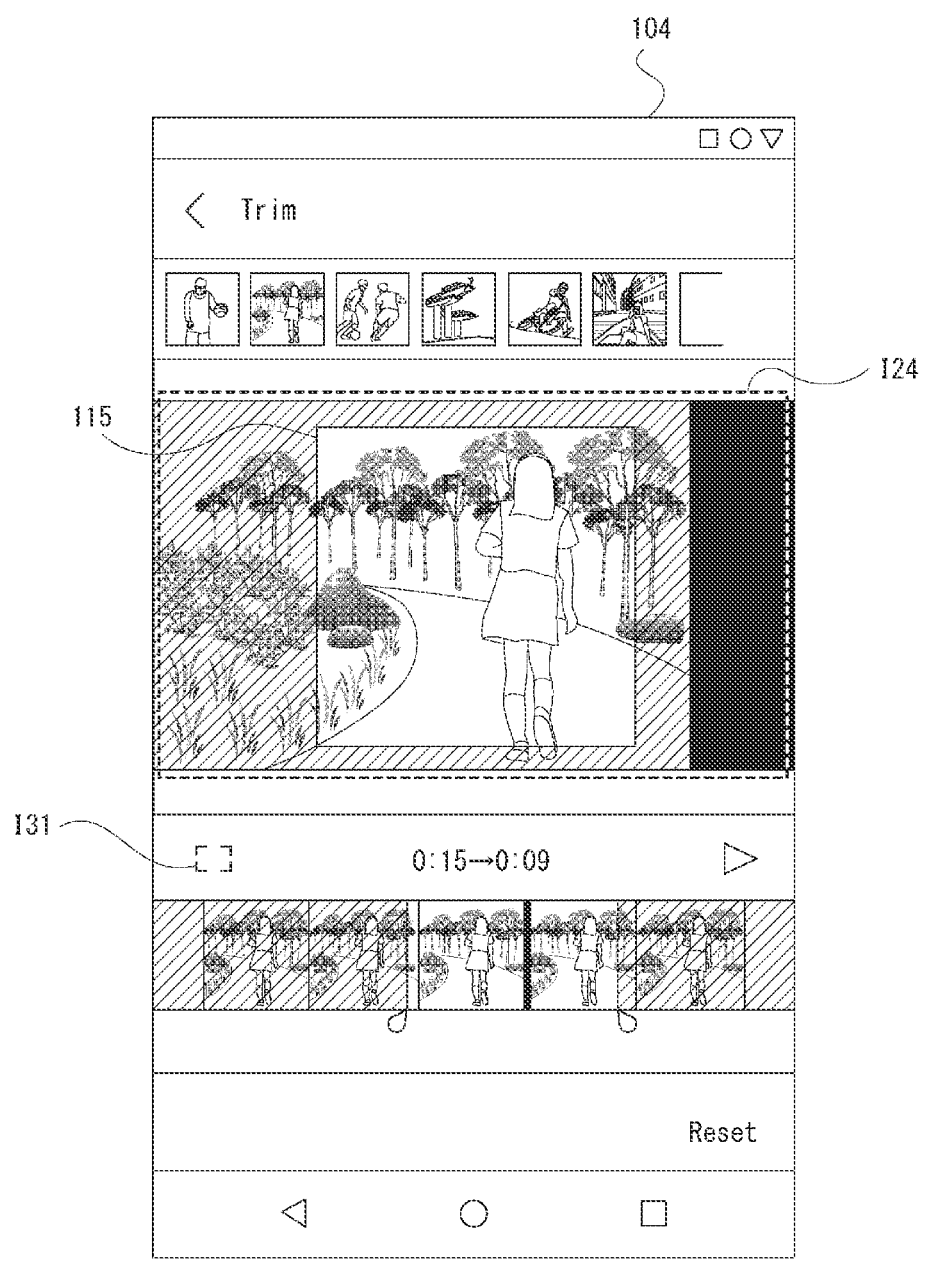
FIG. 38 is a diagram illustrating an example of a trimming screen in which a preview area is in a zoom-out display state.

In the trimming screen 104, the reduction button I30 is provided, so that the display of the preview area I24 can be switched from a zoom-in display illustrated in FIG. 36 to a zoom-out display as illustrated in FIG. 38. In this case, the display of the reduction button I30 is switched to a display of the enlargement button I31, and a zoom-out display state and a zoom-in display state can be switched between each other.

[Speed Screen]

Figure 39:
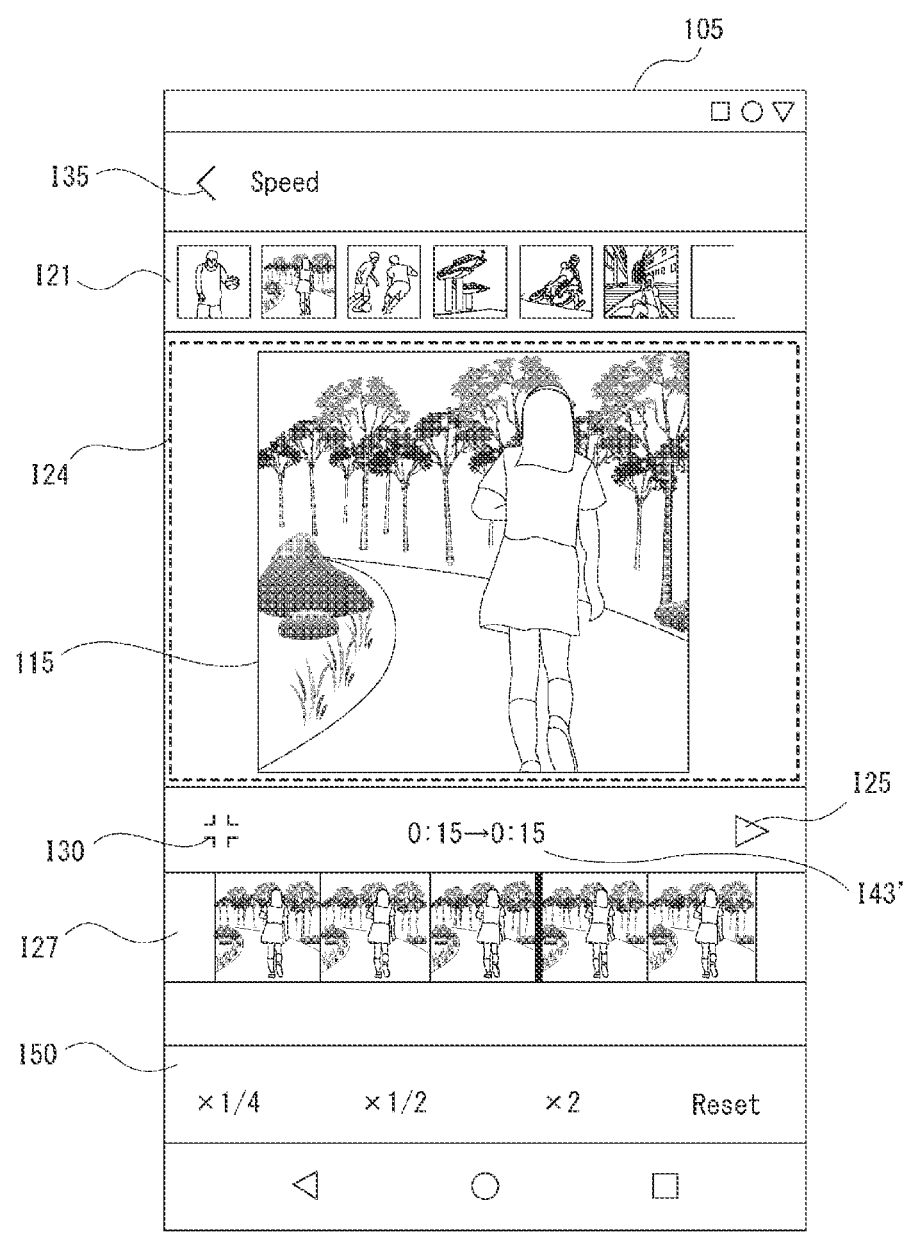
FIG. 39 is a diagram illustrating an example of a speed screen.

FIG. 39 illustrates an example of the speed screen 105.

in the speed screen 105, a moving image list area I21, a preview area I24, a playback button I25, a timeline I27, and a reduction button I30 similar to those of the preview screen 102 are provided, and a back button I35 similar to that of the aspect ratio setting screen 106 and a speed selection area I50 are provided.

The speed screen 105 is a screen in which a moving image in focus in the moving image list area I21 is a target like the previous trimming screen 104, and a timeline of the moving image in focus is displayed in the timeline I27.

Further, in the speed screen 105, a playback position bar I27a can be moved left and right according to a swipe operation as in the case of the trimming screen 104, and in the preview area I24, the image of the playback position indicated by the playback position bar I27a is displayed. This facilitates search work of a start point and an end point of a speed setting by the user.

Further, a time comparison display area I43' is provided above the timeline I27 in this case. In the time comparison display area I43', a playback time before the speed setting and a playback time after the speed setting are displayed for the focused moving image.

Figure 40:
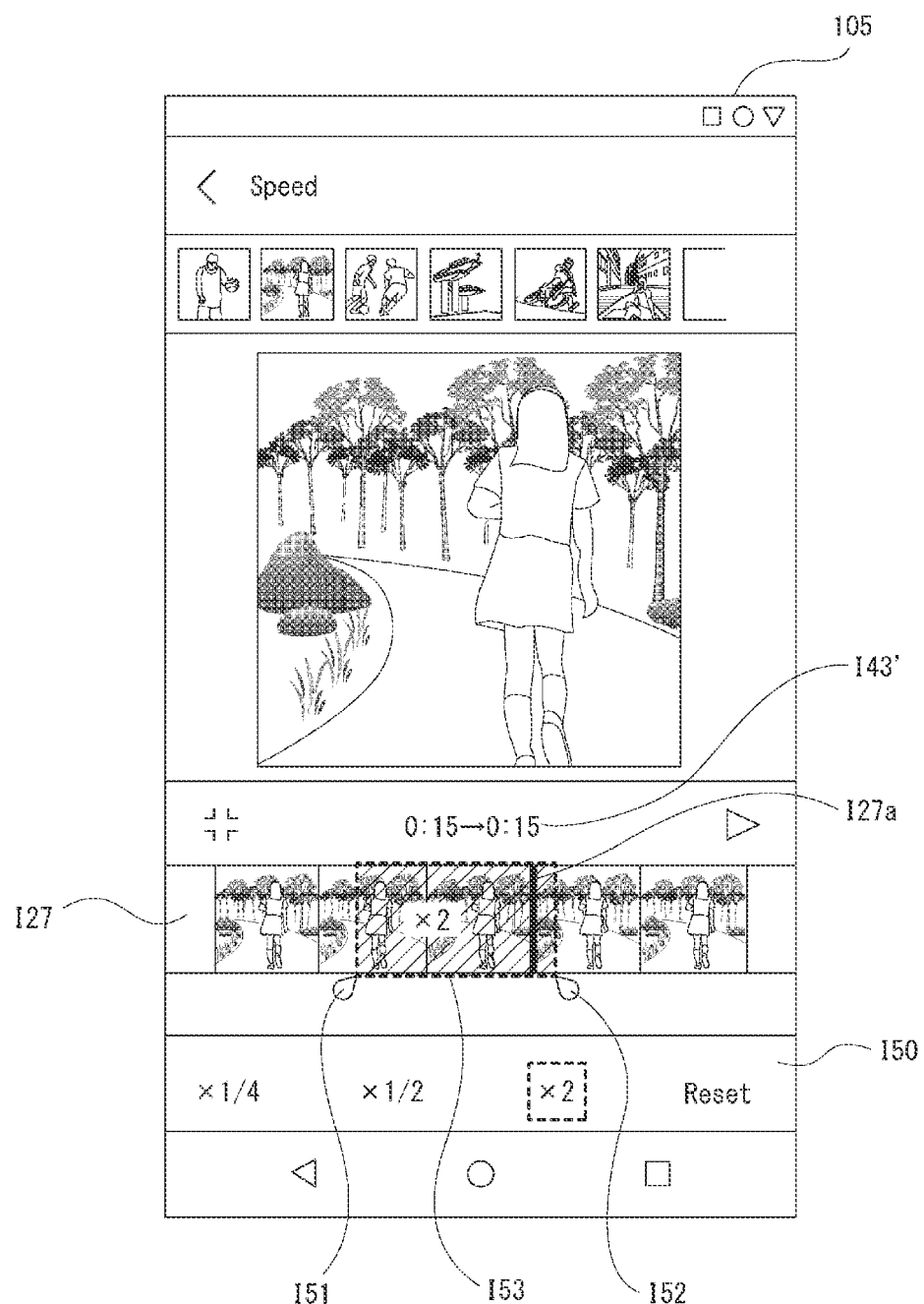
FIG. 40 is a diagram illustrating an operation for designating a playback speed changing section.

A selection button for selecting a playback speed is provided for each of various playback speeds, and a reset button is disposed in the speed selection area I50. When selection buttons indicating any of the playback speeds is operated in the speed selection area I50, a start point icon I51 and an end point icon I52 are displayed for the timeline I27 as illustrated in FIG. 40. For the start point icon I51 and the end point icon I52, a display of a playback time of a position indicated by the icon is displayed while the icon is tapped, as in the case of the previous start point icon I41 and the end point icon I42.

The user can perform a swipe operation with respect to these icons to designate a moving image section to which the playback speed selected in the speed selection area I50 is desired to be applied.

Figure 41:
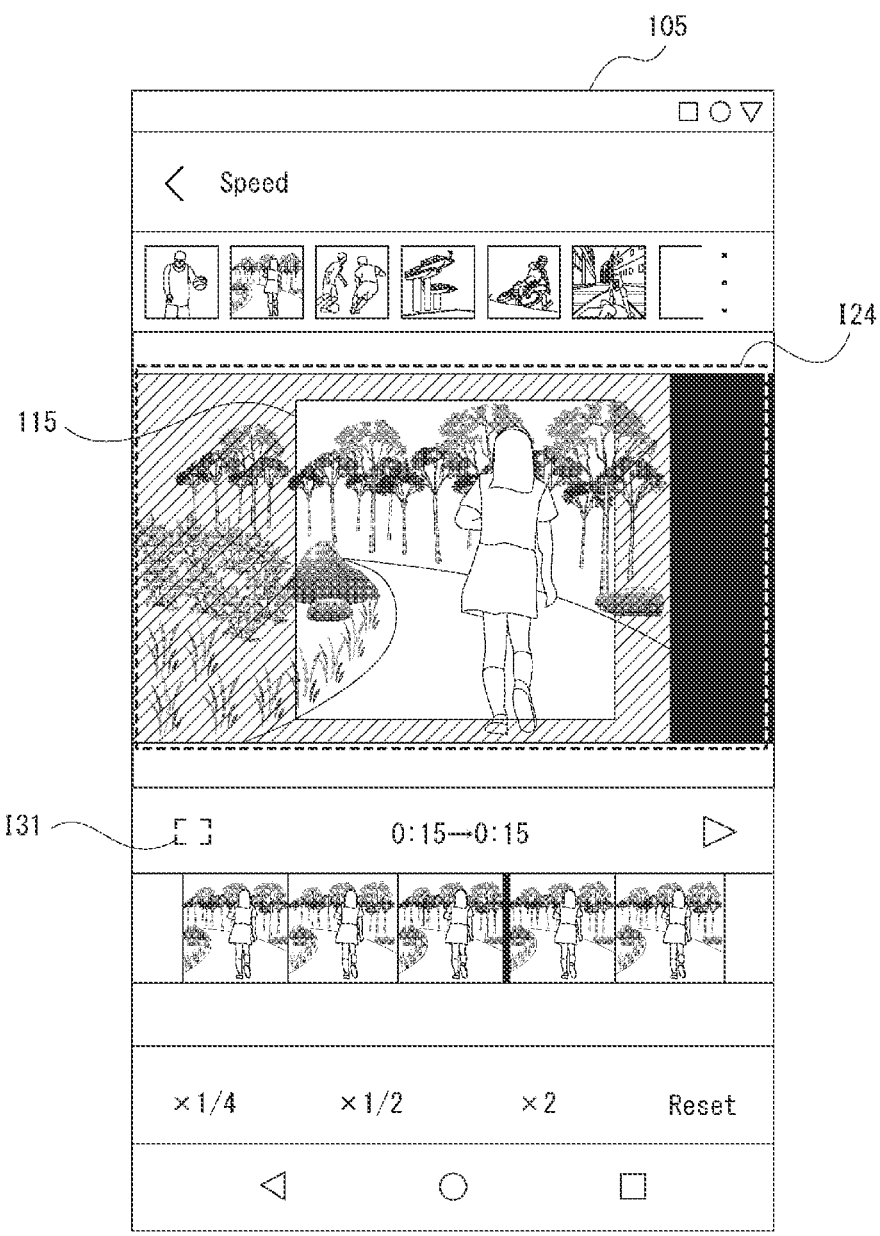
FIG. 41 is a diagram illustrating an example of a speed screen in which a preview area is in a zoom-out display state.

Further, when the moving image section is designated in this way, a section bar I53 indicating the moving image section is displayed in the timeline I27. In this example, information indicating the playback speed selected in the speed selection area I50 is displayed within the section bar I53. FIG. 41 illustrates a case in which a notation of "×2" is made within the section bar I53 in correspondence to a case in which the playback speed of "×2" is selected. Such information display within the section bar I53 is not performed when the section bar I53 is too short.

Further, when any playback speed is selected in the speed selection area I50, a section is designated as illustrated in FIG. 40, and then another playback speed is selected in the speed selection area I50, only the playback speed and a playback time (a playback time after a speed setting is applied) in the time comparison display area I43' are changed.

Further, when the reset button within the speed selection area I50 is operated during setting of a speed application section, speed setting content is reset and a screen state is returned to the speed screen 105 that is in an initial state illustrated in FIG. 39.

The reduction button I30 is provided in the speed screen 105, making it possible for a display of the preview area I24 to be switched from the zoom-in display illustrated in FIG. 39 to the zoom-out display as illustrated in FIG. 41. In this case, the display of the reduction button I30 is switched to the display of the enlargement button I31, and the zoom-out display state and the zoom-in display state can be switched between each other.

[Framing Screen]

Next, the framing screen 103 will be described.

Figure 42:
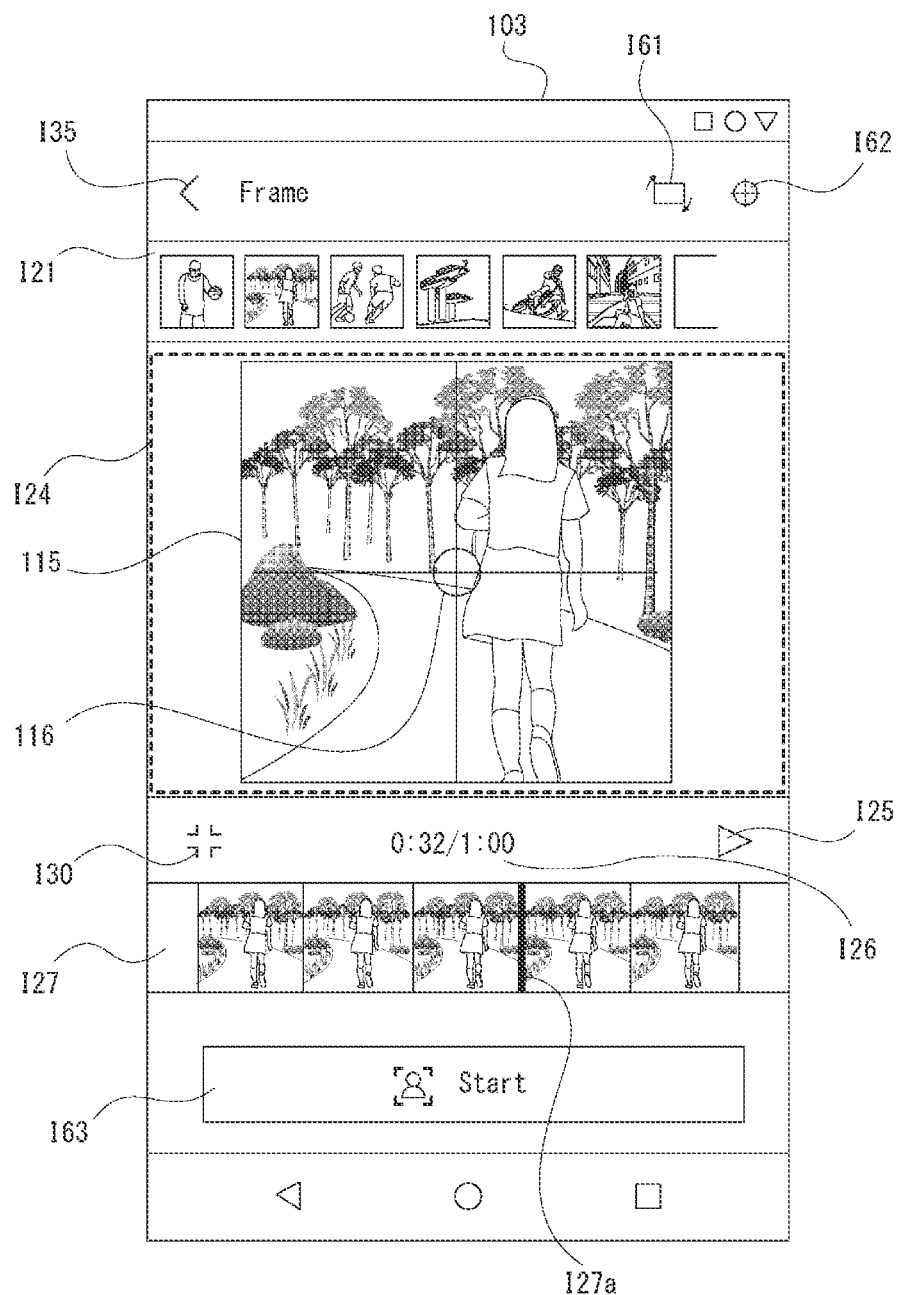
FIG. 42 is a diagram illustrating an example of a framing screen.

As illustrated in FIG. 42, a moving image list area I21, a preview area I24, a playback button I25, a playback time display area I26, a timeline I27, and a reduction button I30 similar to those of the preview screen 102 are provided in the framing screen 103, and a back button I35 similar to that of the aspect ratio setting screen 106 is provided.

Further, a rotation button I61, a tracking button I62, and a tracking start button I63 are provided in the framing screen 103, and the target designation aiming 116 described above is displayed inside the display frame 115 of the preview area I24.

On the framing screen 103, when a still image of a certain frame in a focused moving image is displayed, that is, preview playback in the preview area I24 is in a paused state, an operation such as designation of the cropping range of the image from the original image, designation of the tracking target, and designation of the placement position within the screen of the tracking target becomes possible. As described above, by performing the dragging operation or the pinch-out or pinch-in operation inside the display frame 115 in the framing screen 103 of this example, it is possible to move or enlarge or reduce the range included in the display frame 115 in the original image. That is, it is possible to perform designation of the cropping range from the original image through movement of the original image in vertical, horizontal, and diagonal directions with respect to the display frame 115, or designation of the cropping range from the original image through enlargement or reduction of the original image with respect to the display frame 115. It is also possible to change the rotation angle of the original image with respect to the display frame 115 by performing a rotation operation using two fingers inside the display frame 115. That is, it is also possible to designate the cropping range from the original image by rotating the original image with respect to the display frame 115.

In the framing screen 103 of this example, it is possible to change the rotation angle of the original image with respect to the display frame 115 by operating the rotation button I61, but the rotation through an operation with respect to the rotation button I61 is limited in units of 90 degrees. Specifically, in this example, the original image is rotated by 90 degrees clockwise each time the rotation button I61 is operated.

In this case, even when a halfway angle is formed according to the rotation operation using two fingers described above, the rotation angle of the original image is adjusted to a multiple of 90 according to an operation with respect to the rotation button I61.

Figure 43:
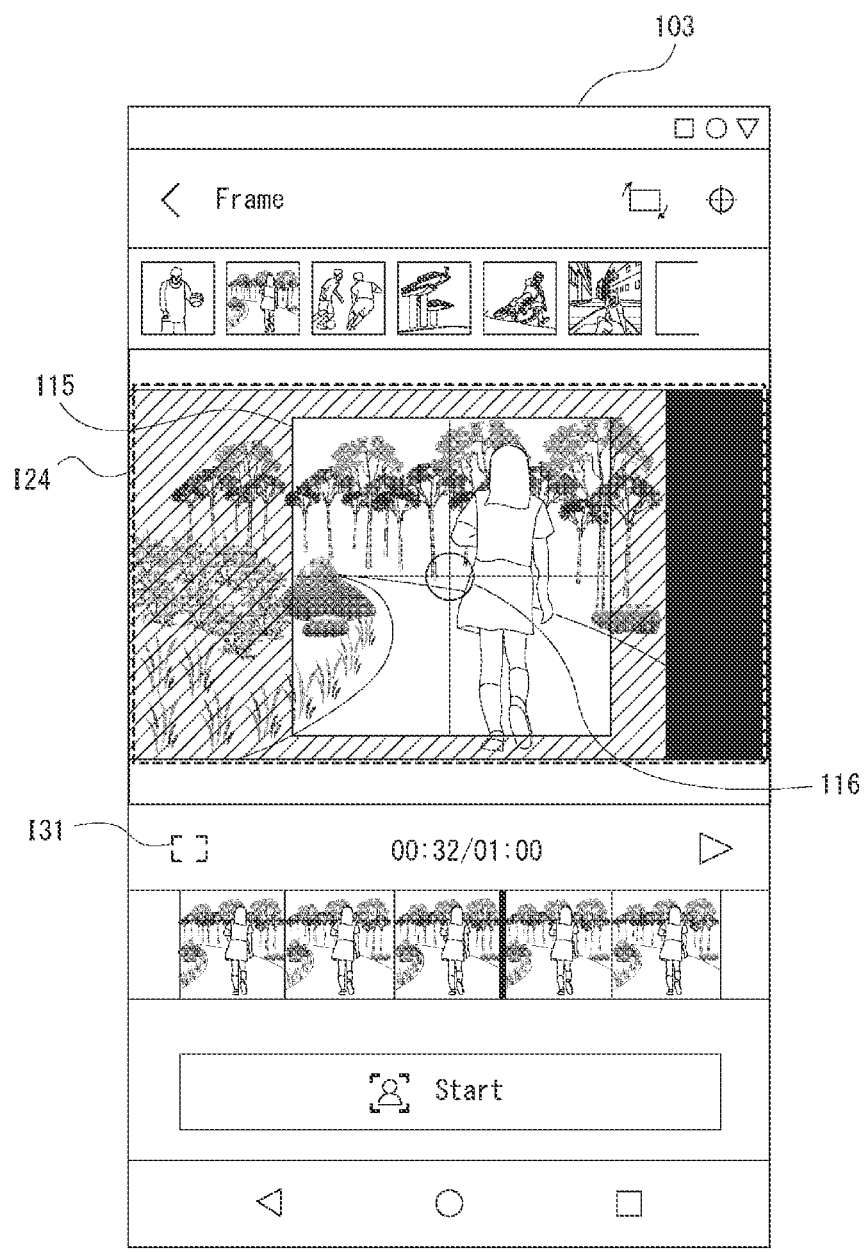
FIG. 43 is a diagram illustrating an example of the framing screen in which a preview area is in a zoom-out display state.

The reduction button I30 is also provided in the framing screen 103, making it possible for a display of the preview area I24 to be switched from the zoom-in display illustrated in FIG. 42 to the zoom-out display as illustrated in FIG. 43. In this case, the display of the reduction button I30 is switched to the display of the enlargement button I31, and the zoom-out display state and the zoom-in display state can be switched between each other.

An example of designation of the cropping range will be described with reference to FIGS. 44A and 44B.

Figure 44A:
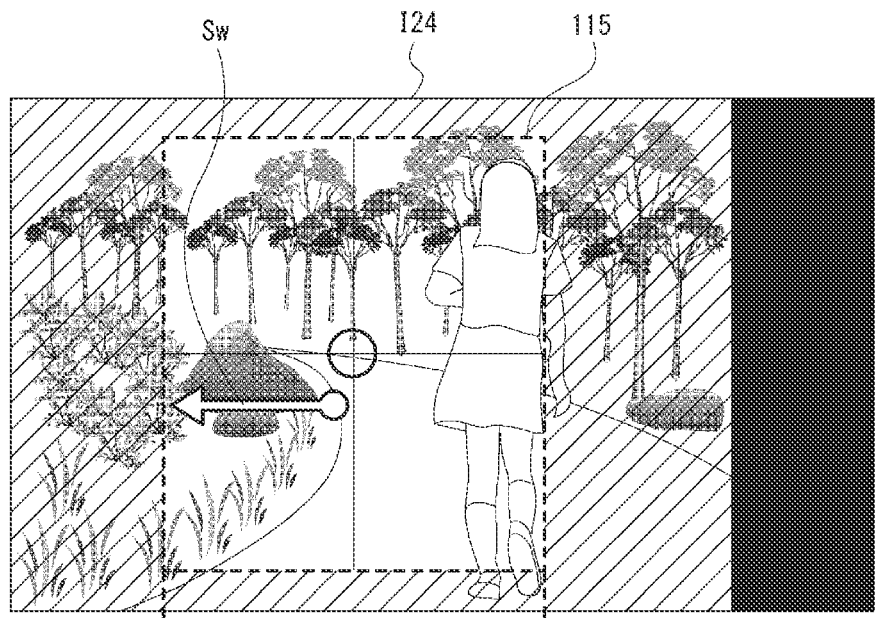
FIGS. 44A and 44B are diagrams illustrating an example in which a cropping range is designated.
Figure 44B:
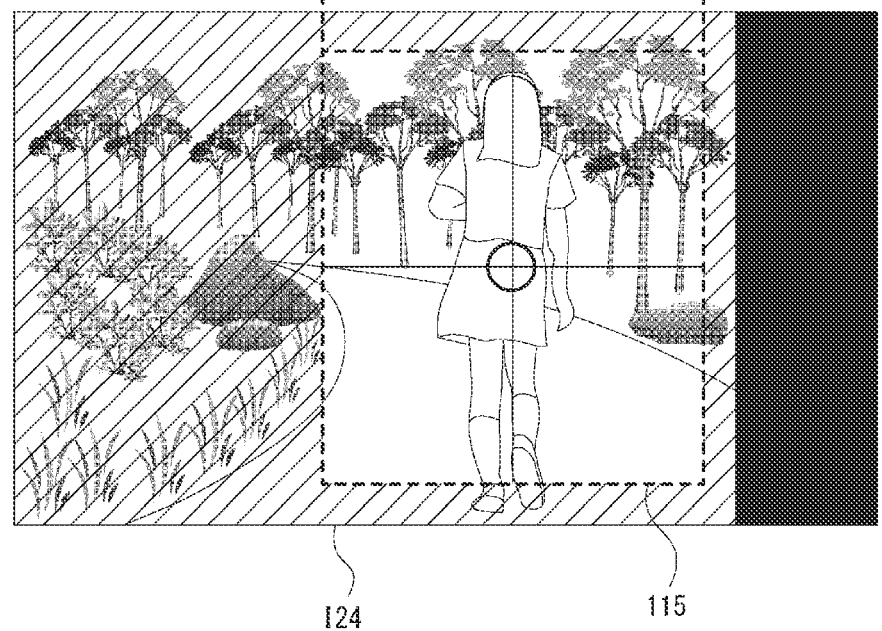

FIGS. 44A and 44B illustrate a state in which the cropping range is designated according to an operation with respect to the preview area I24 in a zoom-out display state.

For example, it is assumed that a swipe operation to the left inside the display frame 115 as shown as an operation Sw in FIG. 44A is performed. In response to such an operation, the original image is moved to the left (swipe direction) with respect to the display frame 115, and as a result, the range included in the display frame 115 in the original image changes, as illustrated in FIG. 44B. That is, the cropping range from the original image changes.

Here, in the framing screen 103 of this example, the image inside the display frame 115 and the image outside the display frame 115 are displayed in different display aspects in the preview area I24 that is in a zoom-out display state, as illustrated in FIGS. 44A and 44B.

Thus, it is possible to cause the user to clearly recognize which range is set as the cropping range in the original image.

Next, the tracking image processing will be described.

In the tracking image processing, designation of the placement position within the screen of the tracking target is received from the user. When the user wants to perform an operation related to tracking, the user operates the tracking button I62 in the framing screen 103 (for example, a tapping operation).

Figure 45:
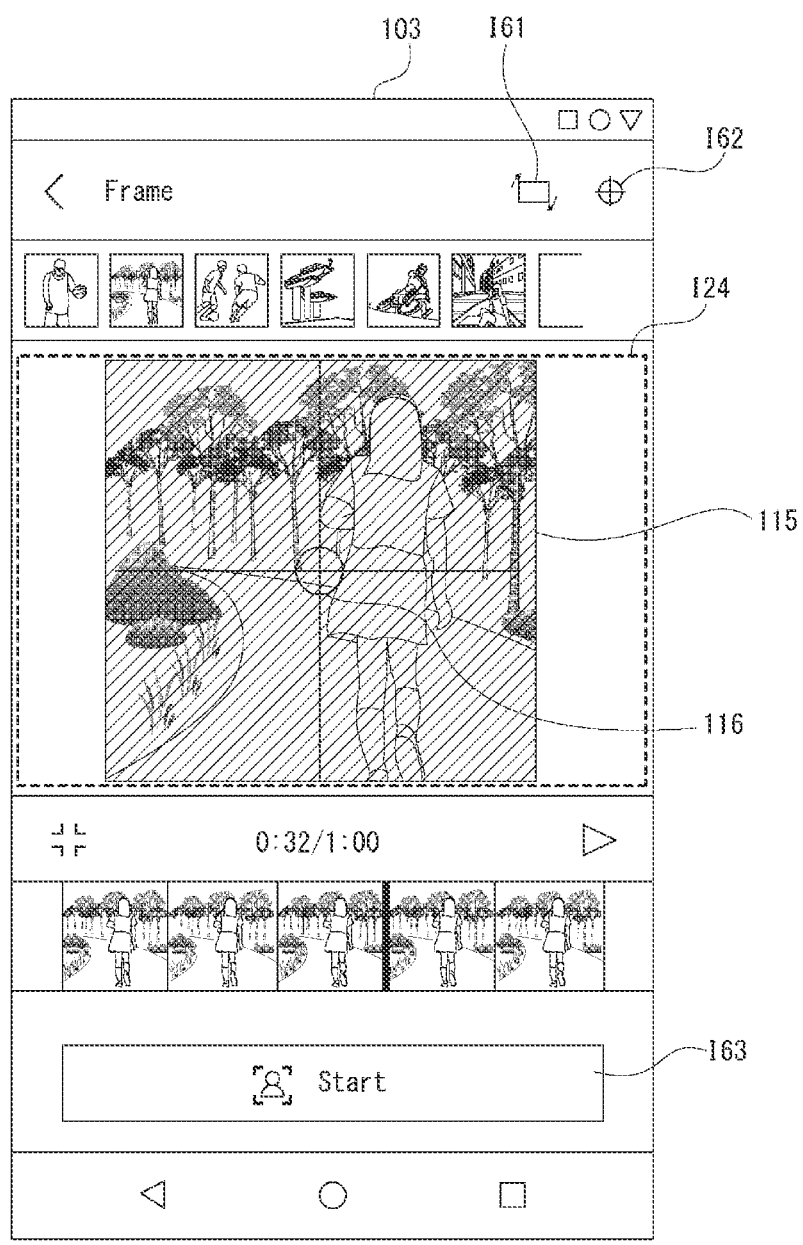
FIG. 45 is a diagram illustrating an example of the framing screen in a tracking mode.

FIG. 45 illustrates the framing screen 103 (the first screen) in the tracking mode that appears according to the operation with respect to the tracking button I62. In this example, in the framing screen 103 in the tracking mode, the display aspect is changed, for example, the image inside the display frame 115 is displayed in a grayout manner, such that the user can easily perceive transition of the mode.

In the tracking mode, an operation with respect to the inside of the display frame 115 functions as an operation of moving the target designation aiming 116, that is, an operation for designating a placement position of a subject serving as the tracking target (a target subject) in the cropped image.

Figure 46A:
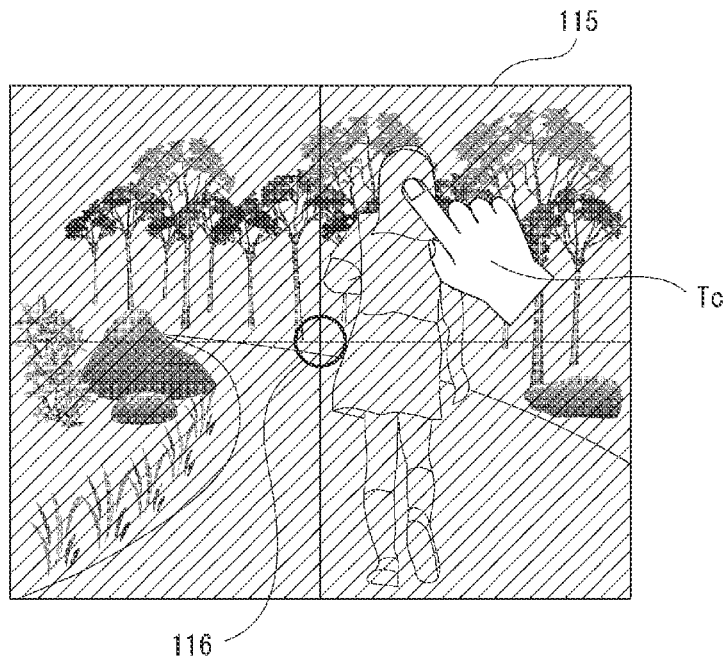
FIGS. 46A and 46B are diagrams illustrating an example of a position designation operation using a target designation aiming.
Figure 46B:
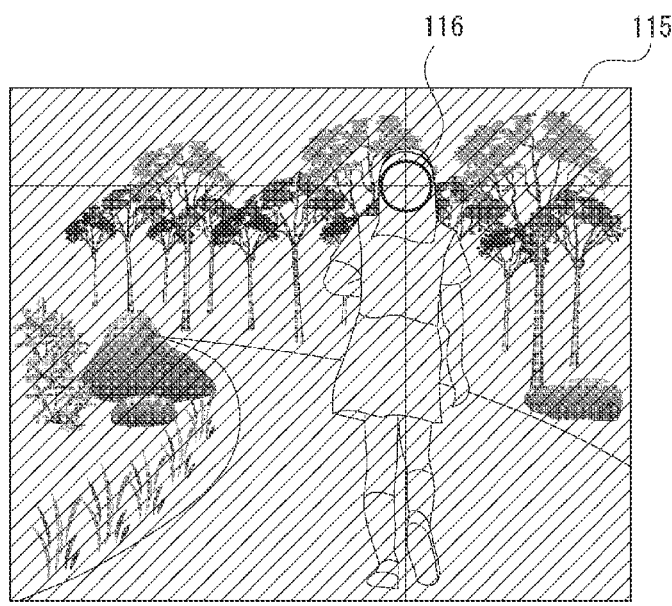

Specifically, as illustrated in FIGS. 46A and 46B, the target designation aiming 116 is moved to a tapped position according to an operation for tapping the inside of the display frame 115 (an operation Tc in FIG. 46A) being performed (FIG. 46B). This tapped position is recognized as a placement position within the cropped image of the target subject. Further, this tapping operation also functions as an operation for designating a tracking target subject among subjects appearing in the original image.

In the framing screen 103 before the tracking start button I63 is operated, a position of the target designation aiming 116 is set as a predetermined initial position (in this example, a center of the display frame 115) (see FIG. 42).

Further, in this example, it is possible to perform the designation of the placement position within the cropped image of the target subject not only through an operation for tapping the inside of the display frame 115 but also through an operation for moving the target designation aiming 116 using a dragging operation.

Figure 47:
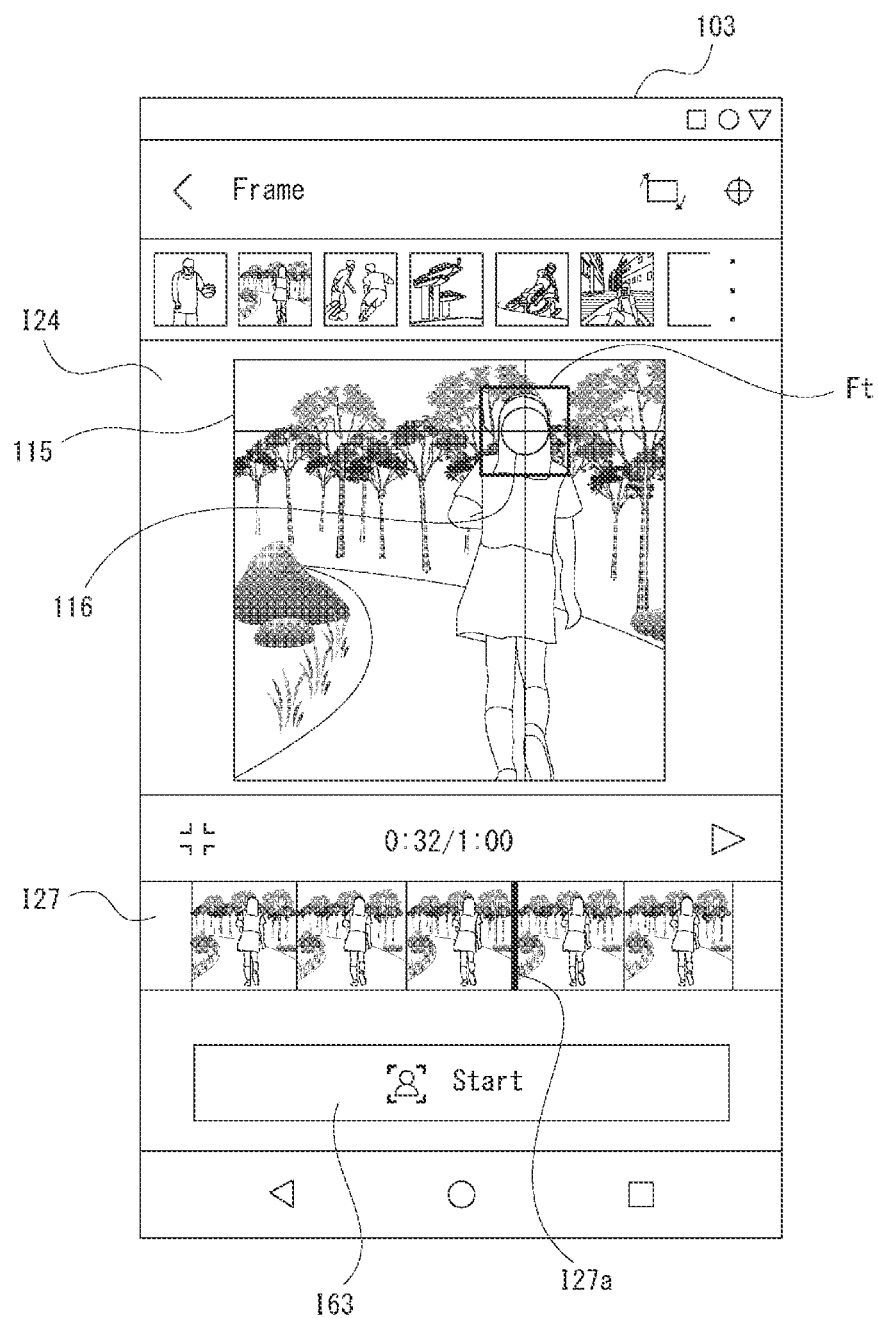
FIG. 47 is a diagram illustrating an example of the framing screen in a mode in which tracking can be started.

When the operation for tapping the inside of the display frame 115 (an operation for designating the position of the target designation aiming 116) is performed as illustrated in FIGS. 46A and 46B, the tracking start button I63 as illustrated in FIG. 47 is displayed on the framing screen 103. When the tracking start button I63 is operated, playback of the tracking image is started in the preview area I24. That is, a moving image display of the cropped image cropped from the original image is started so that the target subject is disposed at a position designated inside the display frame 115 by the target designation aiming 116. In this case, in the moving image of which the preview playback is being performed, a display of a tracking frame Ft indicating a recognition position of the target subject designated by the target designation aiming 116 is started.

Here, as understood from the above description, in the embodiment, the processing of performing cropping from the original image so that the target subject is disposed at the designated position inside the display frame 115 is also performed on the image displayed inside the display frame 115, that is, each frame image located after the frame image in order according to the designating operation performed on one frame image constituting the moving image. That is, in order to generate a moving image cropped so that the target subject is disposed at the designated position inside the display frame 115, it is not necessary for the user to perform the operation for designating the placement position with respect to each frame image, and in this regard, an operation burden is reduced.

The moving image is an image group configured of a plurality of images, and can be rephrased as an image group configured of a plurality of consecutive images in a predetermined order.

Figure 48:
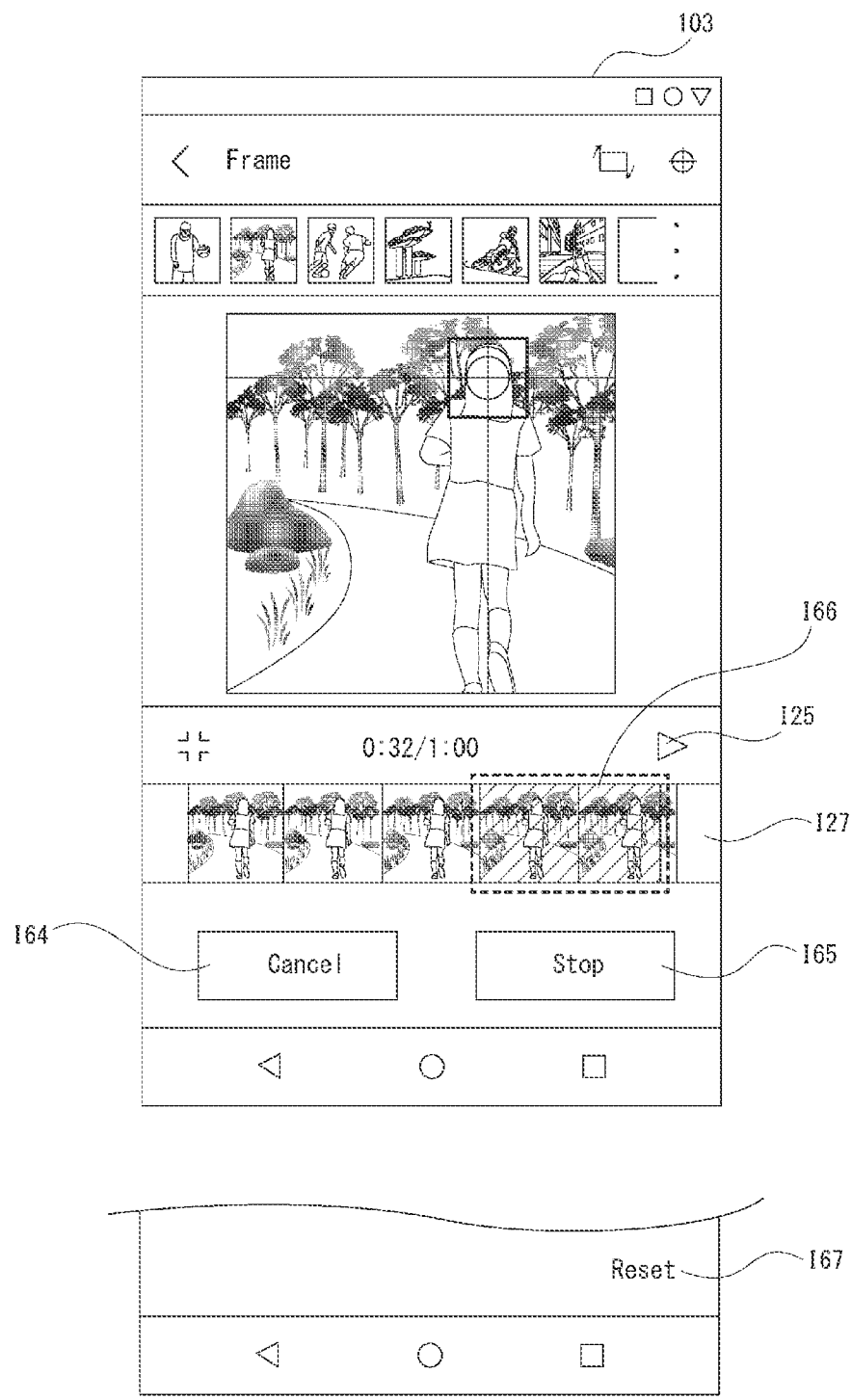
FIG. 48 is a diagram illustrating an example of the framing screen after the start of tracking.

Further, a cancel button I64 and a stop button I65 as illustrated in FIG. 48 are displayed on the framing screen 103 according to an operation with respect to the tracking start button I63. The stop button I65 has a function of instructing stop of preview playback, and a function of indicating an end point of a section of tracking, that is, a section in which cropping from the original image is performed so that the target subject is disposed at the designated position inside the display frame 115. Further, a display of a section bar I66 indicating the tracking section is also started within the timeline I27 according to the operation with respect to the tracking start button I63.

Figure 49:
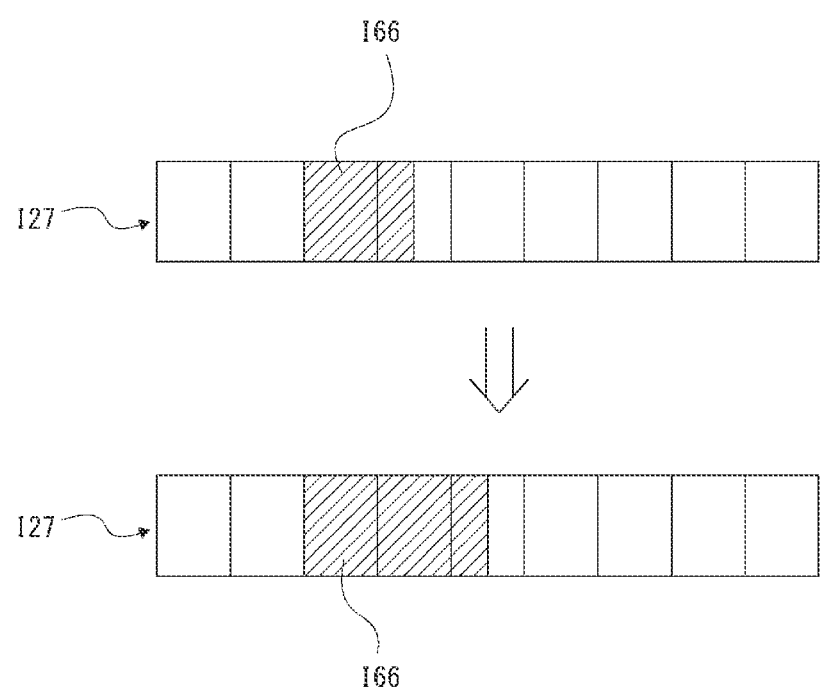
FIG. 49 is an illustrative diagram illustrating a state in which a bar display indicating a tracking section is extended.

This section bar I66 is displayed as a bar gradually extending from a tracking start frame (a frame displayed in the preview area I24 when the tracking start button I63 is operated) as illustrated in FIG. 49 as the preview playback progresses, and the extension of the section bar I66 is stopped when an end point of the tracking section is determined according to, for example, an operation with respect to the stop button I65. Accordingly, the tracking section is shown on the timeline I27.

Here, after the start of tracking according to the operation with respect to the tracking start button I63, the tracking may become disabled due to, for example, the target subject being out of frame. When tracking becomes disabled in this way, the tracking ends, and a frame immediately before a frame in which tracking becomes disabled is determined as an end point of the tracking section.

Further, when the end of the moving image that is a tracking target is reached, the tracking ends, and in this case, a last frame of the moving image is determined as the end point of the tracking section.

When tracking is ended due to any of an operation with respect to the stop button I65, arrival at the end of the moving image, and disabled tracking in the framing screen 103, a reset button I67 as illustrated in a lower portion of FIG. 48 is displayed on the framing screen 103.

When the reset button I67 is operated after the end of tracking or the cancel button I64 is operated during tracking, the framing screen 103 returns to a state before the start of tracking (for example, a state illustrated in FIG. 47).

Here, in the embodiment, the CPU 71 recognize an operation on the first screen serving as the framing screen 103 in the tracking mode appearing according to the operation with respect to the tracking button I62 in the first screen, as an operation regarding a target of the target designation aiming 116, as described above. On the other hand, the CPU 71 recognizes an operation on the second screen serving as the framing screen 103 before the tracking button I62 is operated in the second screen, as the operation for designating the image range to be cropped from the image.

This makes it possible to clearly separate operations for designating the cropping range and designating the tracking target or the placement position thereof on the same screen.

Further, in the embodiment, a display for changing the range of the image serving as the cropping range is performed according to the operation recognized on the second screen (see FIGS. 44A and 44B), and a display for moving the designated position by the target designation aiming 116 according to the operation recognized on the first screen is performed (see FIGS. 46A and 46B).

Accordingly, when the user performs an operation in the state of the second screen, the user can clearly recognize that the operation is an operation for designating the cropping range from an image being moved, enlarged, reduced, and rotated. Similarly, when the user performs an operation in a state of the first screen, the user can clearly recognize that the operation is an operation for designating the tracking target and the placement position thereof from the target designation aiming 116 being moved.

Here, in the preview playback in the tracking section described with reference to FIG. 47 or the like, the image processing in the image processing unit 32 described above (see FIG. 14) is performed on the moving image that is a processing target. That is, image processing includes processing such as shake correction (ST15), tracking (ST16), display angle of view designation (ST17), protrusion prevention (ST18), and plane projection and cropping (ST19) described above.

The CPU 71 performs control to cause the moving image obtained through the image processing in the image processing unit 32 to be displayed in the preview area I24 as a preview moving image.

Further, in this example, such image processing in the image processing unit 32 is also executed for the frame image displayed in a paused state in the preview area I24. That is, the frame image displayed in the preview area I24 on the framing screen 103 before entrance to the tracking mode as illustrated in FIG. 42 is an image subjected to image processing such as shake correction or protrusion prevention.

Therefore, in this example, the above-described available area 62 (see FIG. 19) is calculated for the frame image displayed in the preview area I24 through the protrusion prevention processing. In this example, display control is performed in consideration of such an available area 62 at the time of reception of the designation of the cropping range on the framing screen 103.

Figure 50:
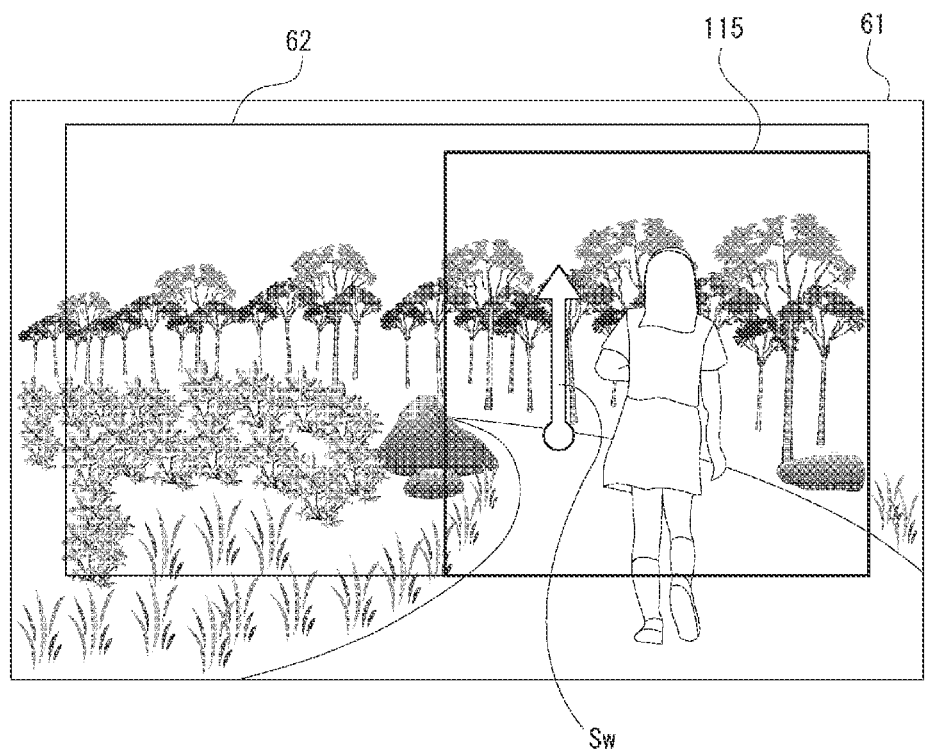
FIG. 50 is a diagram illustrating a relationship between a captured area, an available area, and a display frame for an original image subjected to a preview display.

FIG. 50 illustrates a relationship between the captured area 61, the available area 62, and the display frame 115 described above for the original image subjected to a preview display.

In the example of FIG. 50, a lower side of the display frame 115 matches a lower side of the available area 62.

Here, it is assumed that an instruction operation for moving the cropping range from the original image as shown as, for example, an operation Sw in FIG. 50 downward is performed in the framing screen 103 illustrated in FIG. 42 or 43, that is, the framing screen 103 that is in a state in which the designation of the cropping range can be received. Such an instruction operation is an operation for instructing to cause an image portion outside the available area 62 to be included in the cropping range.

Figure 51:
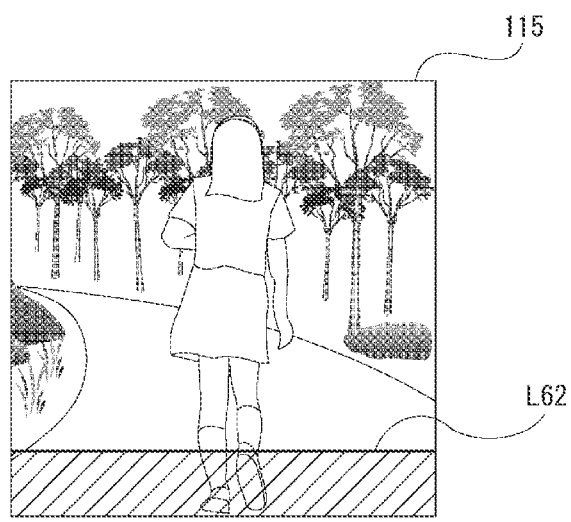
FIG. 51 is a diagram illustrating a display example of an image representing an available area.

When an instruction operation for including the image portion outside the available area 62 within the cropping range is performed in this way, in this example, the original image is moved upward with respect to the display frame 115 (a direction in which movement of the cropping range is instructed) so that the image portion outside the available area 62 is displayed inside the display frame 115, as illustrated in FIG. 51. In this case, in this example, the image portion outside the available area 62 to be displayed inside the display frame 115 is displayed in a different display aspect from that for the image portion inside the available area 62, such as in a grayout manner (see a shaded portion in FIG. 51). Further, in this example, when the image portion of the available area 62 is displayed inside the display frame 115, a display indicating a boundary line L62 of the available area 62 inside the display frame 115 (for example, a thick line with a predetermined color such as red) is performed.

Further, in this example, the operation for designating the cropping range is restricted on the basis of the available area 62.

Specifically, in this example, the image portion outside the available area 62 is displayed inside the display frame 115 according to the operation Sw illustrated in FIG. 50 as described above, but such a display state is continues only in a temporary period until the swipe operation as the operation Sw is completed (in which a contact state with respect to the screen is continued), and the position of the original image with respect to the display frame 115 is adjusted so that the image portion outside the available area 62 is not included inside the display frame 115 according to the completion of the swipe operation. That is, for example, the lower side of the display frame 115 matches the lower side of the available area 62, as in the positional relationship between the display frame 115 and the original image illustrated in FIG. 50. Thus, the operation for designating the cropping range is restricted on the basis of the available area 62.

A display indicating the available area 62, such as the display indicating the boundary line L62 and the grayout display is performed to make it easier for the user to understand that the cropping range within the available area 62 can be designated.

Further, by performing a display for restricting the operation for designating the cropping range on the basis of the available area 62 as described above, it becomes easier for the user to understand a situation in which an operation for changing the cropping range is restricted.

In this example, the control of the display indicating the available area 62 and the restriction of the operation for designating the cropping range on the basis of the available area 62 are not limited to the time of designating the range in vertical, horizontal, and diagonal directions according to the swipe operation, but can also be performed at the time of the operation for designating the cropping range on the basis of the reduction operation or the rotation operation described above.

Figure 52:
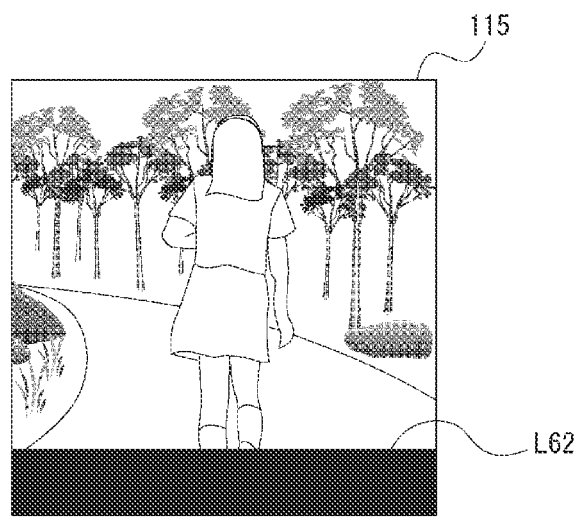
FIG. 52 is a diagram illustrating another display example of the image representing the available area.

The display indicating the available area 62 is not limited to the gray-out display as illustrated in FIG. 51, and a black-painted display as illustrated in FIG. 52 may be considered.

Further, in the preview area I24 that is in a zoom-out display state (see FIG. 33 or the like), the display indicating the available area 62 in the area outside the display frame 115 can be performed.

Further, although an example in which an operation exceeding the available area 62 is temporarily allowed (allowed until the swipe operation is completed) has been given above, for example, the movement of the original image with respect to the display frame 115 is stopped in a range in which the image portion outside the available area 62 is not included inside the display frame 115 with respect to an operation exceeding the available area 62 so that an operation itself exceeding the available area 62 is disabled.

[Export Screen]

Next, the export screen 108 will be described.

Figure 53:
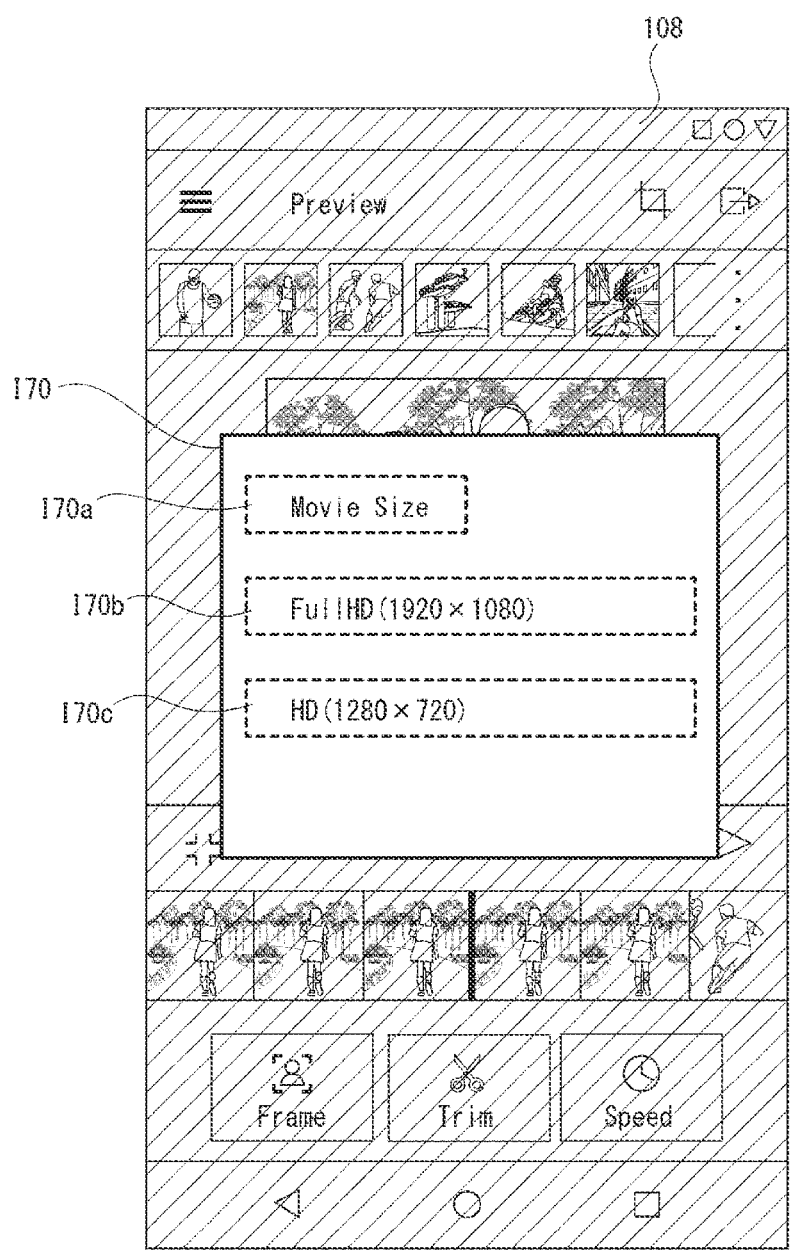
FIG. 53 is a diagram illustrating an example of an export screen.

As illustrated in FIG. 53, a size selection dialog I70 for selecting a final output size of the cropped image is provided in the export screen 108, and a dialog title I70a, a full HD button I70b, and an HD button I70c are disposed in the size selection dialog I70.

In this example, the export screen 108 that is in an initial state displayed according to an operation with respect to the export button I29 is overlaid on the preview screen 102. When the outside of the size selection dialog I70 is tapped, the display can return to the preview screen 102.

In the size selection dialog I70, when the full HD button I70b is tapped, rendering in a full HD size is started, and when the HD button I70c is tapped, rendering in an HD size is started.

The full HD button I70b is displayed in a grayout manner in a model incapable of rendering in full HD, and an error dialog is displayed when the full HD button I70b is tapped.

Figure 54:
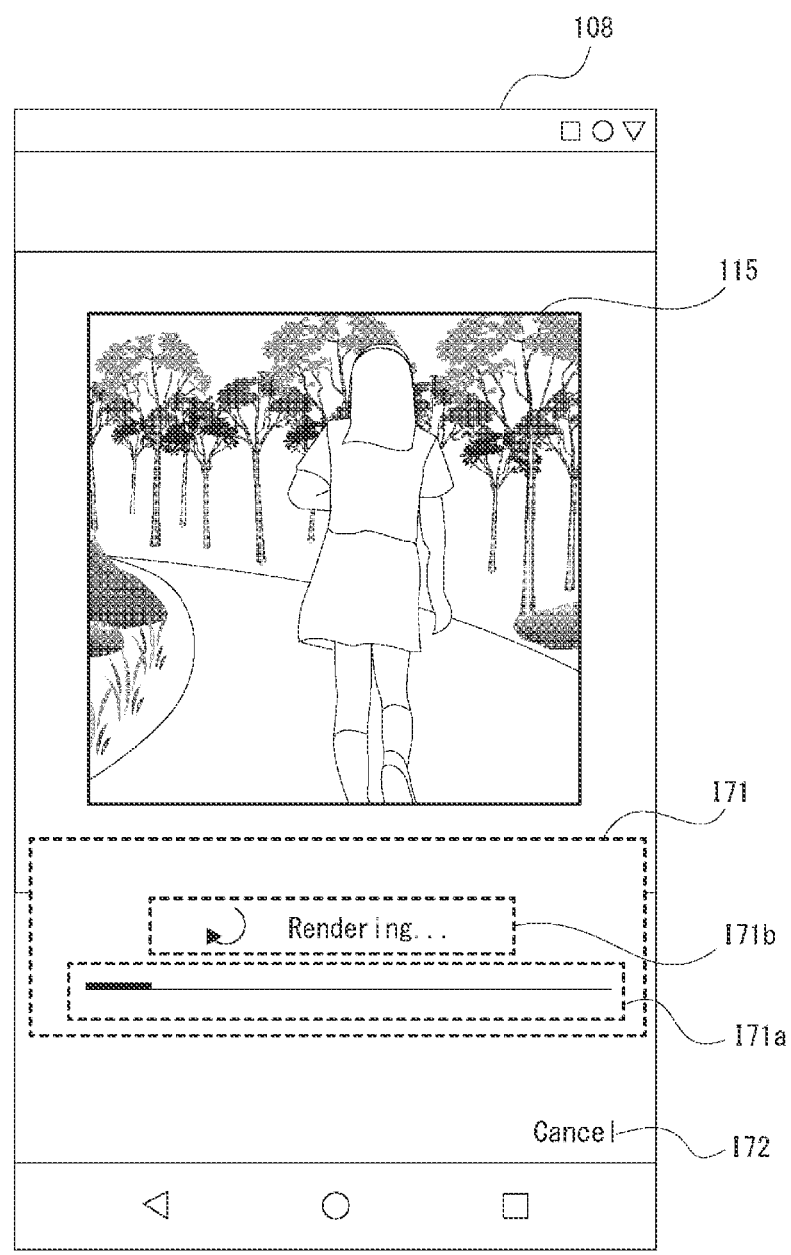
FIG. 54 is a diagram illustrating an example of the export screen during rendering.

FIG. 54 illustrates the export screen 108 during rendering.

In the export screen 108 during rendering, a progress bar I71a is displayed in an in-processing status area I71, and an in-processing wording and an in-processing animation are displayed in processing notation area I71b.

Further, a cancel button I72 is provided in the export screen 108 during rendering, a confirmation dialog (not illustrated) is displayed when the cancel button I72 is operated, a rendering processing is canceled when OK is selected on the dialog, and the display returns to the preview screen 102.

Figure 55:
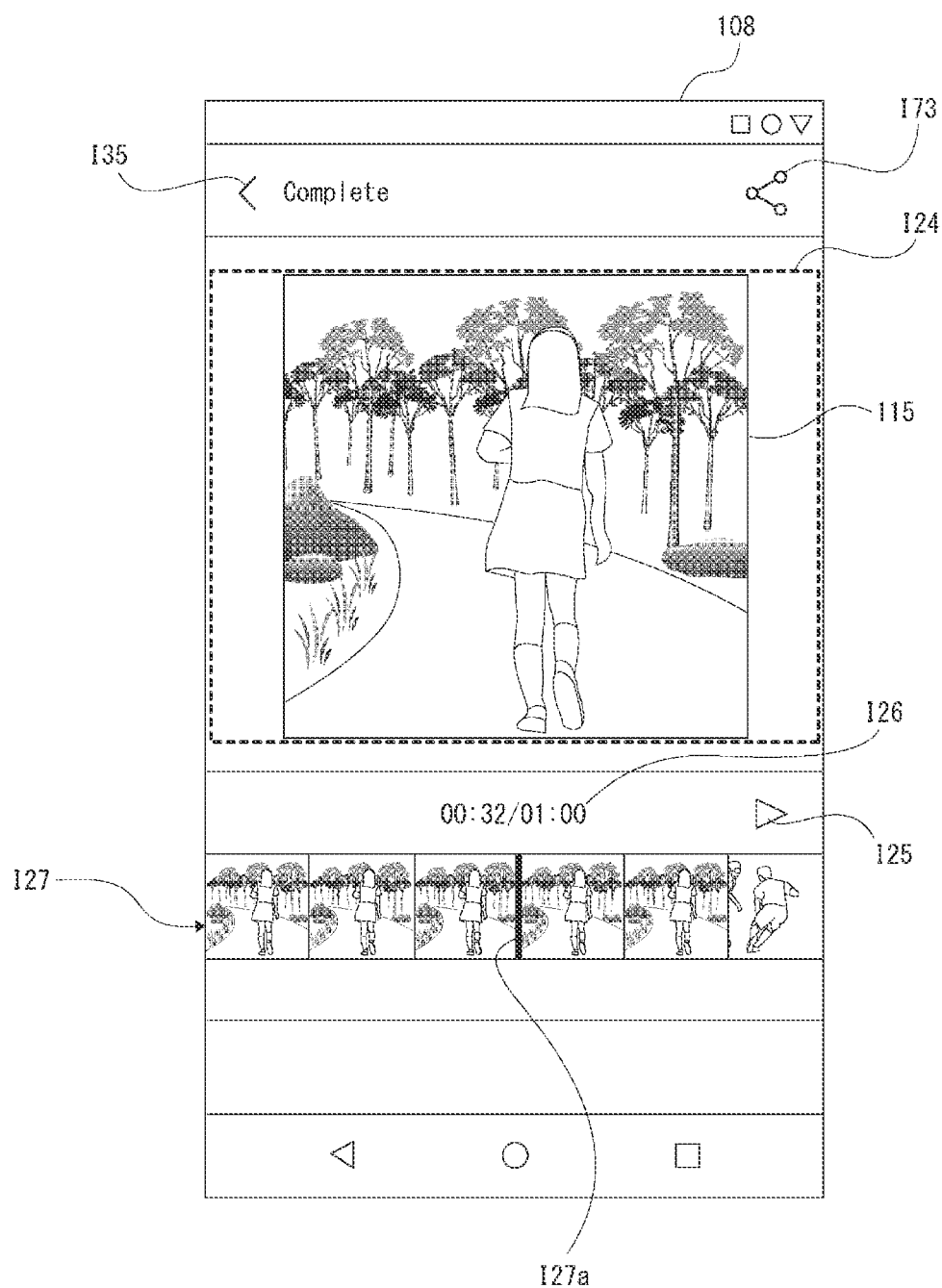
FIG. 55 is a diagram illustrating an example of the export screen after rendering.

FIG. 55 illustrates the export screen 108 after rendering is completed.

In this case, the preview area I24 (including the display frame 115), the playback button I25, the playback time display area I26, and the timeline I27 are provided in the export screen 108, and preview playback for a rendered moving image can be performed using the playback button I25, the playback position bar I27a in the timeline I27, or the like.

Further, the back button I35 and the share button I73 are provided in the export screen 108 in this case. When the back button I35 is operated, the display returns to the preview screen 102. When the share button I73 is operated, an SNS selection screen (OS standard) is displayed. Through this selection screen, the user can upload a moving image after image processing to a desired SNS site.

<7. Processing Related to UI>

Among the UIs related to the image processing described above, processing related to the UI of the framing screen 103 will particularly be described with reference to flowcharts of FIGS. 56 to 58.

Processing to be described below is processing executed as the UI processing unit 36 by the CPU 71, and the CPU 71 executes these processing according to the above-described application program for moving image processing.

Figure 56:
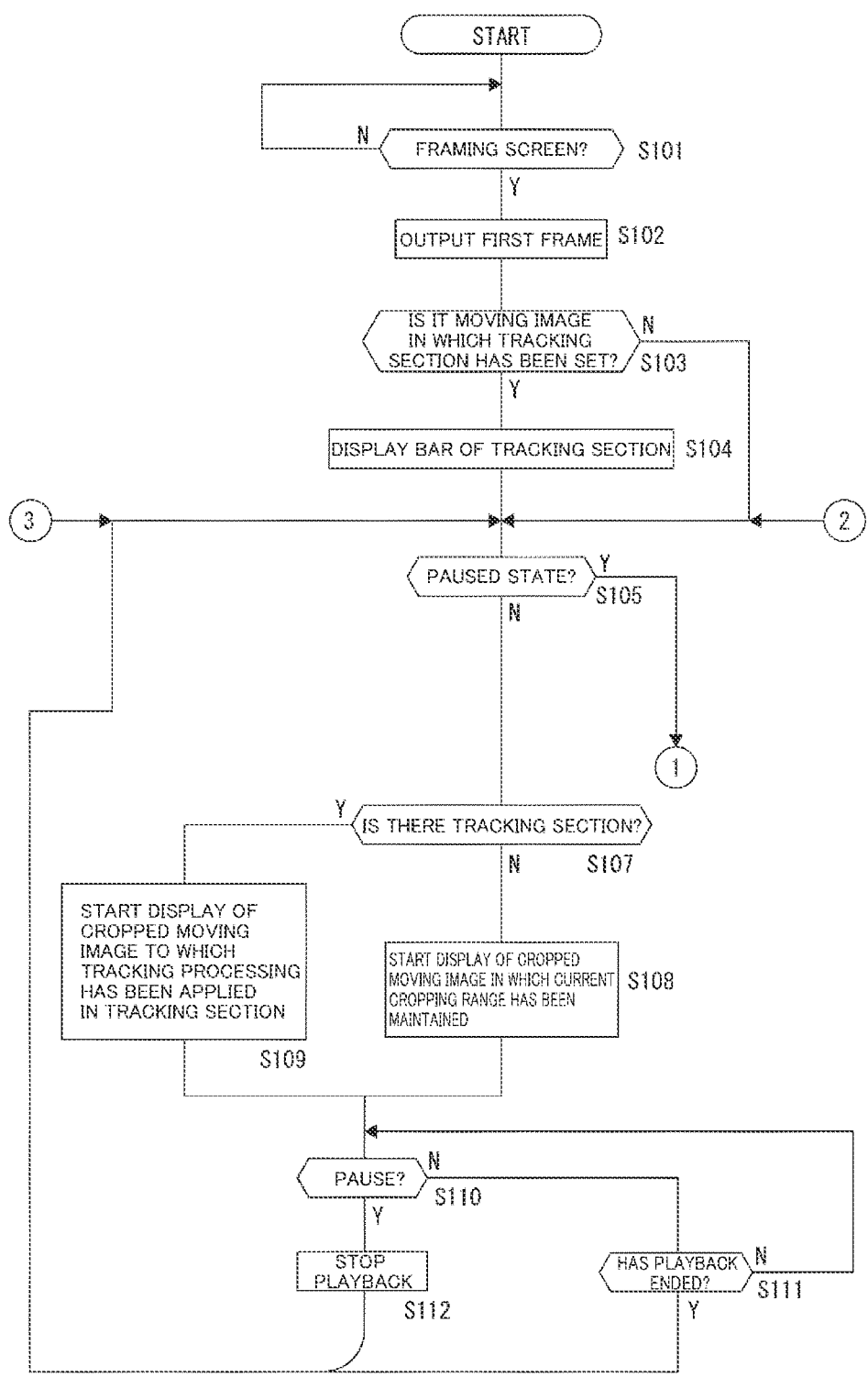
FIG. 56 is a flowchart illustrating processing of an UI processing unit of the embodiment.

In FIG. 56, first, the CPU 71 waits until the transition to the framing screen 103 is reached in step S101. Specifically, in this example, the CPU 71 waits until the frame button B1 in the preview screen 102 is operated.

The CPU 71 executes processing of outputting the first frame in step S102 in response to an operation with respect to the frame button B1 and the transition to the framing screen 103. That is, processing of displaying the framing screen 103 in which an image of the first frame is displayed in the preview area I24 is performed for the moving image in focus in the moving image list area I21, as described above (see FIG. 42). As can be understood from the above description, in the framing screen 103 that is in the initial state displayed according to the operation with respect to the frame button B1, the preview area I24 is in a zoom-in display state, and the reduction button I30 is displayed in the framing screen 103.

Further, in this example, for the frame image displayed in the preview area I24, an image subjected to the shake correction or protrusion prevention processing (calculation of the available area 62) of the editing processing unit 32 described above is displayed.

Next, in step S103, the CPU 71 determines whether or not the moving image in focus is a moving image in which a tracking section has been set. That is, the CPU 71 determines whether or not the moving image in focus is a moving image in which the above-described tracking section has been designated.

When the CPU 71 determines whether or not the moving image in focus is the moving image in which the tracking section has been set, the CPU 71 performs processing of displaying the bar of the tracking section in step S104. Specifically, the CPU 71 performs processing of displaying the section bar I66 (see FIG. 48) described above in the timeline I27 of the framing screen 103. Thereafter, the processing proceeds to step S105.

On the other hand, the moving image in focus is not the moving image in which the tracking section has been set, the CPU 71 passes the processing of step S104 and proceeds to step S105.

In step S105, the CPU 71 determines whether or not the preview playback is in a paused state, that is, whether or not the preview playback in the preview area I24 is in a paused state.

When the preview playback is in the paused state, the CPU 71 shifts to processing related to a cropping range designation and tracking illustrated in FIG. 57 (details will be described below).

On the other hand, when the preview playback is not in the paused state, that is, in a played state, the CPU 71 proceeds to step S107 to determine whether or not there is the tracking section, that is, whether or not a moving image that is a preview playback target is a moving image subjected to the designation of the tracking section.

When there is no tracking section, the CPU 71 proceeds to step S108 and executes processing of starting a display of a cropped moving image in which a current cropping range is maintained. As the display start processing of step S108, processing of displaying the cropped image cropped from the original image in the cropping range designated by the current display frame 115 in the preview area I24 is started. As described above, in this example, the image processing unit 32 also executes the shake correction or protrusion prevention processing for the moving image that is subjected to the preview playback.

Further, in step S107, when there is a tracking section, the CPU 71 proceeds to step S109 and executes processing of starting a display of the cropped moving image subjected to the tracking processing in the tracking section. As the display start processing of step S109, the tracking processing (STST 16) of the image processing unit 32 described above is applied in the designated tracking section, and processing of displaying the cropped image cropped from the original image in the preview area I24 so that the target subject is disposed at the designated position inside the display frame 115 is started.

In response to execution of the display start processing in step S108 or step S109, the CPU 71 waits for arrival at any one of a paused state (that is, a state in which an operation for pausing the preview playback has been performed) and a playback end state (a states in which playback up to an end frame has ended) through processing of steps S110 and S111.

When a determination is made that the playback end state arrives in step S111, the CPU 71 returns to step S105. On the other hand, when a determination is made that the paused state arrives in step S110, the CPU 71 performs the playback pause processing in step S112, that is, pauses the preview playback of the moving image being played, and returns to step S105.

Next, processing of FIG. 57 will be described.

As described above, the processing of FIG. 57 is executed when the paused state is determined in step 105.

First, the CPU 71 waits for an operation with respect to the reduction button I30 (S115), an operation with respect to the enlargement button I31 (S116), an operation for moving the cropping range (S117), a rotation operation (S118), and an enlargement or reduction operation (S119), and an operation with respect to the tracking button I62 (S120) through processing of steps S115 to S120.

In this example, the operation for moving the cropping range in step S117 corresponds to a swipe operation inside the display frame 115. Further, the rotation operation in step S118 comprehensively indicates a rotation operation with two fingers in the display frame 115 or an operation with respect to the rotation button I61. Further, the enlargement or reduction operation in step S118 corresponds to a pinch-out or pinch-in operation inside the display frame 115 in this example.

Here, when a determination is made that the tracking button I62 is not operated in step S120, the CPU 71 returns to step S105 illustrated in FIG. 56.

When a determination is made that the reduction button I30 has been operated in step S115, the CPU 71 proceeds to step S121, execute processing of setting the preview area I24 to the zoom-out display state (see FIG. 43), performs processing of displaying the enlargement button I31 in step S122, and then returns to step S105 in FIG. 56. Here, in this example, in a zoom-out display processing of step S121, the image portion outside the display frame 115 in the original image is displayed in a grayout manner.

When a determination is made that the enlargement button I31 has been operated in step S116, the CPU 71 proceeds to step S123, executes processing of setting the preview area I24 to a zoom-in display state (see FIG. 42), performs processing of displaying the reduction button I30 in step S124, and then returns to step S105.

Further, when a determination is made that the operation for moving the cropping range has been performed in step S117, the CPU 71 proceeds to step S125, executes processing of moving the original image according to the operation, executes processing of setting the cropping range in step S126, and returns to step S105. Further, when a determination is made that the rotation operation has been performed in step S118, the CPU 71 executes the processing of moving the original image according to the operation in step S127, executes the processing of setting the cropping range in S128, and returns to step S105.

Further, when a determination is made that the enlargement or reduction operation has been performed in step S119, the CPU 71 executes the processing of moving the original image according to the operation in step S129, executes the processing of setting the cropping range in step S130, and returns to step S105.

Here, in this example, in the processing of moving the original image according to the operations of steps S125, S127, and S129, the CPU 71 executes processing of the display indicating the available area 62 described above or processing of a display indicating that the operation for designating the cropping range (specifically, the operation for moving the cropping range, the rotation operation, and the operation for enlarging or reducing the cropping range in this example) is restricted on the basis of the available area 62, as necessary.

Further, when a determination is made that the tracking button I62 has been operated in step S120, the CPU 71 executes a tracking correspondence processing in step S131.

Figure 58:
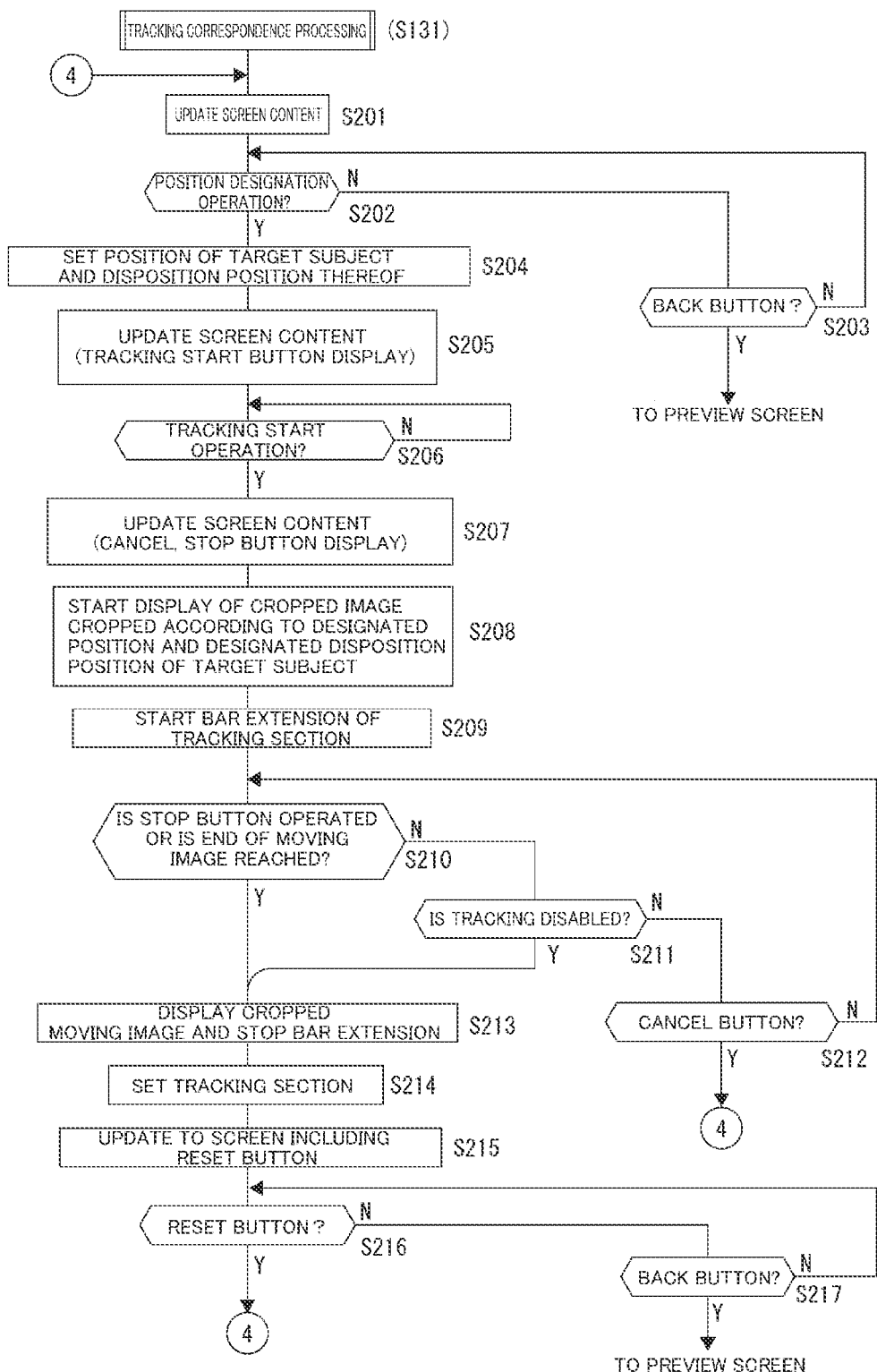
FIG. 58 is a flowchart illustrating a tracking correspondence processing.

FIG. 58 is a flowchart of the tracking correspondence processing in step S131. First, the CPU 71 executes a screen content updating processing in step S201. That is, the CPU 71 executes processing of updating screen content of the framing screen 103 into screen content in the tracking mode illustrated in FIG. 45.

In response to the execution of the updating processing of step S201, the CPU 71 waits for a position designation operation (S202) and an operation with respect to the back button I35 (S203) through processing of steps S202 and S203. The operation for designating the position of the target designation aiming 116 in this example (in this example, an operation for tapping an arbitrary position inside the display frame 115 or an operation of dragging and moving the target designation aiming 116) corresponds to the position designation operation in step S202. Here, when the CPU 71 determines that the back button I35 has been operated in step S203, the CPU 71 performs processing of transition to the preview screen 102.

When a determination is made that the position designation operation has been performed in step S202, the CPU 71 performs processing of setting the position of the target subject and the placement position thereof in step S204. That is, the processing of setting the position of the tracking target subject, and the placement position of the tracking target subject in an image frame of the cropped image is executed.

In step S205 following step S204, the CPU 71 executes the screen content updating processing. In the updating processing of step S205, processing of updating the screen content of the framing screen 103 to screen content including the tracking start button I63 as illustrated in FIG. 47 above is performed.

In the subsequent step S205, the CPU 71 waits for a tracking start operation, that is, an operation with respect to the tracking start button I63.

When a determination is made that the tracking start button I63 is operated and the tracking start operation has been performed, the CPU 71 executes the screen content updating processing in step S207. In the updating processing of step S207, the screen content of the framing screen 103 is updated to screen content including the cancel button I64 and the stop button I65 as illustrated in FIG. 48 above.

In step S208 following step S207, the CPU 71 performs processing of starting a display of the cropped image cropped according to the designated position and the designated placement position of the target subject. That is, a display in the preview area I24 of the cropped image cropped so that the subject at the position designated in step S202 is disposed at the same position within the designated image frame is started.

Further, the CPU 71 starts a bar extending processing of the tracking section in step S209 following step S208. That is, the CPU 71 starts a display processing of extending the section bar I66 as illustrated in FIG. 48 in the timeline I27.

In response to execution of an extension start processing in step S209, the CPU 71 waits for an operation of the stop button I65 or arrival at the end of the moving image (S210), arrival at a trackable-disabled state (S211), and an operation with respect to the cancel button I64 (S212) through processing of steps S210 to S212. When a determination is made that the stop button I65 has been operated or the end of the moving image has been reached in step S210, the CPU 71 proceeds to step S213, executes a display of the cropping operation started in step S208 and processing of stopping the bar extension started in step S209, and performs setting of the tracking section in the subsequent step S214.

Further, even when the CPU 71 determines in step S211 that the tracking is disabled (for example, flameout of the target subject), the CPU 71 proceeds to step S214 and performs the setting of the tracking section.

Here, when a determination is made that the cancel button I64 has been operated in step S212, the CPU 71 returns to step S201. Accordingly, the framing screen 103 is returned to a state before the start of tracking (for example, the state illustrated in FIG. 47).

In step S215 following the setting processing of step S214, the CPU 71 executes processing of updating into a screen including the reset button I67 (see a lower part of FIG. 48), and waits for an operation with respect to the reset button I67 (S216) and an operation with respect to the back button I35 (S217) through processing of steps S216 and S217. When a determination is made that the reset button I67 has been operated in step S216, the CPU 71 returns to step S201. Accordingly, the framing screen 103 is returned to a state before the start of tracking (for example, the state illustrated in FIG. 47), as in a case in which the cancel button I64 described above is operated.

Further, when a determination is made that the back button I35 has been operated in step S217, the CPU 71 executes processing for a transition to the preview screen 102.

<8. Modification Example of UI>

Here, various modification examples can be considered for details of the UI related to image processing.

Figure 59:
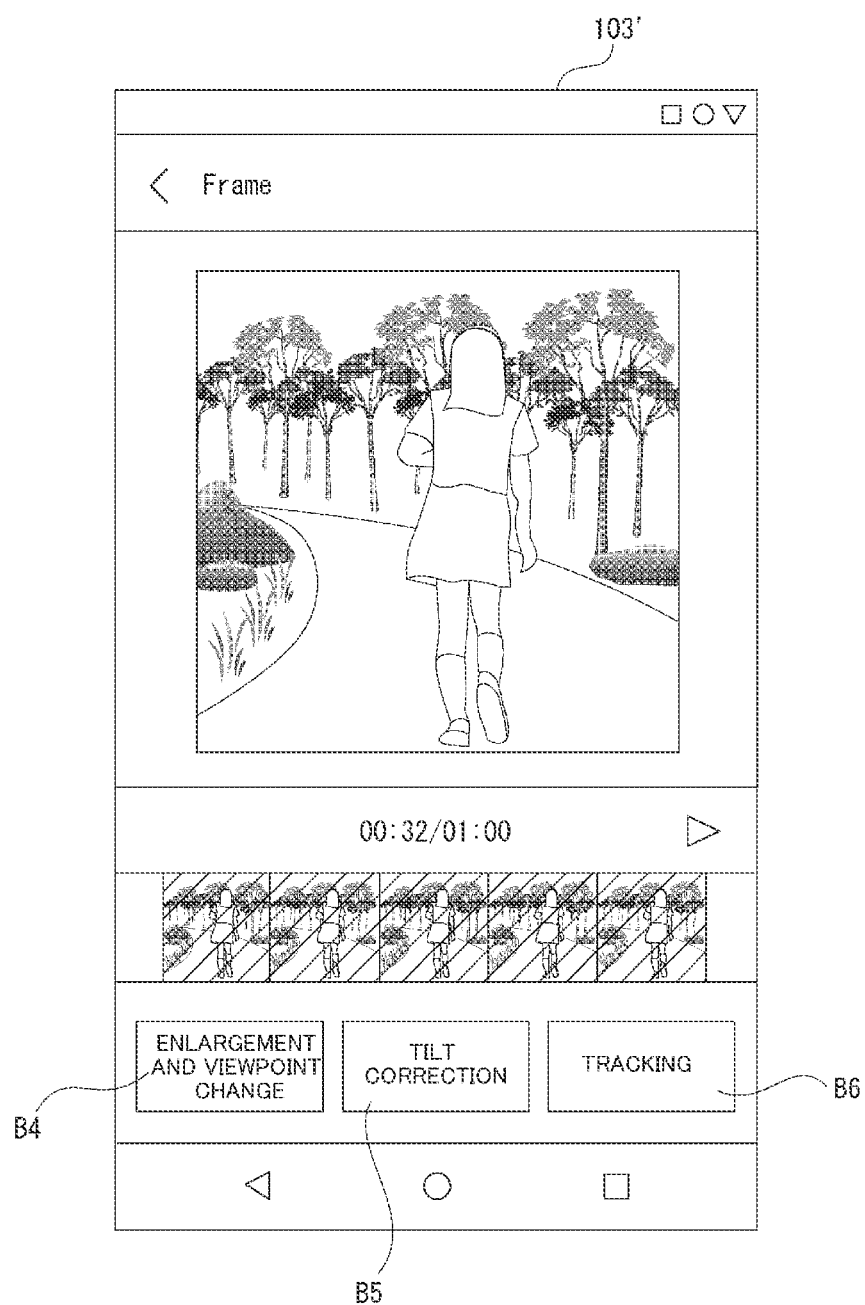
FIG. 59 is a diagram illustrating an example of a framing screen as a modification example.

For example, as in a framing screen 103' as a modification example illustrated in FIG. 59, an enlargement and viewpoint change mode button B4, a tilt correction mode button B5, and a tracking mode button B6 are disposed within the screen so that, in each of modes indicated by these buttons, reception of different types of operations can be performed.

Specifically, the enlargement and viewpoint change mode button B4 is a button for instructing a transition to an enlargement and viewpoint change mode in which the operation for designating the cropping range through enlargement or reduction of the original image or movement of the original image is received, and the tilt correction mode button B5 is a button for instructing a transition to a tilt correction mode in which the operation for designating the cropping range through rotation of the original image is received. The tracking mode button B6 is a mode for instructing a transition to a tracking mode, like the tracking button I62 described above.

Figure 60:
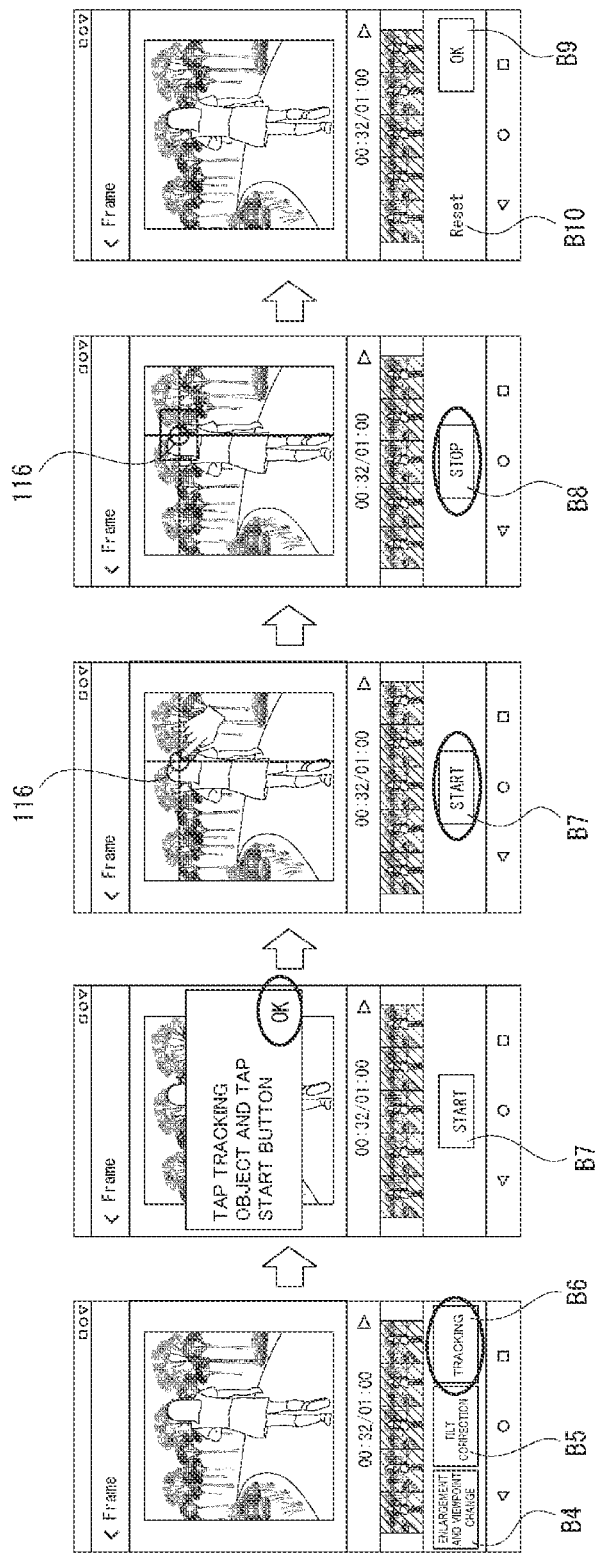
FIG. 60 is a diagram illustrating a transition example of the framing screen in a tracking mode in the modification example.

As illustrated in a transition diagram of FIG. 60, when the tracking mode button B6 is operated, a guide dialog describing an operation method for performing the designation of the tracking target or the designation of the tracking section is displayed, and when an OK button displayed in the dialog is operated, designation of the position of the tracking target subject and the placement position within the image frame can be performed according to a touch operation. In this case, tracking can be started according to an operation of the start button B7, and an end point of tracking can be instructed according to an operation with respect to a stop button B8 displayed during tracking. An OK button B9 and a reset button B10 are displayed depending on the end point of tracking being determined, but processing content is settled according to an operation with respect to the OK button B9, and the processing content is discarded according to an operation with respect to the reset button B10 such that content of the framing screen 103' returns to content in the initial state illustrated in FIG. 59.

Figure 61:
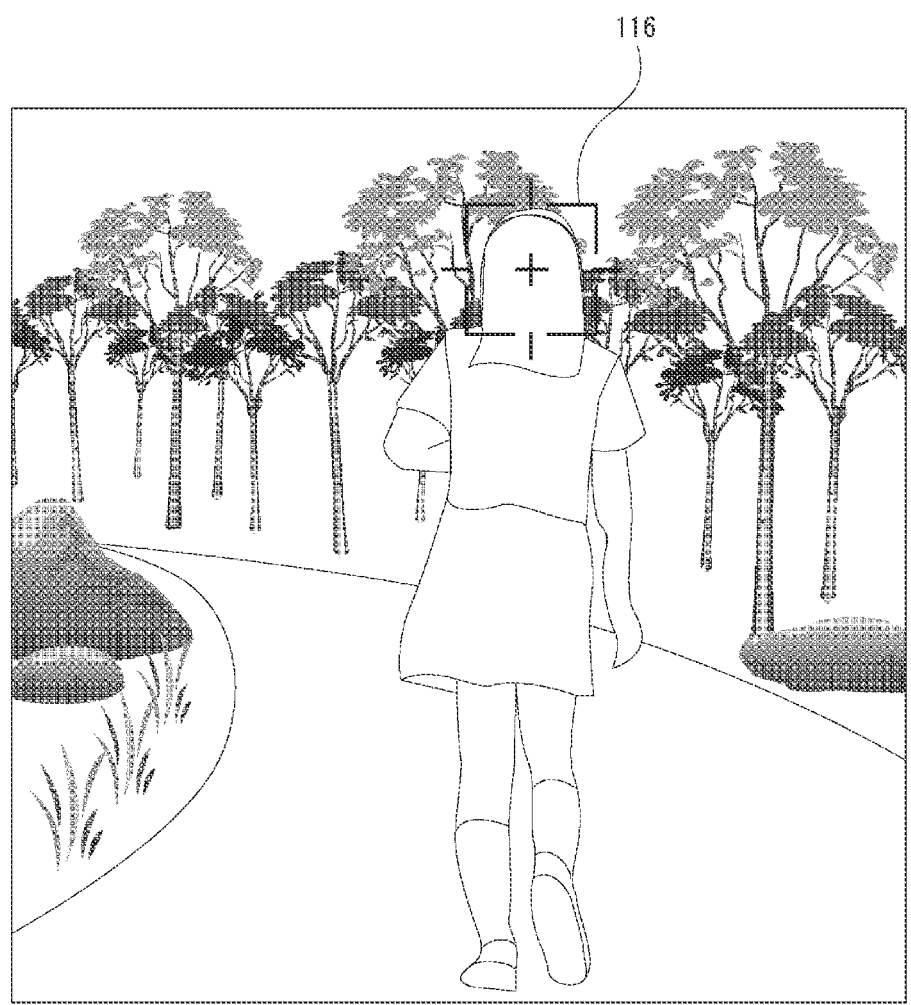
FIG. 61 is a diagram illustrating a shape of a target designation aiming as a modification example.

A shape of the target designation aiming 116 for designating the tracking target subject or the placement position within the image frame of the target subject is not limited to shapes illustrated so far, a shape as illustrated in FIG. 61, for example, can be adopted, and a specific shape is not limited.

Figure 62:
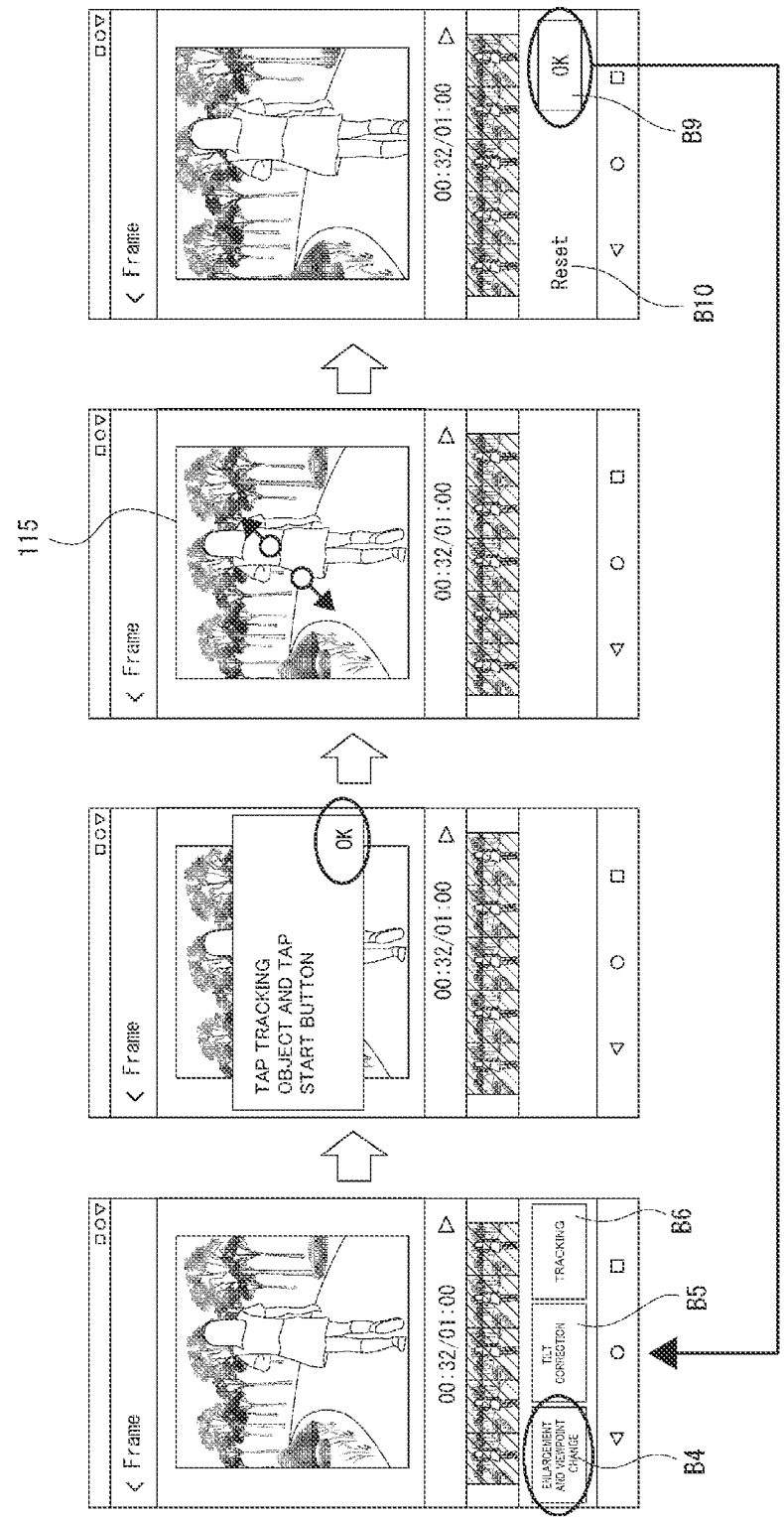
FIG. 62 is a diagram illustrating a transition example of the framing screen in an enlargement and viewpoint change mode in the modification example.

FIG. 62 illustrates an example of a screen transition when an enlargement and viewpoint change mode button B4 is operated on the framing screen 103'. When the enlargement and viewpoint change mode button B4 is operated, a guide dialog describing operations possible in the enlargement and viewpoint change mode is displayed on the screen, and when an OK button displayed in the dialog is operated, designation of the cropping range through enlargement or reduction of the original image or movement of the original image can be performed according to the operation with respect to the display frame 115. In this case, screen content is returned to an initial state according to an operation of the OK button B9 or the reset button B10.

Figure 63:
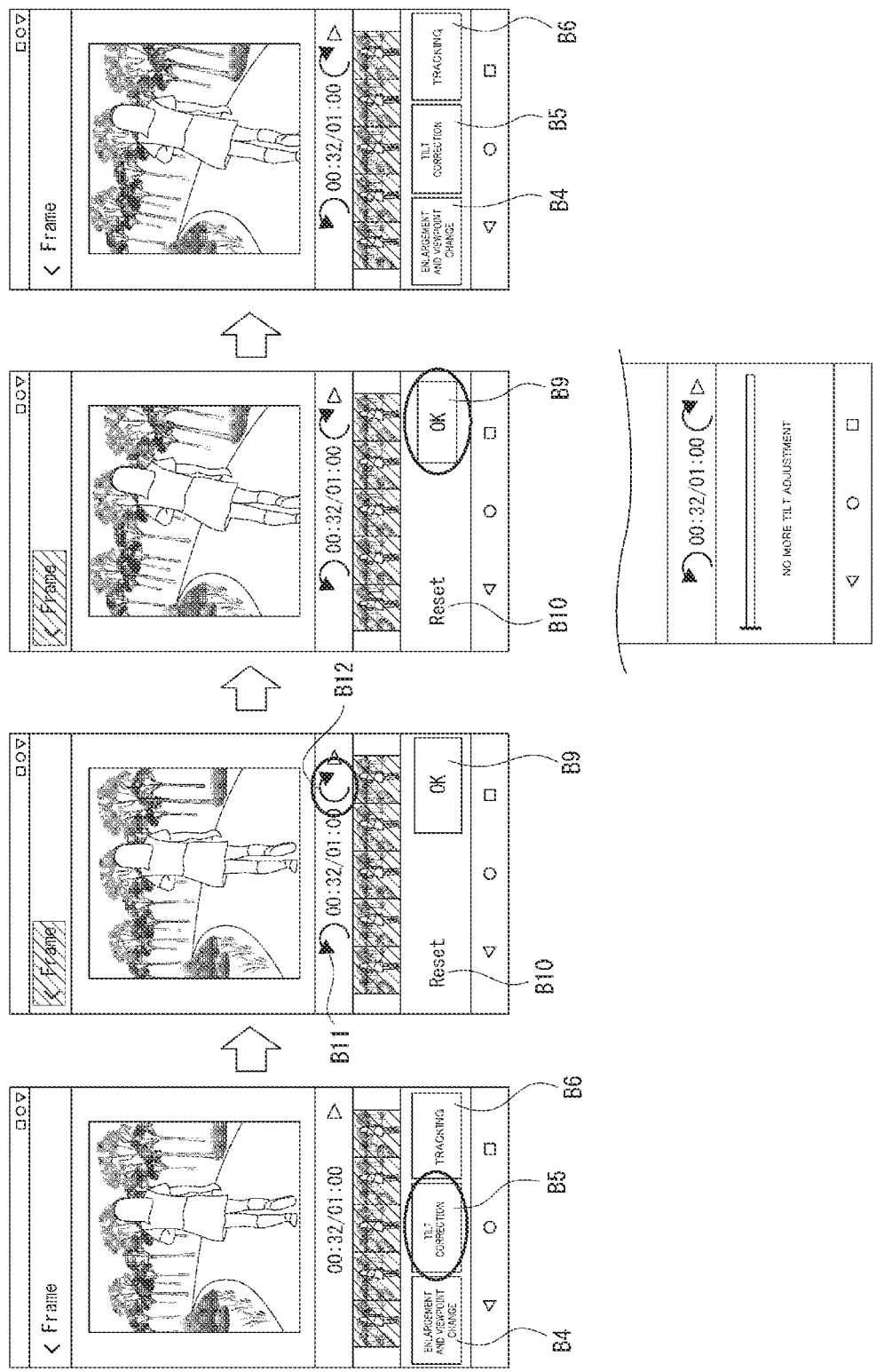
FIG. 63 is a diagram illustrating a transition example of the framing screen in a tilt correction mode in the modification example.

FIG. 63 illustrates an example of screen transition when the tilt correction mode button B5 is operated on the framing screen 103'.

When the tilt correction mode button B5 is operated, the guide dialog describing operations possible in the tilt correction mode is displayed on the screen, and when an OK button displayed in the dialog is operated, a left rotation button B11 and a right rotation button B12 are displayed as illustrated in FIG. 63, and the rotation of the original image with respect to the display frame 115 can be instructed according to an operation with respect to these buttons. In this case, screen content is returned to an initial state according to an operation with respect to the OK button B9 and the reset button B10.

Figure 64:
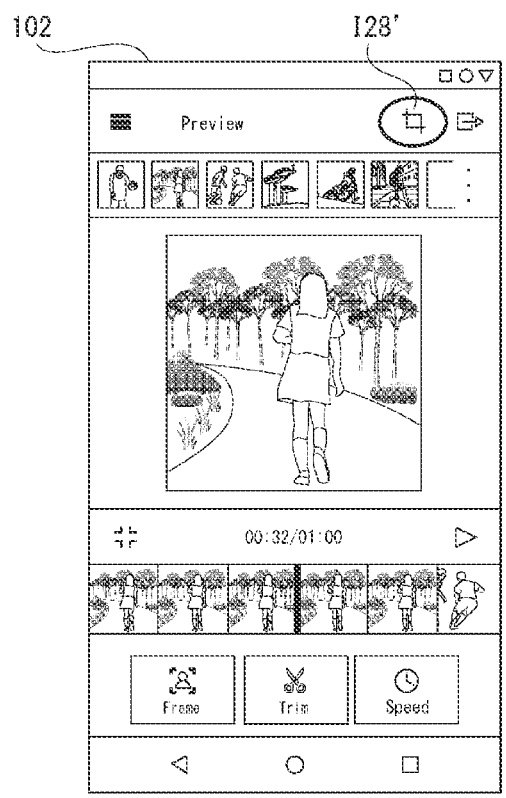
FIG. 64 is an illustrative diagram of a modification example of reception of designation of an aspect ratio.
Figure 65:
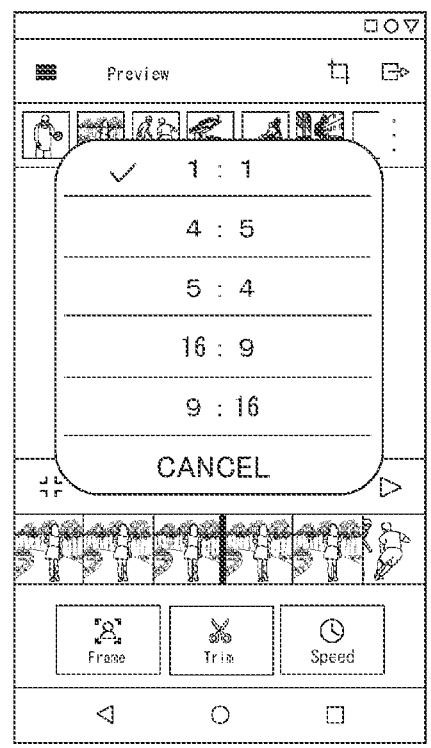
FIG. 65 is also an illustrative diagram of a modification example of reception of designation of the aspect ratio.

Further, in the above description, although the designation of the aspect ratio is performed on the aspect ratio setting screen 106, for example, an aspect ratio setting button I28' as illustrated in FIG. 64 can be disposed, an aspect ratio selection dialog as illustrated in FIG. 65 can be displayed on the screen according to the operation with respect to the aspect ratio setting button I28', and designation of the aspect ratio can be received in the selection dialog.

Here, the aspect ratio setting button I28' illustrated in FIG. 64 is disposed on screens related to various types of image processing including not only the preview screen 102 but also the framing screen 103, and can be used for a call on the various screens. In this case, when an operation for designating the aspect ratio is performed on the dialog, the dialog can be changed from a display state to a non-display state for return to a screen state immediately before the dialog display. When the aspect ratio is designated, the display frame 115 is displayed at the designated aspect ratio.

Figure 66:
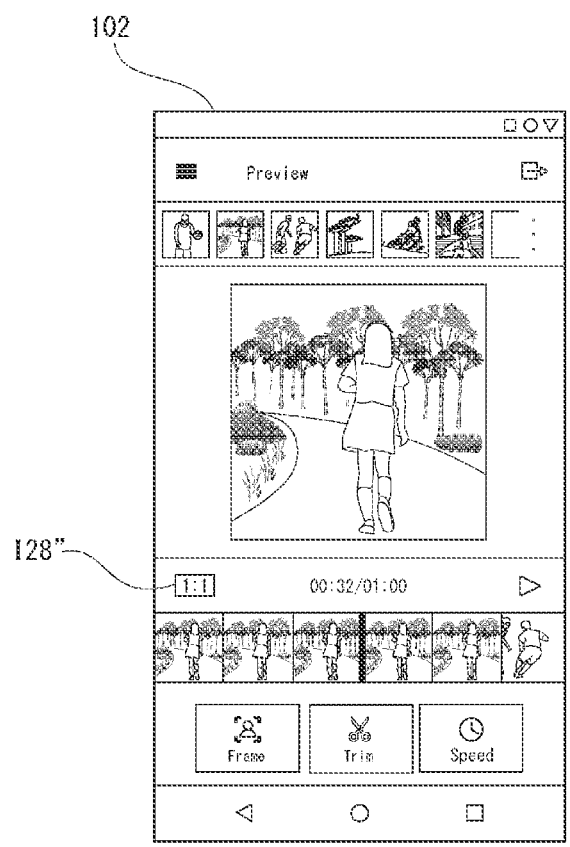
FIG. 66 is an illustrative diagram of a modification example of an operation image related to reception of designation of an aspect ratio.

A display form of the aspect ratio setting button I28' is not limited to the display form exemplified above, and an image in a form in which a currently set aspect ratio is shown can also be disposed in the screen, for example, like an aspect ratio setting button I28" illustrated in FIG. 66 (disposed near the preview area I24 in the example in FIG. 66). In response to the operation with respect to the aspect ratio setting button I28", the dialog of FIG. 65 is displayed on various screens and the designation of the aspect ratio is received.

<9. Conclusion Regarding UI>

As described above, the information processing device (for example, the mobile terminal 2) of the embodiment includes a reception unit (the reception unit 36*a*) that receives designation of a placement position in a display area for the tracking target on the first screen for displaying a predetermined image in the display area (the display frame 115).

For example, a user is allowed to designate a position (a position within the display area) in which a tracking target subject is disposed in a state in which image content can be recognized on a display screen.

Accordingly, it is possible for the user to designate the placement position of the target subject in the display area as an arbitrary position using a scheme as illustrated in FIGS. 13A, 13B, 46A, and 46B, for example.

Therefore, it is possible to improve a degree of freedom of the placement position within the image frame of the tracking target subject, and improve a degree of freedom in image production.

Further, in the information processing device of the embodiment, the predetermined image is an image cropped from the original image.

That is, the image displayed in the display area is a cropped image from the original image.

Accordingly, when image processing for cropping an image from the original image so that the tracking target subject is included within the image frame is performed, the user can be caused to designate the placement position of the target subject within the image frame as an arbitrary position.

Therefore, it is possible to improve a degree of freedom of the placement position within the image frame of the tracking target subject, and improve a degree of freedom in image production.

Further, in the information processing device of the embodiment, the reception unit receives the designation of the tracking target.

That is, designation of the subject as the tracking target is received from among subjects in the image.

This enables the user to designate any subject in the image as a tracking target subject, and a degree of freedom in image production in this respect can be improved.

Further, the information processing device of the embodiment includes a display control unit (the display control unit 36*b*) that performs display control of a predetermined image so that the tracking target is disposed at a position in the display area based on the designated placement position.

For example, an image reflecting the placement position of the tracking target subject designated by the user is displayed.

Accordingly, the user can confirm whether or not the designation of the placement position of the tracking target subject is appropriate and can provide a good working environment for work of designating the placement position of the tracking target subject.

Further, in the information processing device of the embodiment, the reception unit receives designation of the image range to be cropped from the original image.

For example, the user can designate a range of the original image included in the image frame of the cropped image on the display screen.

Specifically, for example, as illustrated in FIGS. 12A, 12B, 44A and 44B, an original image (an entire frame image) appearing in the display range can be moved or an operation for enlarging or reducing the original image can be performed as described in FIG. 12C so that a range that is used as the cropped image, that is, the cropping range CL' can be designated. Accordingly, after imaging, image editing in which an arbitrary cropping range is designated from the original image and a desired image range is adopted becomes possible.

Further, in the information processing device of the embodiment, the display control unit causes an operation image (target designation aiming 116) that is used for the operation for designating the placement position of the tracking target to be displayed on the first screen.

For example, the operation image serving as an aiming for designation of the placement position is overlapped and displayed on the display area so that the user can designate a position in the image frame using the operation image.

The user can designate the placement position of the tracking target in the cropped image by moving the target designation aiming 116. In particular, with the target designation aiming 116, an intuitive placement position designation operation can be performed and operability can be improved.

Further, in the information processing device of the embodiment, the reception unit receives the designation of the tracking target and the designation of the placement position of the tracking target on the basis of an operation with respect to the operation image.

For example, by an operation for designating a certain place with the operation image on the display area, a subject in such a portion is set as the tracking target, and the position of the operation image is received as the placement position of the tracking target.

Thus, the user can designate the tracking target and the placement position at the same time through a movement of the target designation aiming 116, and operability can be improved.

Further, in the information processing device of the embodiment, the predetermined image is an image cropped from the original image, and the reception unit receives designation of a cropping range from the original image and the operation regarding the tracking target using the operation image as an operation on the screen.

For example, the range cropped from the original image is displayed on the display screen, and the operation image is displayed on an image thereof. On the screen, change in the cropping range or movement of the operation image is received.

This allows the user to seamlessly perform designation of the tracking target or designation of the placement position through designation of the cropping range and movement of the target designation aiming 116.

Specifically, for example, the cropping range is moved so that the subject to be the tracking target is set to a desired placement position in the cropping range. The subject is designated using the target designation aiming 116 (see FIGS. 12A, 12B, 12C, 13A, 13B, 44A, 44B, 46A, and 46B). This allows a user's operation for designating the cropping range or the target placement position while recognizing the target to be intuitive and easy.

Further, in the information processing device of the embodiment, the reception unit switches between a state in which an operation on the screen is recognized as an operation for designating a range cropped from the original image and a state in which the operation is recognized as an operation regarding the tracking target using the operation image.

For example, recognition modes for a user operation performed on the screen are switched therebetween according to an operation prepared by an icon on the display screen.

For example, operation inputs are separately recognized as the operation for designating the cropping range and the operation for moving the target designation aiming 116 according to the operation with respect to the tracking button I62. Thus, user operations on the same screen can be accurately recognized.

Further, in the information processing device of the embodiment, the reception unit recognizes an operation on the screen as an operation for designating the image range to be cropped from the original image on a second screen, and recognizes the operation on the screen as an operation regarding the tracking target using the operation image on the first screen.

The recognition of the user operation performed on the screen is switched depending on whether the display screen is in the state of the first screen or the state of the second screen.

For example, in an initial state when the display transitions to the framing screen 103, a display of an image of the cropping range and the target designation aiming 116 is performed, but the screen is a second screen in which the target designation aiming 116 is fixed. In this case, it is assumed that the image is moved and the designation of the cropping range is changed according to an operation such as dragging by the user.

When the tracking button I62 is operated from the state of the second screen, the first screen is displayed. The first screen referred to here is a screen that is in a state in which the target designation aiming 116 can be moved. An operation on the screen of the user in this case is recognized as an operation for moving the target designation aiming 116.

Thus, it is possible to clearly separate the operations for designating the cropping range and designating the tracking target or the placement position thereof on the same screen, and it is difficult for the operation of the user to be erroneously recognized. Therefore, it is possible to provide an operation environment with less stress to the user.

Further, in the information processing device of the embodiment, the display control unit performs a display for changing a range of the image serving as a cropping range according to the operation recognized by the reception unit on the second screen, and performs a display for moving a designated position using the operation image according to the operation recognized by the reception unit on the first screen.

When the display screen is the second screen, for example, the image of the cropping range is displayed in the entire screen or in the display area, but this is changed according to an operation.

When the display screen is the first screen, the designated position using the operation image is moved according to an operation.

When the user performs an operation in the state of the second screen, the user can clearly recognize that the operation is the operation for designating the cropping range from the image being moved, enlarged, reduced, and rotated. Similarly, when the user performs an operation in the state of the first screen, the user can clearly recognize that the operation is the operation for designating the tracking target and the placement position thereof from the target designation aiming 116 being moved. This makes it possible to provide an operation environment that is easy for the user to understand.

Further, in the information processing device of the embodiment, the image cropped from the original image in the display area changes according to an operation on the second screen, and the placement position of the operation image in the display area changes according to an operation on the first screen.

That is, image change such as movement, enlargement, reduction, and rotation of the original image occurs in the display area according to the operation on the second screen, and a change in the original image within the display area, for example, does not occur according to an operation on the first screen, but the placement position of the operation image changes.

Accordingly, when the user performs an operation in the state of the second screen, the user can clearly recognize that the operation is the operation for designating the cropping range, and when the user performs an operation in the state of the first screen, the user can clearly recognize that the operation is the operation for designating the tracking target and the placement position thereof. Therefore, it is possible to provide an operation environment that is easy for the user to understand.

Further, in the information processing device of the embodiment, the original image is one image in an image group configured of a plurality of images.

This makes it possible for the user to designate the placement position of the target subject within the image frame of the cropped image as an arbitrary position for each of images constituting the image group.

Therefore, it is possible to improve a degree of freedom of the placement position within the image frame of the tracking target subject, and improve a degree of freedom in image production.

Further, the information processing device of the embodiment performs image cropping processing so that the tracking target is disposed at a position in the display area based on the designated placement position, on at least one image after an order of the image for which the designation of the placement position is received among the plurality of consecutive images in the predetermined order.

Accordingly, the placement position of the tracking target is designated for one among the plurality of consecutive images in the predetermined order, and image cropping processing for causing the tracking target to be located at a position based on the designated position is performed on frame images subsequent in order. Therefore, it is possible to reduce a burden on a user operation in a case in which the image cropping processing for causing the tracking target to be located at the position based on the designated position is performed on the plurality of consecutive images in a predetermined order.

Further, in the information processing device of the embodiment, the image group consists of a series of frame images constituting a moving image. This makes it possible to cause the user to designate the placement position of the target subject within the image frame of the cropped image as an arbitrary position when image cropping is performed on each frame image constituting the moving image.

Therefore, it is possible to improve a degree of freedom of the placement position within the image frame of the tracking target subject, and improve a degree of freedom in image production.

Further, in the information processing device of the embodiment, the reception unit receives designation of a tracking section that is a section in which cropping from the original image is performed so that the tracking target is disposed at a position in the display area based on the designated placement position.

This makes it possible for the user to arbitrarily designate the tracking section as well.

Therefore, the degree of freedom in designating the tracking section can be improved, and a degree of freedom in image production can also be improved in this respect as well.

Further, in the information processing device of the embodiment, the predetermined image is an image cropped from the original image, and the display control unit performs control for displaying an image in a cropping range from the original image and an image outside the cropping range in different display aspects. For example, the entire original image is displayed on the display screen, and a display aspect is such that the inside of the cropping range and the outside of the cropping range can be distinguished.

Thus, the user can clearly recognize what range in the original image is set as the cropping range, and can provide an image useful for a determination as to whether the cropping range is good or for an operation for changing the cropping range.

Further, the information processing device of the embodiment includes a shake correction unit (the shake correction unit 33) that performs processing of pasting to the virtual celestial spherical surface for each frame of the image data constituting the moving image, and performs the shake correction using the posture information corresponding to the frame, and a cropping range setting unit (the cropping area setting unit 34) that performs the protrusion prevention processing for performing correction so that the cropping range according to designation of the cropping range received by the reception unit does not protrude from the area in which the shake correction is effectively maintained, and the display control unit performs control of a display of the cropped image reflecting the protrusion prevention processing performed by the cropping range setting unit.

For example, shake caused by, for example, camera shake in the image captured by the imaging device is corrected through coordinate transformation on the virtual celestial spherical surface, and the cropping range of the image subjected to this shake correction and projected onto the plane is set on the basis of an operation of the user. In this case, the protrusion prevention processing is performed so that the cropping range does not exceed the range in which the shake correction is effectively maintained. The display control unit performs display control so that the user can recognize a cropping range of a range that is restricted through this protrusion prevention processing.

Here, in a display of the framing screen 103, the protrusion prevention processing is covered, making it possible for a limit of the cropping range designation to be clearly communicated to the user. For example, a display indicating that the cropping range exceeding the available area 62 by the protrusion prevention processing cannot be designated is performed, as illustrated in FIG. 51, making it possible for the user to perform designation of an appropriate cropping range.

Further, in the information processing device of the embodiment, the display control unit performs control so that a display based on an allowed movement range in which a variation in the cropping range of the image is allowed, which is set in the protrusion prevention processing, is performed.

The protrusion prevention processing is processing of causing the cropping range set on the basis of the operation information to be accommodated in the range in which the shake correction is effective, and in this case, the allowed movement range is set as the range in which the shake correction is effectively maintained. That is, the cropping range is allowed to be moved as long as the range is in the allowed movement range. On the display, a display is performed so that the user can recognize this allowed movement range.

The display indicating the available area 62 is performed on the display of the framing screen 103, so that it can be seen that designation of the cropping range in the available area 62 can be performed. This makes it easier for the user to understand a range in which the cropping range can be designated.

Further, in the information processing device of the embodiment, the display control unit performs control so that a display for specifying that an operation for designating the cropping range exceeding the allowed movement range is restricted is performed.

For example, when the cropping range exceeds the allowed movement range, a display making it impossible to change the cropping range or causing the cropping range to return to the allowed movement range is executed.

When the designation of the cropping range is performed on the display of the framing screen 103 and the available area 62 is exceeded, a display indicating that the operation becomes disabled or return to the available area 62 occurs is performed, making it possible for the user to understand a situation in which the operation for changing the cropping range is restricted. Further, the available area 62 is displayed, making it easy to understand that the operation is restricted rather than a malfunction of the operation when the designation is disabled.

The effects described in the present specification are merely examples and are not limited, and other effects may be obtained.

<10. Program>

Figure 57:
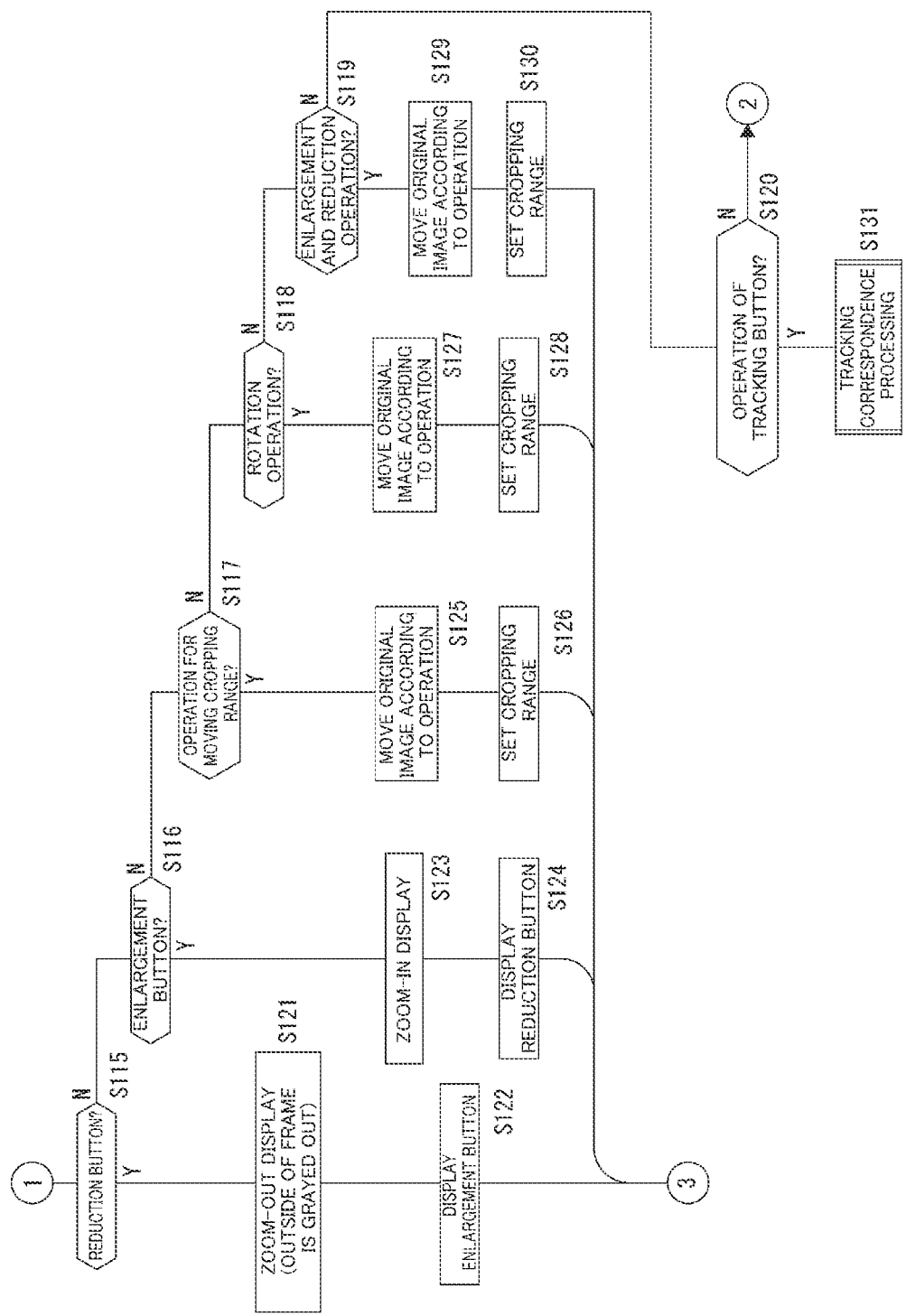
FIG. 57 is a flowchart illustrating processing related to cropping range designation and tracking.

A program of the embodiment is a program for causing, for example, a CPU, a DSP, or a device including these to execute the processing illustrated in FIGS. 56 to 58. That is, the program of the embodiment is a program that causes the information processing device to execute processing of receiving the designation of the placement position in the display area of the tracking target on the first screen for displaying a predetermined image in the display area. With such a program, the information processing device of the embodiment described above can be realized in a device such as the mobile terminal 2, the personal computer 3, or the imaging device 1.

Such a program can be recorded in advance in an HDD as a recording medium built into a device such as a computer device, a ROM in a microcomputer including a CPU, or the like.

Alternatively, the program can be temporarily or permanently stored (recorded) in a removable recording medium such as a flexible disc, a compact disc read only memory (CD-ROM), a magnet optical (MO) disc, a digital versatile disc (DVD), a Blu-ray disc (registered trademark), a magnetic disk, a semiconductor memory, or a memory card. Such a removable recording medium can be provided as so-called package software.

Further, such a program can be installed in a personal computer or the like from the removable recording medium, and can also be downloaded from a download site via a network such as a local area network (LAN) or the Internet.

Further, such a program is suitable for a wide range of provision of the information processing device of the embodiment. For example, a program is downloaded to a personal computer, a portable information processing device, a mobile phone, a game device, a video device, a personal digital assistant (PDA), or the like, making it possible for the personal computer or the like to function as the information processing device of the present technology.

<11. Present Technology>

The present technology can also adopt the following configurations.

(1)

An information processing device including a reception unit configured to receive designation of a placement position in a display area of a tracking target on a first screen in which a predetermined image is displayed in the display area.

(2)

The information processing device according to (1), wherein the predetermined image is an image cropped from an original image.

(3)

The information processing device according to (1) or (2), wherein the reception unit receives designation of the tracking target.

(4)

The information processing device according to any one of (1) to (3), including: a display control unit configured to perform display control of the predetermined image so that the tracking target is disposed at a position within the display area based on the designated placement position.

(5)

The information processing device according to any one of (2) to (4), wherein the reception unit receives designation of a range to be cropped from the original image.

(6)

The information processing device according to (4) or (5), wherein the display control unit causes an operation image to be used for the operation for designating the placement position of the tracking target to be displayed on the first screen.

(7)

The information processing device according to (6), wherein the reception unit receives the designation of the tracking target and the designation of the placement position of the tracking target on the basis of an operation with respect to the operation image.

(8)

The information processing device according to (6) or (7), wherein the predetermined image is an image cropped from an original image, and the reception unit receives the designation of the range to be cropped from the original image and an operation regarding the tracking target using the operation image as operations with respect to the screen.

(9)

The information processing device according to (8), wherein the reception unit switches between a state in which an operation on the screen is recognized as an operation for designating a range cropped from the original image and a state in which the operation is recognized as an operation regarding the tracking target using the operation image.

(10)

The information processing device according to (8) or (9), wherein the reception unit recognizes an operation on the screen as an operation for designating the image range to be cropped from the original image on a second screen, and recognizes the operation on the screen as an operation regarding the tracking target using the operation image on the first screen.

(11)

The information processing device according to (10), wherein the display control unit performs a display for changing a range of the image serving as a cropping range according to the operation recognized by the reception unit on the second screen, and performs a display for moving a designated position using the operation image according to the operation recognized by the reception unit on the first screen.

(12)

The information processing device according to (10) or (11), wherein in the second screen, the original image changes in the display area according to an operation, and in the first screen, the placement position of the operation image in the display area changes according to an operation.

(13)

The information processing device according to any one of (2) to (12), wherein the original image is one image in an image group configured of a plurality of images.

(14)

The information processing device according to (13), performing image cropping processing so that the tracking target is disposed at a position in the display area based on the designated placement position, on at least one image after an order of the image for which the designation of the placement position is received among a plurality of consecutive images in a predetermined order.

(15)

The information processing device according to (13) or (14), wherein the image group consists of a series of frame images constituting a moving image.

(16)

The information processing device according to (15), wherein the reception unit receives designation of a tracking section, the tracking section being a section in which cropping from the original image is performed, so that the tracking target is disposed at a position in the display area based on the designated placement position.

(17)

The information processing device according to any one of (4) to (16), wherein the predetermined image is an image cropped from an original image, and the display control unit performs control for displaying an image in a cropping range from the original image and an image outside the cropping range in different display aspects.

(18)

The information processing device according to any one of (4) to (16), including: a shake correction unit configured to perform processing of pasting to a virtual celestial spherical surface for each frame of image data constituting the moving image, and perform shake correction using posture information corresponding to the frame; and a cropping range setting unit configured to perform protrusion prevention processing for performing correction so that a cropping range according to designation of the cropping range received by the reception unit does not protrude from an area in which the shake correction is effectively maintained, wherein the display control unit performs control of a display of the cropped image reflecting the protrusion prevention processing performed by a cropping range setting unit.

(19)

The information processing device according to (18), wherein the display control unit performs control so that a display based on an allowed movement range set in the protrusion prevention processing is performed, a variation in the cropping range of the image being allowed in the allowed movement range.

(20)

The information processing device according to (19), wherein the display control unit perform control so that a display for specifying that an operation for designating the cropping range, the operation exceeding the allowed movement range, is restricted is performed.

REFERENCE SIGNS LIST

1 Imaging device
2 Mobile terminal
3 Personal computer
4 Server
5 Storage medium
11 Lens system
12 Imaging element unit
13 Camera signal processing unit
14 Recording unit
15 Display unit
16 Output unit
17 Operation unit
18 Camera control unit
19 Memory unit
22 Driver unit
23 Sensor unit
31 Preprocessing unit
32 Image processing unit
33 Shake correction unit
34 Effective cropping area setting unit
35 Effective cropping area image generation processing unit
36 UI Processing Unit
36a Reception unit
36b Display control unit
61 Captured area
62 Available area
70 Information processing device
71 CPU
101 Import screen
102 Preview screen
103 Framing screen
104 Trimming screen
105 Speed screen
106 Aspect ratio Setting screen
107 Setting screen
108 Export screen
MF Image file
PD, iPD Image data
oPD Output image data
HP Image frame correction parameter
TM Timing information
CP Camera parameter
QD Quaternion
TP, TPp In-screen position information
DR1, DR2 Operation information
CL, CL' Cropping range
MT Celestial sphere model
I24 Preview area

The invention claimed is:

1. An information processing device, comprising:
a Central Processing Unit (CPU) configured to:
receive designation of a placement position in a display area of a tracking target on a first screen in which a first image is displayed in the display area, wherein the first image is an image cropped from a second image, and
the second image is at least one image selected from a plurality of images; and
perform an image cropping processing, so that the tracking target is at a position in the display area based on the designated placement position, on at least one image of the plurality of images after an order of the first image for which the designation of the placement position is received among a plurality of consecutive images in a specific order.

2. The information processing device according to claim 1, wherein the CPU is further configured to receive designation of the tracking target.

3. The information processing device according to claim 1, wherein the CPU is further configured to perform display control of the first image so that the tracking target is at the position within the display area based on the designated placement position.

4. The information processing device according to claim 1, wherein the CPU is further configured to receive designation of a range to be cropped from the second image.

5. The information processing device according to claim 3, wherein the CPU is further configured to cause an operation image to be used for designating the placement position of the tracking target to be displayed on the first screen.

6. The information processing device according to claim 5, wherein the CPU is further configured to receive designation of the tracking target and the designation of the placement position of the tracking target based on an operation with respect to the operation image.

7. The information processing device according to claim 5, wherein the CPU is further configured to receive designation of a range to be cropped from the second image and an operation regarding the tracking target using the operation image as operations with respect to the first screen.

8. The information processing device according to claim 7, wherein the CPU is further configured to switch between a state in which an operation on the first screen is recognized as an operation for designating the range cropped from the second image and a state in which the operation is recognized as an operation regarding the tracking target using the operation image.

9. The information processing device according to claim 7, wherein the CPU is further configured to:
  recognize an operation on the first screen as an operation for designating the range to be cropped from the second image on a second screen, and
  recognize the operation on the first screen as an operation regarding the tracking target using the operation image on the first screen.

10. The information processing device according to claim 9, wherein the CPU is further configured to:
  perform a display for changing a range of the image serving as a cropping range according to the operation on the first screen, and
  perform a display for moving a designated position using the operation image according to the operation on the first screen.

11. The information processing device according to claim 9, wherein in the second screen, the second image changes in the display area according to an operation, and in the first screen, a placement position of the operation image in the display area changes according to an operation.

12. The information processing device according to claim 1, wherein the plurality of images consists of a series of frame images constituting a moving image.

13. The information processing device according to claim 12, wherein the CPU is further configured to receive designation of a tracking section, the tracking section being a section in which cropping from the second image is performed, so that the tracking target is at the position in the display area based on the designated placement position.

14. The information processing device according to claim 3, wherein the CPU is further configured to perform control for displaying an image in a cropping range from the second image and an image outside the cropping range in different display aspects.

15. The information processing device according to claim 3, wherein the CPU is further configured to:
  perform processing of pasting to a virtual celestial spherical surface for each frame of a plurality of frames of image data constituting a moving image;
  perform shake correction using posture information corresponding to a frame of the plurality of frames;
  perform protrusion prevention processing for performing correction so that a cropping range according to designation of the cropping range does not protrude from an area in which the shake correction is effectively maintained; and
  control display of the first image reflecting the protrusion prevention processing.

16. The information processing device according to claim 15, wherein the CPU is further configured to perform control so that a display based on an allowed movement range set in the protrusion prevention processing is performed, a variation in the cropping range of the image being allowed in the allowed movement range.

17. The information processing device according to claim 16, wherein the CPU is further configured to perform control so that a display for specifying that an operation for designating the cropping range, the operation exceeding the allowed movement range, is restricted is performed.

18. An information processing method, comprising:
  performing, by an information processing device, processing of receiving designation of a placement position in a display area of a tracking target on a first screen in which a first image is displayed in the display area, wherein
    the first image is an image cropped from a second image, and
    the second image is at least one image selected from a plurality of images; and
  performing, by the information processing device, an image cropping processing, so that the tracking target is at a position in the display area based on the designated placement position, on at least one image of the plurality of images after an order of the first image for which the designation of the placement position is received among a plurality of consecutive images in a specific order.

19. A non-transitory computer-readable medium having stored thereon computer-executable instructions which, when executed by a computer, cause the computer to execute operations, the operations comprising:
  receiving designation of a placement position in a display area of a tracking target on a first screen in which a first image is displayed in the display area, wherein
    the first image is an image cropped from a second image, and
    the second image is at least one image selected from a plurality of images; and
  performing an image cropping processing, so that the tracking target is at a position in the display area based on the designated placement position, on at least one image of the plurality of images after an order of the first image for which the designation of the placement position is received among a plurality of consecutive images in a specific order.

* * * * *